DATA COMPRESSION/EXPANSION AND COMPRESSED DATA PROCESSING

Filed June 30, 1964

INVENTORS
RUSSEL G. RINALDI
BRIAN B. MOORE

BY Melvin P. Williams
ATTORNEY

DATA COMPRESSION/EXPANSION AND COMPRESSED DATA PROCESSING

Filed June 30, 1964 36 Sheets-Sheet 2

March 21, 1967 R. G. RINALDI ETAL 3,310,786

DATA COMPRESSION/EXPANSION AND COMPRESSED DATA PROCESSING

Filed June 30, 1964

36 Sheets-Sheet 3

FIG. 6

COMPRESS MODE ADDRESS

| A | B | INDEX REG ADDRESS |
|---|---|---|
| | | NONE |
| X | | 85 – 89 |
| | X | 90 – 94 |
| X | X | 95 – 99 |

| ZONES | B = 2<br>A = 1 | B<br>A | B = 8<br>A = 4 |
|---|---|---|---|
| NUMERALS | 8 | 8 | 8 |
| | 4 | 4 | 4 |
| | 2 | 2 | 2 |
| | 1 | 1 | 1 |
| | HUNDS | TENS | UNITS |

FIG. 7

CONVERT 2/5 TO BINARY :
TRUTH TABLE

| 2/5 | | | | | | | | | | DEC | BINARY | | | |
|---|---|---|---|---|---|---|---|---|---|---|---|---|---|---|
| TT | | | | | TH | | | | | | | | | |
| 0 | 1 | 2 | 4 | 8 | 0 | 1 | 2 | 4 | 8 | | 1 | 2 | 4 (A) | 8 (B) |
| | | X | | X | | | X | | X | 0 | | | | |
| | | X | | X | X | X | | | | 1 | X | | | |
| | | X | | X | X | | X | | | 2 | | X | | |
| | | X | | X | | X | X | | | 3 | X | X | | |
| | | X | | X | X | | | X | | 4 | | | X | |
| | | X | | X | | X | | X | | 5 | X | | X | |
| | | X | | X | | | X | X | | 6 | | X | X | |
| | | X | | X | | | | X | X | 7 | X | X | X | |
| | | X | | X | X | | | | X | 8 | | | | X |
| | | X | | X | | X | | | X | 9 | X | | | X |
| X | X | | | | | | X | | X | 10 | | X | | X |
| X | X | | | | X | X | | | | 11 | X | X | | X |
| X | X | | | | X | | X | | | 12 | | | X | X |
| X | X | | | | | X | X | | | 13 | X | | X | X |
| X | X | | | | X | | | X | | 14 | | X | X | X |
| X | X | | | | | X | | X | | 15 | X | X | X | X |

2/5 TO BINARY CONVERT

ZONE REGISTER LOAD CONTROLS

FIG. 10 ZONE REGISTER

COMPRESS DATA INPUT TO ZONE ADDER

EXPAND DATA INPUT TO ZONE ADDER (1 & 2 BITS GO DIRECTLY TO CONVERTER)

ZONE ADDER INPUTS

March 21, 1967 R. G. RINALDI ETAL 3,310,786

DATA COMPRESSION/EXPANSION AND COMPRESSED DATA PROCESSING

Filed June 30, 1964 36 Sheets-Sheet 15

March 21, 1967 R. G. RINALDI ETAL 3,310,786

DATA COMPRESSION/EXPANSION AND COMPRESSED DATA PROCESSING

Filed June 30, 1964 36 Sheets-Sheet 16

March 21, 1967 R. G. RINALDI ETAL 3,310,786

DATA COMPRESSION/EXPANSION AND COMPRESSED DATA PROCESSING

Filed June 30, 1964 36 Sheets-Sheet 17

FIG. 20 COMPRESS OUTPUT GATE

Z CYCLE CONTROLS

FIG. 24

I RING OPERATION

| I RING | IOP | I1 | I2 | I3 | I4 | I5 | I6 | I7 | I8 | I9 | I10 | I11 | I12 |
|---|---|---|---|---|---|---|---|---|---|---|---|---|---|
| CONTROLS | | 1 | 2 | 3 | 4 | 5 | 1 | 2 | 3 | 4 | 5 | 6 | 6 |
| | | $\overline{7}$ | $\overline{7}$ | $\overline{7}$ | $\overline{7}$ | $\overline{7}$ | 7 | 7 | 7 | 7 | 7 | 7 | $\overline{7}$ |
| NORMAL 2 ADDRESS | ✓ | ✓ | ✓ | ✓ | ✓ | ✓ | ✓ | ✓ | ✓ | ✓ | ✓ | ✓ | |
| NORMAL 2 ADDRESS + MODIFIER | ✓ | ✓ | ✓ | ✓ | ✓ | ✓ | ✓ | ✓ | ✓ | ✓ | ✓ | ✓ | ✓ |
| NORMAL COMPRESSED MODE | ✓ | SKIP | | ✓ | ✓ | ✓ | SKIP | | ✓ | ✓ | ✓ | ✓ | |
| EXTRA CYCLES FOR ADDRESS EXPANSION | | | | | | Z1 Z2 | | | | | Z1 Z2 | | |
| 2 ADDRESS WITH INDEXING | ✓ | ✓ | ✓ | ✓ | ✓ | ✓ | ✓ | ✓ | ✓ | ✓ | ✓ | ✓ | |
| EXTRA CYCLES FOR INDEX ADDITION | | | | | | X1 X2 X3 X4 X5 | | | | | X1 X2 X3 X4 X5 | | |
| COMPRESSED MODE WITH INDEXING | ✓ | SKIP | | ✓ | ✓ | ✓ | SKIP | | ✓ | ✓ | ✓ | ✓ | |
| EXTRA CYCLES FOR ADDRESS EXPANSION AND THEN INDEX ADDITION | | | | | | Z1 Z2 X1 X2 X3 X4 X5 | | | | | Z1 Z2 X1 X2 X3 X4 X5 | | |
| I/O OPS (FOR EXAMPLE) | ✓ | SKIP | | ✓ | ✓ | ✓ | ✓ | ✓ | ✓ | ✓ | ✓ | ✓ | ✓ |

INSTRUCTION DECODER

INSTRUCTION GROUPING ENCODER

SERIAL SCAN

BASIC WRITE TIMING

NEXT CYCLE IS I CYCLE

March 21, 1967 R. G. RINALDI ETAL 3,310,786

DATA COMPRESSION/EXPANSION AND COMPRESSED DATA PROCESSING

Filed June 30, 1964 36 Sheets-Sheet 27

B CYCLE LATCH

X CYCLE LATCH

FIG. 35 X RING CONTROL

LAST EXECUTE CYCLE t LAST

INDEX REGISTERS

March 21, 1967 R. G. RINALDI ETAL 3,310,786

DATA COMPRESSION/EXPANSION AND COMPRESSED DATA PROCESSING

Filed June 30, 1964 36 Sheets-Sheet 32

ADDRESS GENERATOR
UNITS POSITION

ADDRESS GENERATOR
H, TH, TT POSITIONS

March 21, 1967 R. G. RINALDI ETAL 3,310,786

DATA COMPRESSION/EXPANSION AND COMPRESSED DATA PROCESSING

Filed June 30, 1964 36 Sheets-Sheet 34

United States Patent Office 3,310,786

Patented Mar. 21, 1967

3,310,786

DATA COMPRESSION/EXPANSION AND COMPRESSED DATA PROCESSING

Russell G. Rinaldi, Poughkeepsie, and Brian B. Moore, New Paltz, N.Y., assignors to International Business Machines Corporation, New York, N.Y., a corporation of New York Filed June 30, 1964, Ser. No. 379,332

8 Claims. (Cl. 340—172.5)

This invention relates to data processing, and more particularly to a data processing system capable of handling data in either expanded or a compressed format, and interchanging data from one format to another.

CONTENTS

| Section | Col. | Figs. | Sheet |
|---|---|---|---|
| (1) Introduction | 2 | ----- | ----- |
| (a) Prior art | 2 | ----- | ----- |
| (b) Objects | 3 | ----- | ----- |
| (c) Brief statement of invention | 4 | ----- | ----- |
| (d) Description of the drawings | 5 | ----- | ----- |
| (e) Correspondence of figures herein to figures of Serial No. 332,648 | 6 | ----- | ----- |
| (f) Chart of circuit output designations | 6 | ----- | ----- |
| (2) Brief Description of an Environmental System | 7 | 2 | 2 |
| (3) Brief Description of Illustrative Embodiment | 10 | 1 | 1 |
| (a) Generally | 10 | 1 | 1 |
| (b) Expand data | 11 | 1 | 1 |
| (c) Summary chart of expand data | 13 | 1 | 1 |
| (d) Indexing in compress mode | 13 | 1 | 1 |
| (e) Summary chart of compress mode indexing | 16 | 1 | 1 |
| (f) Compress data | 16 | 1 | 1 |
| (g) Summary chart of compress data | 18 | 1 | 1 |
| (h) Compress add | 18 | 1 | 1 |
| (i) Summary chart of compress add | 21 | 1 | 1 |
| (4) Formats and Timing | 21 | ----- | ----- |
| (a) Cycles | 21 | 4, 5 | 4 |
| (b) Compress format | 22 | 6 | 5 |
| (c) Codes | 22 | 7 | 6 |
| (5) Detailed Description of Compress Circuits | 23 | ----- | ----- |
| (a) Generally | 23 | 1 | 1 |
| (b) 2/5 to binary convert | 23 | 8 | 7 |
| (c) Zone register load controls | 24 | 9 | 8 |
| (d) Zone register | 24 | 10 | 9 |
| (e) Compress add input to zone adder | 25 | 11 | 10 |
| (f) Compress data input to zone adder | 25 | 12 | 11 |
| (g) Expand data input to zone adder | 26 | 13 | 11 |
| (h) Index input to zone adder | 26 | 14 | 12 |
| (i) Zone adder inputs | 27 | 15 | 13 |
| (j) A bit zone adder | 27 | 16 | 14 |
| (k) B bit zone adder | 28 | 17 | 15 |
| (m) Adder out conversion | 28 | 18 | 16 |
| (n) Compress output gate controls | 30 | 19 | 17 |
| (p) Compress output gate | 30 | 20 | 18 |
| (q) Summation | 31 | ----- | ----- |
| (6) Compress Cycle-Counting Control Circuits | 31 | ----- | ----- |
| (a) Generally | 31 | ----- | ----- |
| (b) Units/Tens/Hundreds | 31 | 22 | 20 |
| (c) Z cycle controls | 32 | 23 | 21 |
| (7) Modificatoons to Data Flow of Environmental System | 33 | ----- | ----- |
| (a) Generally | 33 | 2 | 2 |
| (b) Return channel 2nd character gate | 33 | 21 | 19 |
| (c) Secondary channel gate | 34 | 25 | 23 |
| (8) Modifications to Main Controls of Environmental System | 35 | ----- | ----- |
| (a) Instruction decoder | 35 | 26 | 24 |
| (b) Instruction grouping encoder | 35 | 27 | 24 |
| (c) Serial scan | 35 | 28, 29 | 25 |
| (d) Basic write timlng | 36 | 30 | 26 |
| (e) Next cycle is I cycle | 36 | 31 | 26 |
| (f) Last I cycle | 36 | 32 | 27 |
| (g) B cycle latch | 37 | 33 | 28 |
| (h) X cycle latch | 38 | 34 | 28 |
| (i) X ring control | 38 | 35 | 29 |
| (j) Last execute cycle | 38 | 36 | 30 |
| (k) *t* Last | 39 | 37 | 30 |
| (9) Index Registers and Address Generator | 39 | ----- | ----- |
| (a) Register identification | 39 | 38, 39 | 31 |
| (b) Generator—Tens | 40 | 40 | 32 |
| (c) Generator—Units | 40 | 41 | 33 |
| (d) Generator—H, TH, TT | 41 | 42 | 33 |
| (e) Summation | 41 | ----- | ----- |
| (10) Changes in Address Modification Circuits | 42 | ----- | ----- |
| (a) Generally | 42 | ----- | 34 |
| (b) Plus/Minus/Scan | 42 | 43 | 34 |
| (11) Address Register Control Circuits | 42 | ----- | ----- |
| (a) Serial set | 42 | 44 | 35 |
| (b) Gate BAR to ARO | 42 | 45 | 35 |
| (c) Gate CAR, Gate DAR | 42 | 46, 47 | 35 |
| (d) Serial select | 42 | 48 | 36 |
| (e) Serial address position selection | 43 | 49 | 36 |
| (12) Summary and Examples of Equivalent Formats | 43 | ----- | ----- |

(1) INTRODUCTION

(*a*) *Prior art*

In the data processing art, numeric values and alphabetic or special characters are represented in many instances by coded configurations of bit and no bit manifestations. For instance, pure binary numbers are easily represented by a sequence of bit and no bit manifestations, the lowest ordered bit having a value of 1, the next having a value of 2, the next having a value of 4, the highest ordered bit having a value of 2 to the *n*, where *n* equals one less than the position of said bit in said sequence. In binary coded decimal (BCD) representations, the numbers are generally represented in decimal orders or digits, each digit being represented in pure binary form by four bit manifestations which are limited to values between 0 and 9; in the BCD code, a 0 is represented sometimes (as in the embodiment to be described herein) by a combination of the binary 2 bit and the binary 8 bit. The BCD code is used largely in commercial applications which include a necessity for alphameric representation. Such a code generally includes in each character (in addition to the four bit representation of a decimal digit) zone bits (designated herein as the A bit and the B bit) which are used in combination with the BCD digit values to characterize alphabetic and special characters; the code also may include a check or parity bit (herein called a C bit), and, if the system involved utilizes variable length words or fields, the character may include a field delineation marking bit (herein referred to as a word mark bit of WM bit). Thus, in many embodiments, a character representation may include any combination of WM, C, B, A, 8, 4, 2, and 1 bits. This character format is very useful in commercial applications, yet may prove to be wasteful of storage space in situations where a large number of numeric values (digits only) are being stored and handled.

Data packing has been developed in the art as a means of "compressing" numerical information, by utilizing zone bits (such as the A and B bits herein) to assist in representing numerical values. In one form of data compressing device, an entire field of memory is considered to have one numeric value (a group of related digits) represented by the numeric portion (8, 4, 2, and 1 bits) of the characters in that field, and having a different numerical value (or group of related digits) represented by the A and B zone bits of two adjacent characters. In this embodiment, addition of the numeric portions with other related numeric portions, and addition of the numeric value represented by the zone portions with a further numerical value may take place in a combined operation by means of a numeric adder and a zone adder. However, data values added in the numeric adder bear no relationship to the data values added in the zone adder. Additionally, the conversion of data from a packed format (where it is represented by zone bits) to an unpacked, or expanded format (where it is represented by the numeric bits 8, 4, 2, 1) requires additional special cycles so that the compressed character format is achieved at the expense of processing time.

Another form of data packing is utilized where pure binary value representation is involved. A group of eight binary bits, sometimes called a "byte," may represent any numeric, alphabetic or special character by utilizing all eight bits for a single character, or may represent two hexidecimal values, each comprising four bits of pure binary so as to represent values between 0 and 15. In such a situation, the byte significance of the eight bits becomes minimal, the four bit hexidecimal representations indicating merely a sequence of values. For instance, if a "word" contains four bytes (32 bits) and each byte contains two binary numbers, the word actually contains a sequence of eight binary numbers. Thus, packing has no real numeric significance in such a case; a carry out of one of the four bit hexidecimal values into the next higher one is identical to a carry, at the same position, which results from a solid 32-bit binary representation. In another example, the situation is identical to the last one above except for the fact that the numeric values are limited to representing one decimal digit in each of the four binary bits; this becomes (in the 32-bit example) a case where eight decimal orders are represented in BCD notation, carrying out of each order into the next being a normal function. The significant aspect of each of these examples of this type of data packing is that a large word or field of so-called packed information actually represents no more than an ordered sequence of values which are capable of representing values between 0 and 9 or values between 0 and 15 in dependence upon the inclusion of BCD control, or not, respectively.

A further type of data packing comprises a modification of the BCD data packing described in the preceding paragraph. In this type, the four bit representations are limited to decimal values (as in BCD notation), and the low order six bits may be utilized in the unpacked format to represent any desired character. The two high order bits are made 1's (the format being XXXXXX11) to indicate that the unpacked (or expanded) six character format is being utilized. Whenever a packed (or compressed) format is utilized, either one of the two high order bits may be 1 or 0, but not both may be 1's. This is possible because in a BCD format, the two high order bits of a four bit character are never both 1's at the same time. Thus, two decimal values may be represented by the eight bits, or six of the bits may be used for alphabetic and special characters, the other two bits indicating that the unpacked or expanded format is being used.

Each of the foregoing types of data packing or compressing devices is somewhat specialized in one or more respects. The first example does not provide for related character packing, wherein data represented by numeric portions bears an immediate relationship to the data which is represented at least in part by the zone portions, and said first type also has not developed a handy method of converting from one type to another as is required in devices of that type. The second type above is actually a case of a pure sequence of values in binary or BCD notation, when in the seemingly packed or compressed format representing numeric values. Said second type is also limited in not providing, when in the packed format, any bits which may be utilized as word mark or parity bits. This limitation applies also to the third type of data packing device described above due to the fact that said third type utilizes the two high order bits to indicate an unpacked or expanded condition.

(*b*) *Objects*

It is therefore a primary object of the present invention to provide for data packing and unpacking, and the handling of data in a packed format wherein characters represented by numeric portions are related to the characters which are at least in part represented by adjacent zone bits.

Other objects of the invention include the provision of:

A data packing device suitable for use in a variable word length system wherein decimal values are represented in BCD notation;

A system capable of handling packed data, of the type including non-data-designating bits, while in a packed format;

A system capable of handling both packed and unpacked data within a single operation;

A system capable of handling instructions in a packed format;

A system capable of utilizing packed addresses to specify either packed or unpacked operands in a storage device;

A system capable of providing unpacked results utilizing packed operands without any additional processing time in excess of that required when utilizing unpacked; or expanded operands;

Indexing of unpacked addresses with packed increments;

A system capable of adding together two packed operands, said operands including, in each character, zone and numeric portions, said addition yielding a result in a packed format.

Further objects of the invention include provision of:

An improved binary to decimal conversion circuit;

An adding and converting circuit combination which eliminates the necessity of manifesting final results in the radix of the adder, said results being achieved only in the radix of the conversion output;

A packed data handling system capable of handling a decimal character in packed format with a minimum of hardware;

Improved circuitry for handling, converting, and controlling operations upon data.

(*c*) *Brief statement of invention*

In accordance with the present invention, a plurality of related eight bit characters, including a number of data designating bits in each character, may represent one value each, and may together represent an additional value by means of assigning at least one bit manifestation of each of said characters a value counting toward a total value of an additional character. For example, in the exemplary embodiment described hereinafter, two related characters, each including (inter alia) A and B zone bits as well as four BCD value-representing bits, will represent, in a packed format, a third value which is equal to a combined binary value representation of the A and B bits therein. In this embodiment, the value represented by the two sets of A and B zone bits is considered to be higher-ordered than the values represented by the numeric portions of the two related characters; further the values of the A and B zone bits in the higher-ordered character are given weights of 1 and 2 respectively, whereas the values of the A and B bits in the lower ordered character are given weights of 4 and 8, respectively. This permits carries emanating from adding the numeric portions of two such packed characters to immediately propagate into the addition of their zones, a carry resulting from the addition of said zones being compensated for in one or more ways as described in detail in Sections 3*d* and 3*h*, hereinafter.

In accordance with further aspects of the present invention, addresses may be expressed in terms of packed values, so as to achieve storage of said addresses in fewer locations than would be required if unpacked addresses were utilized, and also so as to permit compatability of a larger data processing system (requiring, for instance, five character addresses to reach a greater number of storage locations), with a smaller data processing system (which may utilize, for instance, three character addresses to reach only a thousand locations of storage). In accordance with the embodiment of this invention described hereinafter, a three-character address is expanded to a five-character address by utilizing the zone bits in the units order character and hundreds order character of each address, in combination, so as to achieve two additional characters, thereby realizing a five-character address. After a five-character address is achieved, it may be incremented with a three character indexing factor by utilizing zones in the units and hundreds order characters of the increment to achieve an additional two characters of increment for adding with the highest-ordered two characters of the expanded, five-character address. A five-character address stored in a five-position storage register may be compressed into a three character address and stored in the main storage means or memory of the system.

In further accord with the particular embodiment of this invention disclosed hereinafter, two values, each expressed in a three-character packed format, may be added together, without first unpacking them, and a three-character result not packed format stored in memory; this may be achieved without utilizing any more time than would be required to handle a five-character value expressed in an unpacked, five-character format.

The examples chosen for purposes of illustration in the embodiment described herein are not exclusive, but exemplary only. Other formats and arrangements may be utilized in accordance with the principles of this invention to achieve packed data wherein there is a direct relationship between the data value of zone bits and numeric bits of each character. Similarly the total, related value comprising several characters, including pure numeric portions and numeric-zone combination portions, may have a variety of overall formats, even though the format chosen for purposes of illustration herein includes units and hundreds orders with zone bits which form additional values, and a tens order wherein only the numeric portion has value-representing significance in the overall three-character format utilized herein. Examples of other formats are given in Section 12, hereinafter.

In accordance with more detailed aspects of the present invention, there is provided a variety of improved circuits useful in data handling, data conversion, and data combining. Among the capabilities of such circuits is the ability to produce two partial sums, the total sum requiring that one of said sums have added thereto a carry which corresponds to the other of said sums; wherein, the final sum is generated in a dynamic fashion concurrently with the radix conversion of said final sum: in other words, the final sum is never manifested in the radix of the adder itself. This simplifies the hardware and reduces the time required for such operations. Additionally improved code conversion, gating, and other circuits are provided, including improved means for generating binary coded decimal values from pure binary values.

Other objects, features, and advantages of the present invention will become apparent with respect to the following detailed description of a particular embodiment thereof, as shown in the accompanying drawings.

(*d*) *Description of the drawings*

In the drawings, FIG. 1 is a schematic block diagram of an apparatus for expanding and compressing data and for adding items of data in compressed form, in accordance with the present invention.

Figure 1:
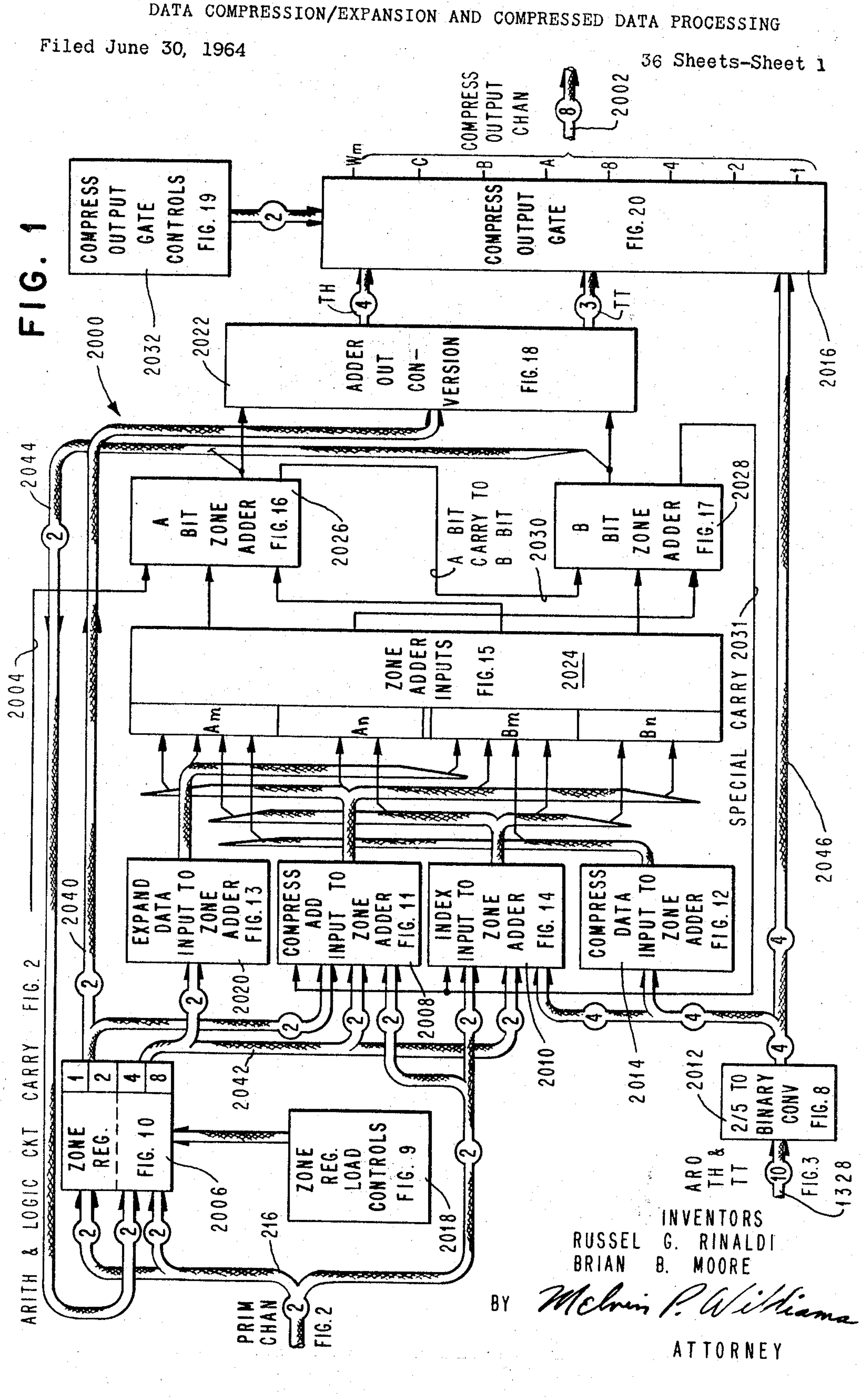

FIGS. 4–7 are charts illustrating I, A and B CYCLES; X CYCLES; COMPRESS MODE ADDRESS format; and a CONVERT 2/5 TO BINARY TRUTH TABLE; respectively.

The remaining figures are schematic block diagrams of circuits of the system of FIG. 2 for use in conjunction with the apparatus of FIG. 1, as described hereinafter, unless otherwise indicated:

| Fig. | Title | Sheet |
|---|---|---|
| 8 | 2/5 to Binary Convert | 7 |
| 9 | Zone Register Load Controls | 8 |
| 10 | Zone Register | 9 |
| 11 | Compress Add Input to Zone Adder | 10 |
| 12 | Compress Data Input to Zone Adder | 11 |
| 13 | Expand Data Input to Zone Adder | 11 |
| 14 | Index Input to Zone Adder | 12 |
| 15 | Zone Adder Inputs | 13 |
| 16 | A Bit Zone Adder | 14 |
| 17 | B Bit Zone Adder | 15 |
| 18 | Adder Out Conversion | 16 |
| 19 | Compress Output Gate Controls | 17 |
| 20 | Compress Output Gate | 18 |
| 21 | Return Channel 2nd Character Gate | 19 |
| 22 | Units/Tens/Hundreds Control | 20 |
| 23 | Z Cycle Controls | 21 |
| 24 | I Ring Operation Timing Chart | 22 |
| 25 | Secondary Channel Gate | 23 |
| 26 | Instruction Decoder | 24 |
| 27 | Instruction Grouping Encoder | 24 |
| 28 | Compress Mode Serial Scan | 25 |
| 29 | Serial Scan | 25 |
| 30 | Basic Write Timing | 26 |
| 31 | Next Cycle is I Cycle | 26 |
| 32 | Last I Cycle | 27 |
| 33 | B Cycle Latch | 28 |
| 34 | X Cycle Latch | 28 |
| 35 | X Ring Control | 29 |
| 36 | Last Execute Cycle | 30 |
| 37 | *t* Last | 30 |
| 38 | Index Required | 31 |
| 39 | Index Registers | 31 |
| 40 | Address Generator Tens Positions | 32 |
| 41 | Address Generator Units Position | 33 |
| 42 | Address Generator H, TH, TT Positions | 33 |
| 43 | Plus/Minus Scan | 34 |
| 44 | Serial Set | 35 |
| 45 | Gate BAR to ARO | 35 |
| 46 | Gate CAR, Index AAR | 35 |
| 47 | Gate DAR, Index BAR | 35 |
| 48 | Serial Selects | 36 |
| 49 | Serial Address Position Selection | 36 |

(*e*) *Correspondence of figures herein to figures of Ser. No. 332,648*

Figures herein which are identical to, or modifications of figures in said copending application relate as follows:

| Figs. Herein (no parentheses) | Sheet | Figs. Ser. No. 332,648 (these Figs. are identified by parentheses) | Sheet |
|---|---|---|---|
| 2 | 2 | 1 | 1 |
| 3 | 3 | 80 | 44 |
| 4 | 4 | 35 | 22 |
| 5 | 4 | 36 | 22 |
| 21 | 19 | 17 | 12 |
| 24 | 22 | 68 | 36 |
| 25 | 23 | 15 | 11 |
| 26 | 24 | 45 | 27 |
| 27 | 24 | 46 | 27 |
| 29 | 25 | 56 | 30 |
| 30 | 26 | 38 | 23 |
| 31 | 26 | 60 | 32 |
| 32 | 27 | 69 | 37 |
| 33 | 28 | 71 | 38 |
| 34 | 28 | 73 | 39 |
| 35 | 29 | 74 | 40 |
| 36 | 30 | 76 | 42 |
| 37 | 30 | 77 | 42 |
| 38 | 31 | 81b | 45 |
| 39 | 31 | 81a | 45 |
| 40 | 32 | 82 | 46 |
| 41 | 33 | 83 | 47 |
| 42 | 33 | 84 | 47 |
| 43 | 34 | 86 | 48 |
| 44 | 35 | 96 | 57 |
| 45 | 35 | 105 | 62 |
| 46 | 35 | 106 | 63 |
| 47 | 35 | 107 | 63 |
| 48 | 36 | 98 | 58 |
| 49 | 36 | 99 | 58 |

(*f*) *Chart of circuit output designations*

[FIGS. 8–21 are interrelated by notations which appear on the figures]

| On Fig. | Line Name | Line Goes to Fig. Herein | Line Goes to Fig. 332,648 |
|---|---|---|---|
| 1 | All | 2 | |
| 3 | ARO TH & TT | 1, 8 | |
| | MAR Units | | 51. |
| | BAR Units | | 52. |
| | Addr. Exit Chan | | 15. |

*(f) Chart of circuit output designations*—Continued

| On Fig. | Line Name | Line Goes to Fig Herein | Line Goes to Fig. 332,648 |
|---|---|---|---|
| 17 | Special Carry | 11, 14, 36, 33 | |
| | Not Special Carry | 9, 36 | |
| 22 | Units | 9, 11, 20, 36 | |
| | Hundreds | 9, 11, 16, 17, 20, 33, 36. | |
| 23 | Z Cycle | 13, 19, 28, 37, 48. | |
| | Z1 | 13, 19, 48 | |
| | Z2 | 13, 19, 34, 48 | |
| | Not Z2 | | |
| 25 | Secondary Channel Error | | 41. |
| | All others | 2 | 15, 71, 76, 78. |
| 26 | Add | 21, 30, 32, 33, 36, 43, 45. | 17, 38, 69, 71, 76, 86, 104, 105. |
| | No OP | 30, 31 | 38, 58, 60, 62, 63, 65. |
| | Move Data | 21, 30, 32, 36, 43, 45. | 17, 38, 47, 69, 76, 86, 104, 105. |
| | Not Move Data | | 78. |
| | All | 27 | 46. |
| | Comp. Add | 9, 11, 16, 17, 20, 21, 22, 28, 30, 32, 43, 45. | |
| | Comp. Data | 12, 20, 21, 25, 28, 30, 32, 36, 37, 43. | |
| | Not Comp. Data | 21, 37 | |
| 27 | A CY First | | 70. |
| | Load Mem B CY | 29 | 56. |
| | Addr Type | 31 | 60. |
| | 2 Addr Type | 31 | 60. |
| | Stnd A Cycle | 25, 33 | 15, 71, 78. |
| 28 | Compress Mode Serial Scan | 29 | |
| 29 | Serial Scan | | |
| | Not Serial Scan | | |
| 30 | Load Memory | | |
| | Regenerate Memory | | |
| 31 | Next Cycle is I Cycle | | |
| 32 | Last I Cycle | 22, 35 | 70, 79. |
| 33 | Set B Cycle | 45 | 88, 105. |
| | B Cycle | 11, 16, 17, 20, 21, 22, 25, 30, 36, 37. | 15, 17, 55, 58, 70, 76, 77, 78, 79, 87, 88, 97, 104, 110. |
| 34 | Set X Cycle | 40, 42 | 88, 109. |
| | X Cycle | 9, 10, 14, 16, 19, 21, 25, 35, 37, 40, 43, 44, 46, 47, 48. | 15, 17, 58, 72, 74, 75, 77, 82, 86, 95, 96, 98, 106, 107, 109, 110. |
| 35 | All | | 75. |
| 36 | Last Execute | | 58, 59, 61, 78, 87. |
| | Not Last Execute | | 55, 88. |
| 37 | Stop at *t*H, *t*F | | 37. |
| | *t* Last | 23, 33, 35 | 31, 32, 59, 61, 71, 72, 79. |
| 38 | Index Req'd | 34 | 73, 100. |
| | Not Index | 31 | 60. |
| 39 | All | 38, 40, 41 | 81, 82, 83. |
| 40–42 | All | 3 | 111, 112. |
| 43 | Plus/Minus Scan | | 4, 5, 19, 24. |
| | MOD BY'S | | 53, 90. |
| 44 | All | | 102, 103. |
| 45 | All | | 112. |
| 46 | All | | 112. |
| 47 | All | | 112. |
| 48 | All | | 102, 103. |
| 49 | All | | 103. |

(2) BRIEF DESCRIPTION OF AN ENVIRONMENTAL SYSTEM

Referring to FIG. 1, an exemplary embodiment of apparatus to expand data, compress data, to add data in compressed format, and to index compressed addresses is illustrated schematically. FIG. 1 represents only the data flow of the apparatus, the control circuits being shown in other figures which are described in appropriate sections hereinafter.

Figure 2:
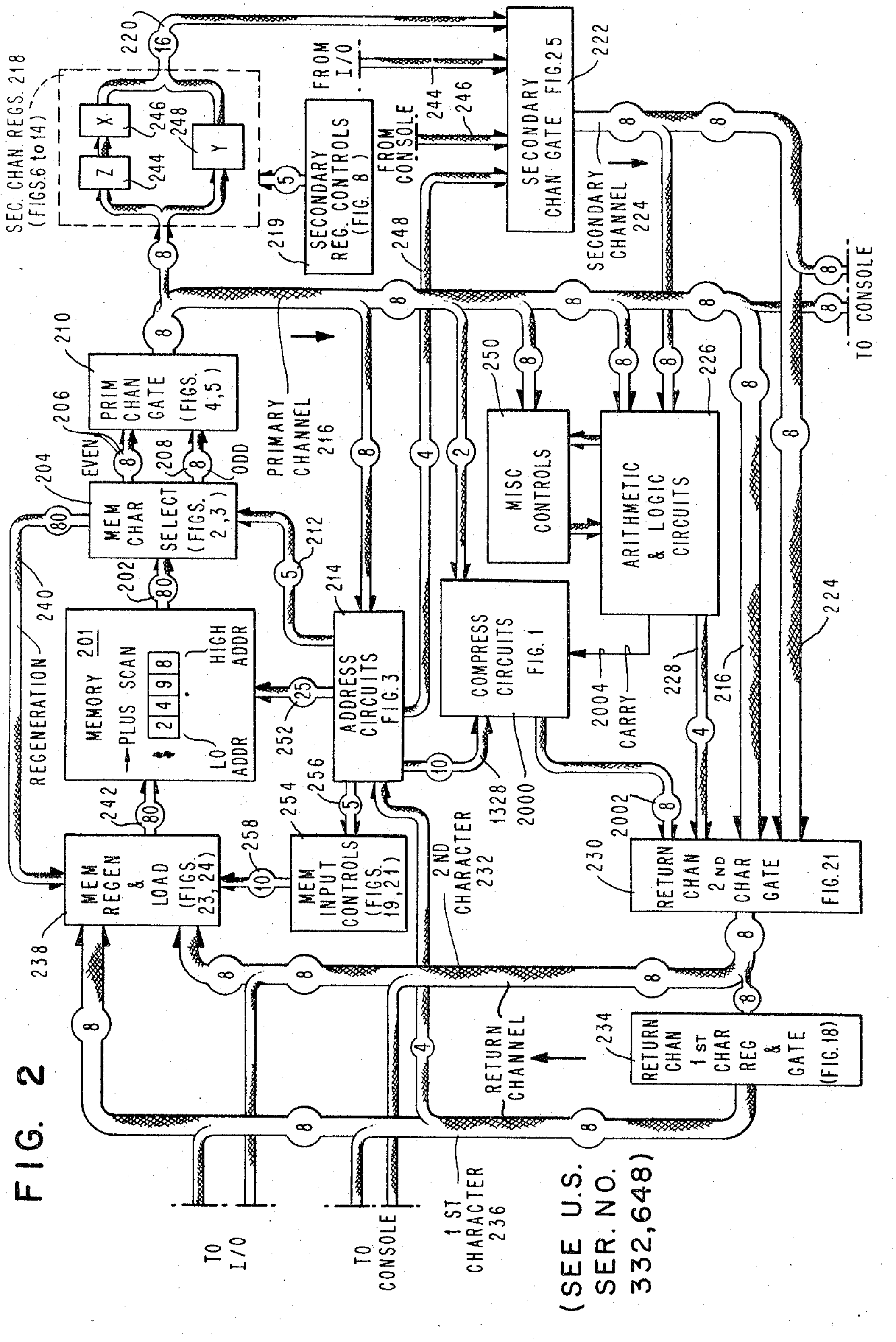
FIG. 2 is a simplified schematic block diagram of a data processing system which may form the environment for the apparatus of FIG. 1.

The apparatus of FIG. 1, which comprises the COMPRESS CIRCUITS 2000 (center of FIG. 2), is shown in its relationship to the overall data flow of a system which may form the environment for said apparatus, as shown in FIG. 2. In the drawings, any figure numbers in parentheses refer to figures of said copending application. Non-parentheticated figures refer to this application.

The circuit of FIG. 2 represents a block diagram of a system data flow which will handle a fully flexibly-addressed, variable-word-length, multiple-processing computer which is serviced by a parallel-readout, bounded memory. This system is fully disclosed and claimed in a copending patent application of Richard S. Carter and Walter W. Welz entitled "Parallel Memory, Multiple Processing, Variable Word Length Computer," Serial No. 332,648, filed December 23, 1963, and assigned to the same assignee as this application. In this system, data items are handled in BCD Character Sets comprising a possible WORD MARK bit (WM), a parity bit (C), zone bits (A, B), and a decimal digit comprised of binary bits 8, 4, 2, and 1.

Referring to the upper-central portion of FIG. 2, a MEMORY 201 (not shown elsewhere) comprises the focal point of the computer which handles either two characters serially or one character at a time, the memory presenting pairs of characters to the processor during each memory cycle. Specifically, in the particular embodiment shown, the MEMORY 201 will present ten characters, of eight bits each, over a trunk of eighty lines 202 to MEMORY CHARACTER SELECT circuit 204. The MEMORY CHARACTER SELECT circuit will pick two of the ten characters and transmit them over an EVEN eight bit bus 206 and an ODD eight bit bus 208 to a PRIMARY CHANNEL GATE 210; a five bit bus 212 allows the ADDRESS CIRCUITS 214 to exercise control over the MEMORY CHARACTER SELECT circuit 204.

The PRIMARY CHANNEL GATE 210 selects either (or both, one after the other) of the EVEN character (206) and ODD CHARACTER (208) and makes these available to a PRIMARY CHANNEL 216. The PRIMARY CHANNEL 216 is so identified due to the fact that any characters to be processed must pass onto the PRIMARY CHANNEL once they are selected from the MEMORY by the circuitry just described. The PRIMARY CHANNEL 216 in turn supplies characters to SECONDARY CHANNEL REGISTERS 218 which provide boundary adjusting (in dependence upon SECONDARY REGISTER CONTROLS 219) and makes one, or a pair of characters available (via a sixteen bit bus 220) to a SECONDARY CHANNEL GATE 222. When the SECONDARY CHANNEL GATE 222 is operated in such a fashion as to select one of the inputs thereto, such as one of the character sets presented on the sixteen bit bus 220, it will gate information onto a SECONDARY CHANNEL 224.

Both the SECONDARY CHANNEL 224 and the PRIMARY CHANNEL 216 feed ARITHMETIC & LOGIC CIRCUITS 226; the PRIMARY CHANNEL 216 feeds the COMPRESS CIRCUITS 2000, and both feed a number of other circuits which are discussed hereinafter. The ARITHMETIC & LOGIC CIRCUITS 226 and COMPRESS CIRCUITS 2000 are connected by respective eight bit buses 228, 2002 to a RETURN CHANNEL 2ND CHARACTER GATE 230 which (in the same fashion as the SECONDARY CHANNEL GATE 222) will select from among its inputs to apply a character onto an eight bit 2ND CHARACTER bus 232 of a RETURN CHANNEL 232, 236.

The 2ND CHARACTER bus 232 of the RETURN CHANNEL 232, 236 feeds a RETURN CHANNEL 1ST CHARACTER REGISTER & GATE 234 which in turn will supply data to a 1ST CHARACTER PORTION 236 of the RETURN CHANNEL. The RETURN CHANNEL is a two-character parallel channel which returns data from the internal processing section of the computer to the MEMORY, via MEMORY REGENERATE & LOAD CIRCUITS 238. The MEMORY REGENERATE & LOAD circuits also receive information on an eighty bit REGENERATION bus 240, and select data from either the RETURN CHANNEL or the REGENERATION bus, as necessary, to cause the effective regeneration of old data and/or writing of new data into the MEMORY over an EIGHTY bit bus 242.

The ADDRESS CIRCUITS 214 apply address information to the MEMORY 201 over a bus of twenty-five lines 252. The ADDRESS CIRCUITS also supply information (the same as is on the five bit bus 212) to MEMORY INPUT CONTROLS 254, over a five bit bus 256. The MEMORY INPUT CONTROLS determine the regeneration and loading of information into the MEMORY, via a ten bit bus 258.

Briefly, in a normal two-character processing cycle, the MEMORY 201 will, first, deliver ten characters (including two characters from a first operand called an A field) to the MEMORY CHARACTER SELECT circuit 204, which will present two of these characters to the PRIMARY CHANNEL GATE 210. During an A cycle, the first of these characters will be carried into the SECONDARY CHANNEL REGISTERS 218, and pass through a Z register 244 to an X register 246; the second of the characters will be selected by the PRIMARY CHANNEL GATE for presentation to a Y register 248. Thereafter, the MEMORY will present ten more characters (including two characters from a second operand called a B field), and the MEMORY CHARACTER SELECT circuits 204 will present two of these to the PRIMARY CHANNEL GATE 210. The first of these will be gated onto the PRIMARY CHANNEL 216 at the same time that the SECONDARY CHANNEL GATE 222 will pass the character out of the X register 246 onto the SECONDARY CHANNEL 224. Thus, a pair of characters (one A and one B) will be presented to the ARITHMETIC & LOGIC CIRCUITS 226 for processing and the answer will immediately pass over the eight bit bus 228 through the RETURN CHANNEL 2ND CHARACTER GATE 230 into the RETURN CHANNEL 1ST CHARACTER REGISTER & GATE 234. Then, the PRIMARY CHANNEL GATE 210 will gate the second one of the two B characters out onto the PRIMARY CHANNEL 216 concurrently with the SECONDARY CHANNEL GATE 222 gating the character out of the Y register 248 onto the SECONDARY CHANNEL 224; these will be processed by the ARITHMETIC & LOGIC CIRCUITS 226. As soon as the result is available on the appropriate eight bit bus 228, the RETURN CHANNEL 2ND CHARACTER GATE 230 will pass the second result onto the 2ND CHARACTER portion 232 of the RETURN CHANNEL, and, simultaneously, the RETURN CHANNEL 1ST CHARACTER REGISTER & GATE 234 will pass the first result onto the 1ST CHARACTER portion 236 of the RETURN CHANNEL. This operation is fully described with respect to FIG. 1, in Section 6 of said copending application, Serial No. 332,648.

During operations involving the COMPRESS circuits 2000; only one character is processed at a time, rather than the two-character processing which has just been described. In such a case, during an A cycle, a first character of a field is selected by the PRIMARY CHANNEL GATE 210 and passed to the COMPRESS CIRCUITS 2000; and then, in a B cycle, a first character of a related field will be selected by the PRIMARY CHANNEL GATE 210 for application over the PRIMARY CHANNEL 216 to the COMPRESS CIRCUITS 2000.

Depending on the operation involved, a single result (as in this case) may appear on the EIGHT bit bus 2002 for application to the RETURN CHANNEL 2ND CHARACTER GATE 230, or a first result may be followed by a second result (as in said copending application), the two results being applied, respectively, to the first character bus 236 and the second character bus 232 of the RETURN CHANNEL. The RETURN CHANNEL presents both of these results to the MEMORY REGENERATE & LOAD circuits 238 and causes these results to be written into MEMORY 201. All the remainder of the characters (those not selected initially by the MEMORY CHARACTER SELECT circuit 204) will be regenerated by means of the REGENERATION bus 240 and the MEMORY REGENERATE & LOAD circuits, which recognize that only two of the characters have new results to be written into them, and the remainder must be regenerated.

The above brief example (which is explained in greater detail hereinafter, and in Section 6 of said copending application) illustrates a simple case for illustration only.

Briefly, the remainder of FIG. 2 illustrates how the present invention might relate to an entire data processing system and includes further details of the main data flow of a computer in accordance with the present invention. For instance, the SECONDARY CHANNEL GATE 222 may receive data from *I/O* devices over a bus 244, from the operator's CONSOLE over a bus 246, or from the ADDRESSING CIRCUITS 214 over a bus 248. Similarly, the PRIMARY CHANNEL 216 may supply information to the ADDRESS CIRCUITS 214 and to certain MISCELLANEOUS CONTROLS 250 (shown here for illustrative purposes only). Also, it is to be noted that the PRIMARY CHANNEL 216 and the SECONDARY CHANNEL 224 may be applied directly to the RETURN CHANNEL 2ND CHARACTER GATE 230. Similarly, both the PRIMARY CHANNEL and the SECONDARY CHANNEL may supply information to the operator's CONSOLE as illustrated at the bottom right hand side of FIG. 2.

Additionally, the left hand side of FIG. 1 illustrates the fact that the RETURN CHANNEL may supply data to the operator's CONSOLE and to *I/O* devices, neither of which is shown elsewhere herein.

(3) BRIEF DESCRIPTION OF ILLUSTRATIVE EMBODIMENT

(a) *Generally*

Referring again to FIG. 1, the COMPRESS CIRCUITS 2000 comprise a variety of INPUT circuits, a REGISTER with its controls, an ADDER, CONVERSION circuits and OUTPUT circuits.

Specifically, data inputs to the COMPRESS CIRCUITS include a CARRY input from the ARITHMETIC & LOGIC CIRCUITS 226 via a line 2004; inputs from the PRIMARY CHANNEL 216; and inputs from the ADDRESS CIRCUITS 214 over a ten bit bus 1328. The PRIMARY CHANNEL 216 may feed either a low or high half of a ZONE REGISTER 2006, so as to cause A and B zone bits to be lodged in 1 and 2 bit positions, alternatively. The PRIMARY CHANNEL 216 also feeds a COMPRESS ADD INPUT TO ZONE ADDER circuit 2008 and an INDEX INPUT TO ZONE ADDER circuit 2010.

The ten bit bus 1328 from the ADDRESS CIRCUITS actually comprises the thousands (TH) and ten thousands (TT) positions of the address read out (ARO), hereinafter referred to as ARO, TH & TT. This is applied to a 2/5 TO BINARY CONVERT circuit 2012 which in turn feeds the INDEX INPUT TO ZONE ADDER circuit 2010, a COMPRESS DATA INPUT TO ZONE ADDER circuit 2014, and a COMPRESS OUTPUT GATE 2016, via a four bit bus 2046.

The ZONE REGISTER 2006 is controlled by ZONE REGISTER LOAD CONTROLS 2018, and supplies data to the COMPRESS ADD INPUT TO ZONE ADDER circuit 2010, as well as to an EXPAND DATA INPUT TO ZONE ADDER circuit 2020 and an ADDER OUT CONVERSION circuit 2022. The various INPUT TO ZONE ADDER circuits 2008, 2010, 2014, 2020 all feed the ZONE ADDER INPUTS 2024. This, in turn, feeds an A BIT ZONE ADDER 2026 (which receive the CARRY, on line 2004), and a B BIT ZONE ADDER 2028 which also receives an A BIT CARRY TO B BIT on a line 2030. The ZONE ADDER circuits 2026, 2028 supply results to the ZONE REGISTER 2006 as well as to the ADDER OUT CONVERSION circuit 2022, which in turn feeds the COMPRESS OUTPUT GATE 2016, which is controlled by the COMPRESS OUTPUT GATE CONTROLS circuit 2032. The COMPRESS OUTPUT GATE 2016 supplies information to the eight bit bus 2002, which comprises the COMPRESS OUTPUT CHANNEL.

The subject device is capable of operating in several ways, each typified by a related operation; these operations correspond to the respective INPUT TO ZONE ADDER circuits 2008, 2010, 2014, 2020 (FIG. 1), and are described briefly in succeeding subsections.

*(b) Expand data—(Compress mode instruction readout)*

In the system within which the present invention is embodied (the system of said copending application as modified herein), the MEMORY 201 is accessed by means of addresses which comprise five decimal digits, or characters. These characters are referred to as the units, tens, hundreds, thousands, and ten thousands, and are referred in abbreviated fashion respectively as U, T, H, TH and TT. It is one object of this invention to convert three-character addresses into five-character addresses whenever an instruction readout is performed while the system is in a "COMPRESS MODE." The purpose of this operation is to permit a system having a large memory, which requires the use of five-character addresses, to be capable of utilizing three-character addresses so as to reduce address storage space in memory, two of the characters having zone bits indicative of a hexidecimal value (between zero and fifteen) which permits addressing up to sixteen thousand locations of memory, the three numeric characters giving values of zero to 999, and the hexidecimal value represented by the zone bits over two of these numeric values being capable of supplying thousands and ten thousands orders so as to be able to represent values of from 00,000 to 15,999. See Section 4*b*, hereinafter, for format. When an instruction is read out in the COMPRESS MODE, the object is to take the three characters, utilizing the three numeric portions as is, and combining the zone bits over the units and hundreds positions of this three-character address, to formulate a thousands and ten thousands positions, not on a one to one basis, but by recognizing the hexidecimal total value of the zone bits where the zones have the following values: units—$A=4$, $B=8$; hundreds—$A=1$, $B=2$. Thus, if all four zone bits are present, the total address is 15,000 plus whatever the numeric values of the units, tens and hundreds represent.

Figure 44:
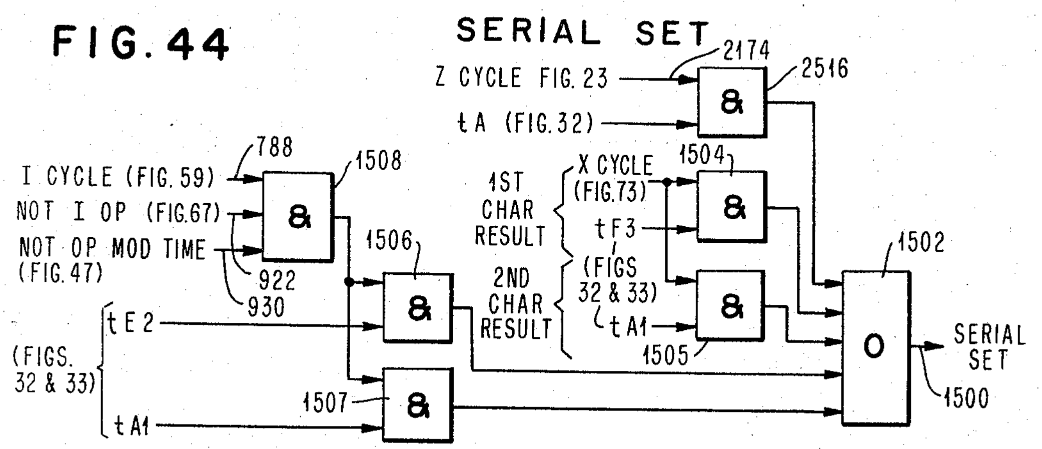

In order to perform this operation (see FIG. 24), the first character read out of MEMORY 201 is the operational portion (such as ADD, MOVE DATA, etc.), and this will be stored in an instruction register (Section 13*b*, page 126, FIG. 44, sheet 26 of said copending application, Ser. No. 332,648). The operational portion will determine whether the following execution is to ADD, SUBTRACT, or whatever is called for by said operational portion, as determined by an INSTRUCTION DECODER shown in FIG. 26, sheet 24, and described in Section 8*a* hereinafter.

Following the operational part of the instruction, the first address of one of the fields of data involved in the operation (usually the A field) is read out, character by character. The first character to be read out is the HUNDS (hundreds) order; the zones and numeric portion of this character will be selected by the primary channel gate 210 (FIG. 2) for transfer via the PRIMARY CHANNEL 216. The numeric portion of this character will be applied to the ADDRESS CIRCUITS by means of the ADDRESS ENTRY CHANNEL DECODE & GATE 1324 (FIG. 3 herein, Section 22, FIG. 95, sheet 56 of said copending case) and passed to the HUNDS (H) position of the AAR 1314 (Section 23 of said copending case) by means of the five bit bus 1325. Simultaneously, the zone portion of this character will be applied via the PRIMARY CHANNEL 216 to the COMPRESS CIRCUITS 2000 (FIG. 1) and will be placed into the 1 and 2 positions of the ZONE REGISTER 2006. In the next cycle, the TENS position of the address (the second character) is read out, and the numeric portions are applied via the PRIMARY CHANNEL 216 and the ADDRESS ENTRY CHANNEL DECODE & GATE 1324 (FIG. 3) to the tens order of the AAR 1314. If there are any zones in this character, the zones are indicative of an indexing operation (described briefly hereinafter in Section 3*d*, and in more detail in Section 5*h*). Thus any zones in the TENS position character are applied by the PRIMARY CHANNEL 216 to the INDEX REGISTERS & ADDRESS GENERATOR 1322 (center of FIG. 3). In the next cycle, the UNITS order (or position) of the address is read out, the numeric portions being applied by the PRIMARY CHANNEL 216 to the ADDRESS ENTRY CHANNEL DECODE & GATE 1324 (FIG. 3) for application to the hundreds position of the AAR 1314. The zones of the UNITS order are applied to the 4 and 8 positions of the ZONE REGISTER 2006 (FIG. 1).

Figure 3:
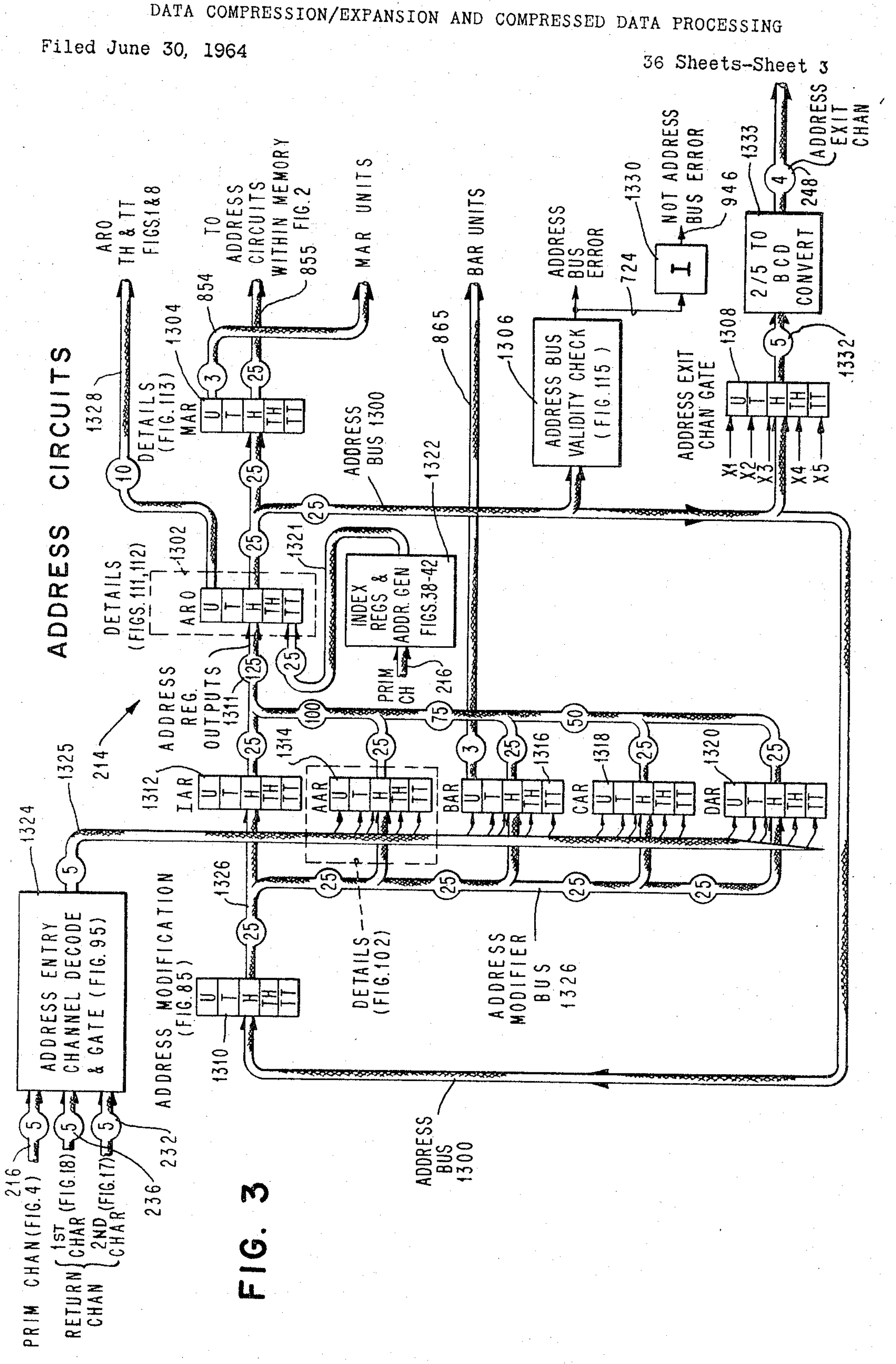
FIG. 3 is a simplified schematic block diagram of ADDRESS CIRCUITS suitable for inclusion in the system shown in FIG. 2.

Up to this point, the UNITS, TENS, and HUNDS numeric portions have been read out and stored in the appropriate positions of the AAR 1314 (FIG. 3). The zones in the UNITS character have been placed in the 4 and 8 positions of the ZONE REGISTER 2006, and the zones in the HUNDS character have been placed in the 1 and 2 positions of the ZONE REGISTER 2006. It is now necessary to convert the zones stored in the ZONE REGISTER 2006 into a thousands (TH) order and a ten thousands (TT) order so as to complete the five character address required for operating the MEMORY 201 in the present embodiment.

In order to convert the contents of the ZONE REGISTER into the thousands and ten thousands orders of an address, a pair of special cycles, called Z CYCLES, are utilized. During the first of these (Z1), the zone register 1 and 2 positions are read out over a two bit bus 2040 to the ADDER OUT CONVERSION 2022 simultaneously with the 4 and 8 bits being carried over a two bit bus 2042 to the EXPAND DATA INPUT TO ZONE ADDER circuit 2020 for application to the Am and Bm ZONE ADDER INPUTS 2024; the 4 bit (which is an A zone bit) being passed through the A BIT ZONE ADDER 2026, and the 8 bit (which is a B zone bit) being passed through the B BIT ZONE ADDER 2028. The ZONE ADDERs 2026, 2028 are used merely as data paths so as to apply the 4 and 8 bits to the ADDER OUT CONVERSION 2022 for combination with the 1 and 2 bits which were passed directly thereto by the two bit bus 2040. Thus, the contents of the ZONE REGISTER is passed to the ADDER OUT CONVERSION where the four bit hexidecimal value represented thereby may be converted into two BCD characters (TH, TT) so as to represent any value from 0 to 16 in binary coded decimal fashion. During the particular cycle being described (the first Z CYCLE, Z1) the 1, 2, 4, and 8 bits are fully decoded to determine what the thousands character, and ten thousands character, output from the ADDER OUT CONVERSION circuit 2022 should be. The thousands order character (only) is applied by the COMPRESS OUTPUT GATE 2016 to the COMPRESS OUTPUT CHANNEL 2002 for application to the RETURN CHANNEL 216 (FIG. 1) so that the ADDRESS ENTRY CHANNEL DECODE & GATE 1324 (FIG. 3) can pass the thousands character to the thousands position of the AAR 1314.

In the next Z CYCLE (Z2), the 1, 2, 4 and 8 bits are again gated from the ZONE REGISTER 2006 via the two bit bus 2040 and the adder circuits 2020, 2024, 2026, and 2028 to the ADDER OUT CONVERSION circuit 2022 so that the ten thousands order character may be applied to the COMPRESS OUTPUT CHANNEL 2002 by the COMPRESS OUTPUT GATE 2016. This character is also passed over the RETURN CHANNEL 216 (FIG. 1) through the ADDRESS ENTRY CHANNEL DECODE & GATE 1324 (FIG. 3) to the ten thousands position of the AAR 1314.

In summation, three cycles (I cycles I3, I4, and I5, FIG. 24) are utilized to read out the three characters of a three-character address in memory; the zones portion of the first character is stored in the 1 and 2 positions of the ZONE REGISTER, and the zones portion of the third character are stored in the 4 and 8 positions of the ZONE REGISTER. Following that, two Z CYCLES are taken wherein the ZONE REGISTER is gated to the ADDER OUT CONVERSION; during the first Z CYCLE (Z1) the thousands and ten thousands order characters are decoded and the thousands character is passed to the thousands position (TH) of the AAR, and during the second Z CYCLE (Z2), both characters are again decoded, and the ten thousands order is passed to the ten thousands position (TT) of the AAR 1314. Thus, a three character address having zone bits to represent an additional hexidecimal value is converted into a five character address; the two high order positions (TH, TT) of the five character address reflect the hexidecimal value represented by said zones.

(*c*) *Summary chart of expand data—(Compress mode instruction readout)*

I OP—Read out operational part of instruction, store in INST. REG., & decode.

I3—Read out HUNDS order of first (A field) Address, put zones in ZONE REG. 1 & 2; put numerics in HUNDS position of AAR.

I4—Read out TENS order of first address and put zones (if any) in INDEX REGS; put numerals in TENS position of AAR.

I5—Read out UNITS order of first address and put zones in ZONE REG. 4 & 8; put numerals in UNITS position of AAR.

Z1—Read ZN. REG. 1 & 2 out and put in ADDER OUT CONVERSION simultaneously with reading ZN REG. 4 & 8 out through EXPAND DATA INPUT TO ZONE ADDER ckt., ZONE ADDER INPUTS ckt., and ZONE ADDER to ADDER OUT CONVERSION; gate TH to COMPRESS OUTPUT CHANNEL; store in TH position of AAR.

Z2—Same as Z1, but gate TT to COMPRESS OUTPUT CHANNEL, store in TT pos of AAR (adder is USED only as a data path, only one input being applied).

(*d*) *Indexing in compress mode*

In the embodiment of said copending application as modified herein, indexing is used to modify an operand address by a factor stored in an index register. In the present embodiment, the fact that indexing is required is indicated by the presence of zone bits in the second character (the tens order) of the address which is to be indexed. The increment, by which the operand address is to be modified, is stored in a location of MEMORY 201 which is identified by the particular zone bits contained in the TENS order character. These zone bits are utilized (in FIG. 3) by the INDEX REGISTERS & ADDRESS GENERATOR 1322 to generate the address of the location within the MEMORY 201 wherein the increment is stored; the location in MEMORY is called an "index register." During instruction readout, the HUNDREDS, TENS, UNITS orders are read out of MEMORY (in that sequence), and indexing will take place in two cycles following the reading out of the units orders of the address. In the I RING OPERATION chart of FIG. 24 (sheet 22), an illustration of "COMPRESSED MODE WITH INDEXING" type of an instruction readout is shown. In this form of instruction readout, the HUNDREDS, UNITS and TENS orders are read out during the I3, I4 and I5 cycles, respectively; thereafter, two Z cycles (Z1, Z2) are taken to expand the three character address into a five character address, and five X cycles (X1–X5) are taken to perform the indexing on the five character address. The address being handled during I3–I5 cycles, and the immediately following Z and X cycles, is the address of an A field operand. A B field operand address is read out thereafter. In reading out the B field address, the HUNDREDS, TENS, and UNITS orders are read out in I8, I9 and I10 cycles, respectively, and the extra Z and X cycles are utilized for expanding the three character address to a five character address, and for indexing the five character address, respectively. As the A address is read out during I3 through I5 cycles, the characters are stored in the AAR and CAR (FIG. 3) simultaneously; similarly during the I8 through I10 cycles, the B address characters are simultaneously stored in the BAR and DAR. One of the reasons for putting each character of an address into corresponding positions of two registers at one time, is to permit using the CAR (or DAR) as a source for indexing, whereas the AAR (or BAR) will be available to contain the result of indexing, as indexing proceeds on a character by character basis.

Indexing in the COMPRESSED MODE is effected by utilizing a three character increment which represents a five character value, the thousands and ten thousands values of the five character increment being represented in terms of zone bits contained within the units and hundreds characters of the three character increment. The units, tens and hundreds values of the increment are represented by units, tens and hundreds numerics portions. Due to the fact that two Z cycles (Z1 and Z2) are utilized to expand the three character address into a five character address before indexing, the three character increment is to be utilized to index a five character address during indexing, in compressed mode, without compressing the five character address.

Taking the A address as an example, indexing begins in a first cycle (X1) by reading the thousands (TH) and ten thousands (TT) orders of the CAR 1318 (FIG. 3) over appropriate lines of the 125 bit bus 1311 through ARO 1302 over the ten bit bus 1328 to the 2/5 TO BINARY CONVERT 2012 (FIG. 1). Here, the combined value of the thousands and ten thousands position (which is restricted to values between zero and fifteen) is converted into four bit prime binary or hexidecimal) representation. At about the same time, the first character of the increment is read out of memory (FIG. 2), over the PRIMARY CHANNEL 216. The numerics portion is applied directly to the ARITHMETIC & LOGIC CIRCUITS 226, and the zone portion is applied to the COMPRESS CIRCUITS 2000 for application through the INDEX INPUT TO ZONE ADDER 2010 (FIG. 1) so that the A and B zone bits weighted 4 and 8 respectively, may be added to the 4 and 8 bit outputs, respectively, of the 2/5 to BINARY CONVERT 2012 in the A BIT ZONE ADDER 2026 and B BIT ZONE ADDER 2028, respectively. A carry from adding the A bit and the 4 bit causes an A BIT CARRY TO B BIT on a line 2030. The result of the addition is passed over the two bit bus 2044 to the 4 bit and 8 bit positions of the ZONE REGISTER 2006. If a carry results out of the B BIT ZONE ADDER 2028, it is ignored, since we utilize modulo sixteen arithmetic. At the time that the first character of the increment is read out of MEMORY onto the PRIMARY CHANNEL 216, the units position (U) of the CAR is read out through ARO 1302 (FIG. 3) over the ADDRESS BUS 1309, through the ADDRESS EXIT CHANNEL GATE 1308, over the five bit bus 1332 to the 2/5 TO BCD CONVERT 1333, and onto the ADDRESS EXIT CHANNEL 248. In FIG. 2, the four bit BCD representation of the units order of the CAR is applied by the ADDRESS EXIT CHANNEL 248 to the SECONDARY CHANNEL GATE 222 for application over the SECONDARY CHANNEL 224 to the ARITHMETIC & LOGIC CIRCUITS 226 so that the units order of the CAR may be added to the numeric portion of the first character of the increment in the ARITHMETIC & LOGIC CIRCUITS 226. If there is a carry from the result of adding these numeric portions, the carry is saved to be added in with the numeric portion of the tens order of the increment and the tens order of the CAR in a following cycle. The units numeric result is passed over the four bit bus 228 through the RETURN CHANNEL 2ND CHARACTER GATE 230, through the RETURN CHANNEL 1ST CHARACTER REGISTER & GATE 234 onto the 1ST CHARACTER bus 236 of the RETURN CHANNEL and into the ADDRESS CIRCUITS (FIG. 3), where it is passed through the ADDRESS ENTRY CHANNEL DECODE & GATE 1324, over a five bit bus 1325, and into the units position (U) of the AAR 1314.

In the following cycle, X2, the tens order (T) of the CAR (FIG. 3) is read out through ARO and the ADDRESS EXIT CHANNEL GATE onto the ADDRESS EXIT CHANNEL, through the SECONDARY CHANNEL GATE (FIG. 2) onto the SECONDARY CHANNEL and into the ARITHMETIC & LOGIC CIRCUITS, simultaneously with the tens order character of the increment being read out of MEMORY, over the PRIMARY CHANNEL, and into the ARITHMETIC & LOGIC CIRCUITS. These two characters are added, and the carry, if any, is saved for addition into the hundreds order numeric addition which takes place in the next cycle. The tens result is passed over the RETURN CHANNEL and through the ADDRESS ENTRY CHANNEL DECODE & GATE 1324 (FIG. 3) into the tens position (T) of the AAR 1314. Any zones in the tens order of the increment will be ignored at this time.

In the third cycle of indexing (X3), the hundreds order character of the increment is read out of MEMORY (FIG. 2) over the PRIMARY CHANNEL 216 and into the ARITHMETIC & LOGIC CIRCUITS 226, simultaneously with the hundreds order (H) of the CAR 1318 (FIG. 3) passing through ARO, to the ADDRESS EXIT CHANNEL GATE and over the ADDRESS EXIT CHANNEL to the SECONDARY CHANNEL GATE 222 (FIG. 2) for application by the SECONDARY CHANNEL to the ARITHMETIC & LOGIC CIRCUITS 226. The numeric portion of the third character of the increment is added to the hundreds order of the CAR, and the carry, if any, is applied over a CARRY line 2004 to the COMPRESS CIRCUITS 2000. The result of the numeric addition is stored in the hundreds position (H) of the CAR. When the third character of the increment is read out of MEMORY, the A and B zone portion thereof, weighted 1 and 2, are applied by the PRIMARY CHANNEL 216 to the COMPRESS CIRCUIT 2000, where the zone bits are applied to the INDEX INPUT TO ZONE ADDER circuits 2010 (FIG. 1). Also, the 1 and 2 bits which have previously been decoded in the 2/5 TO BINARY CONVERT circuit 2012 are applied to the INDEX INPUT TO ZONE ADDER 2010, so that the A and B zone bits of the third character of the increment may be added to the 1 and 2 bits, respectively of the binary equivalent of the thousands and ten thousands orders of the CAR as determined by the 2/5 TO BINARY CONVERT 2012. The INDEX INPUT TO ZONE ADDER 2010 applies the proper bits to the ZONE ADDER INPUTS 2024 for application the A BIT ZONE ADDER and B BIT ZONE ADDER 2026, 2028. The ARITHMETIC & LOGIC CIRCUIT CARRY on a line 2004 is applied to the A BIT ZONE ADDER 2026. Thus, any carry resulting from adding the numeric portion of the third character of the increment with the hundreds order of the CAR is applied to the A BIT ZONE ADDER, the 1 and 2 bits out of the 2/5 TO BINARY CONVERT and the A and B zone bits of the third character of the increment are also applied to the ZONE ADDER 2026, 2028. Any carry resulting from this addition will set a SPECIAL CARRY latch in the B BIT ZONE ADDER 2028 to thereby generate a SPECIAL CARRY signal on a line 2031. The outputs of the A BIT ZONE ADDER 2026 and B BIT ZONE ADDER 2028 are applied over the two bit bus 2024 to the 1 and 2 positions of the ZONE REGISTER 2006. Now, the ZONE REGISTER 2006 contains 1 and 2 bits (from the hundreds order addition) and 4 and 8 bits (from the units order addition). In order to change the 1, 2, 4 and 8 bits of the ZONE REGISTER into thousands and ten thousands orders in the AAR, two additional X cycles (X4, X5) are required.

In the X4 cycle, the ZONE REGISTER 1 and 2 bits are moved over a two bit bus 2040 to the ADDER OUT CONVERSION circuit 2022 simultaneously with the 4 and 8 bits of the ZONE REGISTER being passed through the INDEX INPUT TO ZONE ADDER 2010, the ZONE ADDER INPUT 2024, to the ZONE ADDER 2026. If there is a SPECIAL CARRY indicated on line 2031, then this carry is added to the 4 and 8 bits as they pass through the adder; if there is no SPECIAL CARRY, then the 4 and 8 bits will pass through the adder circuits without change, into the ADDER OUT CONVERSION 2022.

The ADDER OUT CONVERSION circuit 2022 simultaneously decodes both a thousands order and a ten thousands order for application to a four bit TH bus and a three bit TT bus, respectively, during each of the extra cycles, X4, X5. However, during the X4 cycle, the COMPRESS OUTPUT GATE 2016 will gate only the bits applied on the four bit TH bus to the COMPRESS OUTPUT CHANNEL 2002. Similarly, during the X5 cycle, the COMPRESS OUTPUT GATE 2016 will gate only the bits on the three bit TT bus through to the COMPRESS OUTPUT CHANNEL 2002.

The bits on the COMPRESS OUTPUT CHANNEL 2002 are passed through the RETURN CHANNEL 2ND CHARACTER GATE 230, the RETURN CHANNEL 1ST CHARACTER REGISTER & GATE 234 onto the 1ST CHARACTER portion of the RETURN CHANNEL, for application to the ADDRESS CIRCUITS (FIG. 3) so that the characters may be applied by the ADDRESS ENTRY CHANNEL DECODE & GATE 1324 and the five bit bus 1325 to the thousands (TH), and ten thousands (TT) positions of the AAR 1314, respectively. This completes the indexing operation.

(e) *Summary chart of compress mode indexing*

X1—Read CAR TT & TH through ARO to the 2/5 TO BINARY CONV.; read first character increment out of MEMORY, and UNITS position out of CAR; add zones to CONV. 4 & 8 bits, put result in ZN. REG. 4 & 8; carry is ignored; add UNITS numerics, put numeric result in units position of AAR.

X2—Same as X1 but no zones are used, and TENS position of CAR is added to second char. of increment; result stored in T position of AAR.

X3—Read out third character of increment and add numerics to HUNDS. position of CAR; add zones and numeric carry, if any, to CONV. 1 & 2 bits; put result in ZN REG. 1 & 2; may set SPECIAL CARRY. Put numeric result in HUND pos of AAR.

X4—Read ZN REG. 1 & 2 to ADDER OUT CONV.; read ZN. REG. 4 & 8 to ADDER, along with SPEC. CARRY, to get a final sum of 4 & 8 bits to ADDER OUT CONV.; decode TH and TT orders and store TH in TH of AAR.

X5—Same as X4 but store TT in TT of AAR.

(f) *Compress data*

According to the principles of the present invention, another operation which may be performed is converting expanded, numeric data (no zones), having a given number of characters, into packed data having numeric and zone portions, with a lesser number of characters.

In the embodiment shown herein, a five-character address is converted to a three-character address, character by character, and the resulting characters are stored in MEMORY. This is accomplished by utilizing the BAR to store the address to be compressed. A cycles are utilized so that the AAR may pick the location in MEMORY where the data in BAR is to be stored. The BAR serves as a source of the five character address which is to be compressed into a three character address. In order to keep track of the various orders of the address being handled in successive cycles, the three successive cycles are distinguished by X1, X2, and X3 portions of the X ring (which is utilized in the preceding section during indexing). Thus the first A cycle is distinguished from the second A cycle by the appearance of X1 and X2, respectively.

During the first A cycle, which is accompanied by an X1 signal, the UNITS order of the BAR 1316 (FIG. 3) is read out through the ARO 1302, the ADDRESS EXIT CHANNEL GATE 1308, and 2/5 to BCD CONVERT 1333, and the ADDRESS EXIT CHANNEL 248, to the SECONDARY CHANNEL GATE 222 and onto the SECONDARY CHANNEL 224 (FIG. 2) for application to the RETURN CHANNEL 2ND CHARACTER GATE 230. Simultaneously, the thousands and ten thousands orders of the BAR 1316 (FIG. 3) are read out through ARO 1302 and over the ten bit bus 1328 to the 2/5 TO BINARY CONVERT 2012 (FIG. 1). During this first A cycle, which is identified by X1, the 4 and 8 bit outputs of the 2/5 to BINARY CONVERT 2012 are applied via a four bit bus 2046 to the COMPRESS GATE 2016, which applies these bits as zone bits A and B, respectively, on the COMPRESS OUTPUT CHANNEL 2002 for application to the RETURN CHANNEL 2ND CHARACTER GATE 230 (FIG. 2). The units numeric portion which has been applied to the RETURN CHANNEL 2ND CHARACTER GATE via the SECONDARY CHANNEL 224 will be combined with the A and B zone bits applied thereto by the COMPRESS CIRCUITS 2000. Thus a first character of a three-character address has been generated which includes the units numeric portion of the five-character address original stored in BAR and also includes A and B zone bits which reflect parts of the total binary value of the thousands and ten thousands orders of the five character address in the BAR. This first character is passed over the RETURN CHANNEL to the MEMORY REGENERATE & LOAD circuit 238 for application to the MEMORY 201 in a manner which is described in said copending application Ser. No. 332,648.

In the second A cycle (which is identified by X2), the tens order of the BAR 1316 (FIG. 3) is read out through the ARO 1302 onto the ADDRESS BUS 1300, through the ADDRESS EXIT CHANNEL GATE, the 2/5 TO BCD CONVERT, onto the ADDRESS EXIT CHANNEL 248, through the SECONDARY CHANNEL GATE 222 to the SECONDARY CHANNEL 224, through the RETURN CHANNEL 2ND CHARACTER GATE 230, over the RETURN CHANNEL and to MEMORY as described hereinbefore. No zones are included in this operation since the packed format in the present embodiment includes zones only in the units and hundreds characters, the tens order zones being reserved for indexing tags, as described in Section 3*d*, hereinbefore.

In the third A cycle, which is characterized by X3, an operation similar to that described with respect to X1 is performed, the hundreds order of the BAR being read out through the ADDRESS EXIT CHANNEL 248 through the RETURN CHANNEL 2ND CHARACTER GATE 230 (FIG. 2), and simultaneously, the thousands and ten thousands orders are read out through ARO 1302 (FIG. 3) over the ten-bit bus 1328 to the 2/5 TO BINARY CONVERT 2012 (FIG. 1); in this cycle (X3), the binary 1 and 2 bits are passed from the 2/5 to BINARY CONVERT from over the four bit bus 2046, to the COMPRESS OUTPUT GATE 2016 (the 4 and 8 bits having been read out during the X1 cycle). Thus A and B zone bits are again supplied over the COMPRESS OUTPUT CHANNEL 2002, to the RETURN CHANNEL 2ND CHARACTER GATE 230 (FIG. 2) so that a total third character comprising both numeric and zone portions is applied to the RETURN CHANNEL for storage in MEMORY 201.

In summation, three successive cycles are taken to compress the data from a five-character address to a three-character address with zone bits in the units and hundreds characters which reflect the content of the thousands and ten thousands orders of the five-character address. The first cycle combines the units information with the 4 and 8 bit portions of the thousands and ten thousands information, the second cycle stores the tens information by itself, and a third cycle combines the hundreds numeric portion with the 1 and 2 bit portion of the thousands and ten thousands orders of the original five character address; all three resulting characters being stored in memory.

(*g*) *Summary chart of compress data*

X1—Read out TH & TT positions of BAR through ARO to 2/5 TO BINARY CONVERT; read out UNITS position of BAR through ADDRESS EXIT CHAN and SEC CHAN to RETURN CHAN; gate BIN. CONV. 4 & 8 into A & B zones of RETURN CHAN; store character having numeric and zone portions in MEMORY.

X2—Read out TENS position of BAR thru ADDR EXIT CHAN, SEC. CHAN & RETURN CHAN, and store in MEMORY.

X3—Same as X1 (above) except HUNDS position of BAR is combined with CONV. BIN 1 & 2 bits.

(*h*) *Compress add*

In accordance with this invention, another operation which may be performed is adding two compressed operands together to form a compressed result without having to separately expand the data in special preprocessing operation prior to adding. In effect, any combination of characters which includes a pair of numeric portions having two zone portions thereover, or in any equivalent format, may be added in that format, and the result stored in memory in that format. In the particular embodiment shown herein, a pair of three-character operands, each having zone bits in the units and hundreds orders thereof, are added together; the zone bits comprising a binary representation of a thousands order and a ten thousands order of an equivalent five-character operand. To achieve this operation, characters are read out of memory one character at a time, characters of the A field operand being read out in A cycles, which are interleaved with B cycles used for reading out characters of the B field operand; this A field and B field read out is fully described in said copending application Ser. No. 332,648. A special control is provided to keep track of the units, tens and hundreds, as well as a possible special carry correction cycle, which may be required as is described hereinafter in this action.

The first occurrence is the reading out of the first, units order character of an A field during an A cycle; the zones are passed over the PRIMARY CHANNEL 216 to the COMPRESS CIRCUITS 2000 (FIG. 2) and are placed in the 4 and 8 positions of the ZONE REGISTER 2006 (FIG. 1). The numerics are stored in the Y register 248 (FIG. 2) of the SECONDARY CHANNEL REGISTERS 218. Then follows a B cycle wherein the first character, the units order, of the B field operand is read out, the zone bits being applied directly to the COM- PRESS ADD INPUT TO ZONE ADDER 2008 (FIG. 1) the numerics being applied directly to the ARITHMETIC & LOGIC CIRCUITS 226 (FIG. 2). At the same time, the A field numerics are gated out of the SECONDARY CHANNEL REGISTERS 218, through the SECONDARY CHANNEL GATE 222, and into the ARITHMETIC & LOGIC CIRCUITS 226 for adding with the numeric portion of the B field character; also, the 4 and 8 bits of the ZONE REGISTER 2006 are gated over the two bit bus 2042 into the COMPRESS ADD INPUT TO ZONE ADDER 2008. In other words, the A field character is brought out and the numerics and zone portions are temporarily stored; in the next cycle, the B field character is brought out and applied to the numeric and zone adders, and the A field character which has previously been stored is gated to said adders so that addition may take place. The COMPRESS ADD INPUT TO ZONE ADDER 2008 (FIG. 1) applies the B field zone bits and the ZONE REGISTER four and eight bits through the ZONE ADDER INPUTS 2024 to the ZONE ADDERs 2026, 2028, the result passing through the ADDER OUT CONVERSION 2022, and the COMPRESS OUTPUT CHANNEL 2002, to the RETURN CHANNEL 2ND character gate. If any carry occurs out of the B BIT ZONE ADDER 2028, it is ignored. If a carry occurs out of the ARITHMETIC & LOGIC CIRCUITS 2026, the carry is retained there to be used in the next addition of numeric operands. The results of the numeric and zone additions are combined in the RETURN CHANNEL 2ND CHARACTER GATE to form a result character having numeric and zone portions which is stored in MEMORY.

Following this, a second A cycle is taken within which the second character of the A field operand, which represents the tens order of said operand, is read out of MEMORY, and the numeric portion is stored in the Y register 248 of the SECONDARY CHANNEL REGISTERS 218 (as in the previous case). If there are any zones in the tens character, the zones are ignored. Then a B cycle is taken, wherein the second character of the B field operand, the tens order of said operand, is read out and applied directly to the ARITHMETIC & LOGIC CIRCUIT 226, simultaneously with the gating of the A field character from the Y register 248 through the SECONDARY CHANNEL GATE 222. The result is passed through the RETURN CHANNEL 2ND CHARACTER GATE 230 over the RETURN CHANNEL for storage in MEMORY. If any carry results, the carry is preserved within the ARITHMETIC & LOGIC CIRCUITS 226 for application to the addition of the numeric portions of the next character to be read out.

Next, another A cycle is taken to access the third character of the A field operand, which represents the hundreds order of said operand. The numeric portion is again stored in the Y register 248, and the zone portion is applied to the 1 and 2 bit positions of the ZONE REGISTER 2006 (FIG. 1). Then a B cycle is taken and the third character of the B field operand is read out. Said character representing the hundreds order of said operand. The numeric portion is applied directly to the ARITHMETIC & LOGIC CIRCUITS for addition to the A field numeric portion which has been stored in the Y register 248, and is simultaneously gated to the ARITHMETIC & LOGIC CIRCUITS. The zone portions are applied directly to the COMPRESS ADD INPUT ZONE ADDER 2008 (FIG. 1) simultaneously with the gating out from the ZONE REGISTER 2006 of the A field character 1 and 2 bits which were previously stored therein during the A cycle. As before, the zone bits are added in the ZONE ADDERs 2026, 2028 and the result is passed through ADDER OUT CONVERSION, over the COMPRESS OUTPUT CHANNEL, to the RETURN CHANNEL 2ND CHARACTER BUS. In this case, a carry resulting from adding the numeric portions of the hundreds orders of the operands in the ARITHMETIC & LOGIC CIRCUITS 226 (FIG. 2) is applied over a line 2004 to the A BIT ZONE ADDER 2026 (FIG. 1) so that the carry from the hundreds numerics is directly applied to the 1 and 2 bits of the zones, and participates in the total result to be achieved by adding the zones of the A field to the zones of the B field (for the hundreds character). If there is a carry out of the B BIT ZONE ADDER 2028, it sets a SPECIAL CARRY latch within the B BIT ZONE ADDER 2028, to indicate a carry on the SPECIAL CARRY line 2031. In this event, another B cycle must be taken in order to cause the carry from the 1 and 2 zone sum to be reflected in the 4 and 8 zone bits of the B field units order. The reason for this is more apparent with examination of FIG. 6 (sheet 5), which is described in Section 4*b* hereinafter. It can be seen that the carry out of the hundreds order numerics cannot be known until the hundreds numerics are added, and therefore the 1 and 2 zone bits are placed in the character with the hundreds so that the carry from the high order numerics may be added to the low order zones in the same cycle in which the high order numerics are added. However, if adding the A field and B field 1 and 2 bits results in a carry, then this will have to be reflected in the summation of the A and B field 4 and 8 bits which have already been stored in the units character. Thus, if there is to be a carry from the 2 bit into the 4 bit, it is necessary to again access the units order of the result field, so that the 4 and 8 bits can take into account the carry from the 2 bit. In order to achieve this, the UNITS latch is again set, a B cycle is taken, and the SPECIAL CARRY latch having been set, this is identified as a correction cycle (due to the SPECIAL CARRY). In this case, the B field character is read out, the numeric portion passing directly into the RETURN CHANNEL 2ND CHARACTER GATE 230 (FIG. 2), and the zone portions passing into the COMPRESS ADD INPUT TO ZONE ADDER 2008 (FIG. 1) so that the special carry can be added to the 4 and 8 bits. A carry in this result is ignored. The result is applied by the COMPRESS OUTPUT CHANNEL 2002 (as described hereinbefore, this section) to the RETURN CHANNEL 2ND CHARACTER GATE 230 (FIG. 2) so that a total units character including the updated A and B bits (reflecting a carry from the 1 and 2 bits into the 4 and 8 bits) will accompany the original numeric results which were achieved during the very first cycle of this operation; the result is returned to the same location in the B field within the MEMORY 201.

In summation, a COMPRESS ADD operation calls for adding two operands, each having three characters, the units and hundreds order containing zone bits indicative of fourth and fifth characters of an equivalent five-character operand. The units numerics and zones of the A and B fields are added and returned to the B field units location, then the tens order numerics are added and returned to the tens position of the B field in memory. Next, the numeric and zones of the hundreds order of the A field and B field are added and returned to the hundreds positions of the B field in memory; carries from the numeric portions are applied successively from units to tens and from tens to hundreds, and a carry from the hundreds numeric portions is reflected immediately in the hundreds zones portions (which represent the 1 and 2 bits of the hexidecimal value of the equivalent additional two characters); a carry from the one and two bits causes a SPECIAL CARRY latch to be set which results in a corrective B cycle being taken, to permit the carry from the 2 bit to be reflected in the 4 and 8 bits, the 4 and 8 bits being represented by A and B zone bits in the units order of the result. Thus, data in a compressed format may be read out, added, and returned to storage, without any unpacking of the data required other than that which is automatically handled by the apparatus in accordance with this invention.

(*i*) *Summary chart of compress add*

A CYCLE UNITS—Read out first character of A field; put zones in ZONE REG. 4 & 8; put numerics in SECOND CHANNEL REGISTER (FIG. 2).

B CYCLE UNITS—Read out first character of B field gate zones to ZONE ADDER and gate ZONE REGISTER 4 and 8 into ZONE ADDER at same time; put numerics in ARITHMETIC & LOGIC CIRCUIT and gate SECOND REGISTER, to ARITHMETIC & LOGIC at same time; use ARITHMETIC & LOGIC numeric sum and ZONE ADD A & B sums to form character in RETURN CHANNEL: store in B field of MEMORY. Zone carry is ignored: numeric carry is propogated to next order numerics. Set ARITHMETIC & LOGIC carry, if any.

A CYCLE TENS—Read out second character of A field and store in SECOND REGISTER.

B CYCLE TENS—Read out second character of B field to ARITHMETIC & LOGIC, gate SECOND REGISTER to ARITHMETIC & LOGIC; use carry in from units numerics; store sum in B field, set ARITHMETIC & LOGIC carry, if any.

A CYCLE HUNDS—Same as UNITS but for third character of A field, and zones go to ZONE REGISTER 1 and 2 positions.

B CYCLE HUNDS—Same as units, but for third character of B field. A and B field HUNDS numerics, and the carry retained from the previous TENS add, are added, and the resultant numeric carry (if any) is applied to ZONE ADDER. Zones are then added, and a carry from the zone add sets the SPECIAL CARRY LATCH.

B CYCLE SPECIAL CARRY UNITS—Read out first character of B field (which includes 4 & 8 zone bits), put zones into ZONE ADDER to have SPECIAL CARRY added thereto (numerics are unchanged), store result in B field; (this is correction cycle used only if HUND zones generate a carry). A carry generated by this add is ignored.

(4) FORMATS AND TIMING (*a*) *Cycles*

Figure 4:
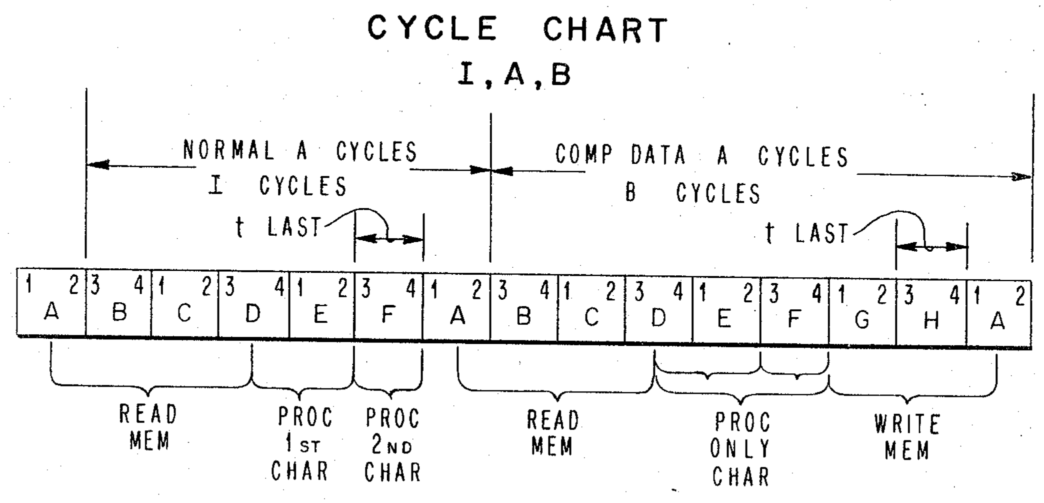

Referring briefly to FIG. 4, the timing of the system shown in FIG. 2 is illustrated as inclusive of various types of cycles, each of which is subdivided into times A–F or times A–H, in dependence upon whether writing into MEMORY is to be effected at the end of the cycle, or not. For instance, a normal A cycle, which accesses one or more A field characters in MEMORY, begins with a B time and ends with an A time following an F time, the last half of D time (D4) and all of E time being utilized for processing a first character read from memory. In the present embodiment, only single character processing is utilized, so that the PROCESS 2ND CHARACTER time (time F) is not utilized as such during the COMPRESS MODE operations being described herein; rather, the single character is processed in times D4, E, and F (see right side of FIG. 4).

I cycles are identical with normal A cycles in terms of timing and format, as shown in the right-hand side of FIG. 4. On the contrary, B cycles and A cycles used in a COMPRESS DATA operation resemble I cycles or A cycles except that an extra pair of times, G and H, are utilized for writing into memory along with the first half of A time (which follows at the end of the cycle rather than at the start of the cycle). The nomenclature in the center of the B cycle illustration (at the right of FIG. 4) illustrates that when only a single character can be processed (as during the COMPRESS MODE disclosed herein), processing time will include both the first and second character processing times (which are illustrated at the left-hand side of FIG. 4).

Figure 5:
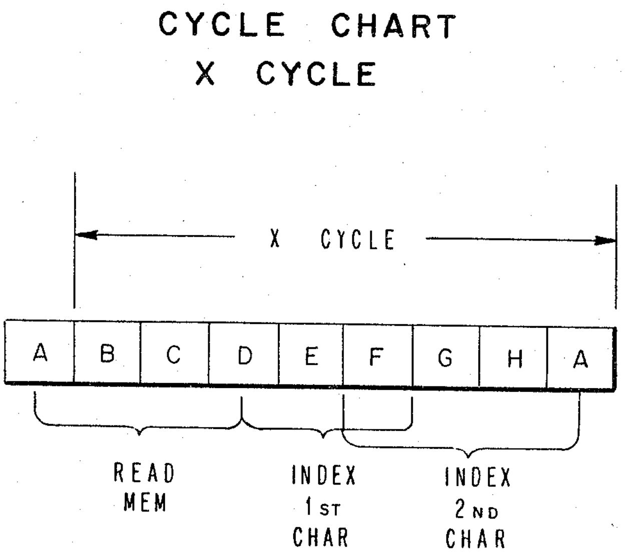

In FIG. 5, an X cycle is illustrated for normal two-character processing. However, in the present embodiment, only the times included in D, E, and F are utilized since only a single character is indexed at one time due to the COMPRESS MODE considerations herein involved.

(*b*) *Compress format*

Referring briefly to FIG. 6, a three-character operand which may be equivalent to a five-character operand is illustrated. Notice that each character comprises both numerals and zones, the numerals being represented in a binary coded decimal fashion by the binary bits 1, 2, 4, and 8. The zones A and B may represent binary values 1 and 2 or binary values 4 and 8 in dependence upon which order of the operand they are associated with. For instance, in the units order, A has the value of 4 and B has the value of 8; in the hundreds, A has the value of 1 and B has the value of 2. The reason for this is simply that the carries from the hundreds order into a thousands order must take place after the hundreds order has been handled, which in turn can take place only after the tens order has been handled so that the carry from the tens may be applied to the hundreds; thus, the earliest time that a carry from numerals into zones may be effected, is when the hundreds numeric have been handled. This saves on extra correction cycles by allowing the hundreds to carry directly into their own zones during the same cycles within which the hundreds are added; following that, any carry out of the addition of the 1 and 2 bits (in the hundreds order character) may take place into the 4 and 8 bits (in the units order character) with a special correction cycle, as described in Section 3*h*, hereinbefore. Notice that the zones over the tens position are not involved in a packed format, but rather represent index values as is illustrated in the environmental system of said copending application, Ser. No. 332,648. As shown therein, the combination of A and B bits not only indicate that indexing is required, but choose the index registers to be utilized by causing corresponding addresses (such as addresses 00085, 00090, or 00095) to be generated to access a location storing the first character of an increment, and successive characters being achieved from adjacent, successively lower-addressed ones of the locations associated with said first address to form an index register in memory. For instance, if the A bit appeared alone over the tens position of the operand, this would indicate that the increment is to be taken from an index register included in addresses 00085 through 00089, the first character of the increment being stored at address 00085, and a final increment of a five character address being stored at address 00089. In this embodiment however, it is possible to perform indexing by means of three-character increments, the increments themselves having the same format as the operand shown in FIG. 6. However, an indexing increment (accessed from an index register) could not itself call for indexing, and therefore zones in the tens position of an indexing increment are absolutely ignored.

(*c*) *Codes*

The codes involved in this embodiment are illustrated in FIG. 7. At the right-hand half of FIG. 7, the two-out-of-five code (215) for ten thousands and thousands positions of an address are illustrated, and these may be compared against the absolute decimal values 0–15 (which are shown in the center of FIG. 7) and the corresponding binary values which comprise the bits 1, 2, 4, and 8 in combination (as shown at the left of FIG. 7). Notice that the thousands position of an address as represented in FIG. 7 merely represents decimal values 0 through 9, and in combination with the ten thousands position (0 or 1), may represent values from 0 through 15. These positions are illustrated due to the fact that the present embodiment is illustrated in an environment wherein five character addresses and three character addresses may both be utilized, in a variety of fashions which are described in respective subsections of Section 3, hereinbefore.

(5) DETAILED DESCRIPTION OF COMPRESS CIRCUITS

(a) Generally

The purpose and general operation of COMPRESS CIRCUITS (FIG. 1) have been described in Section 3, hereinbefore. Each of the units shown in FIG. 1 is described in detail in a corresponding subsequent subsection within this section. In the following descriptions, the detailed operation of the circuit it is related generally to a corresponding, preceding discussion, but a reiteration of how the COMPRESS CIRCUITS work in general is not included therein.

(b) 2/5 to binary convert

Figure 8:
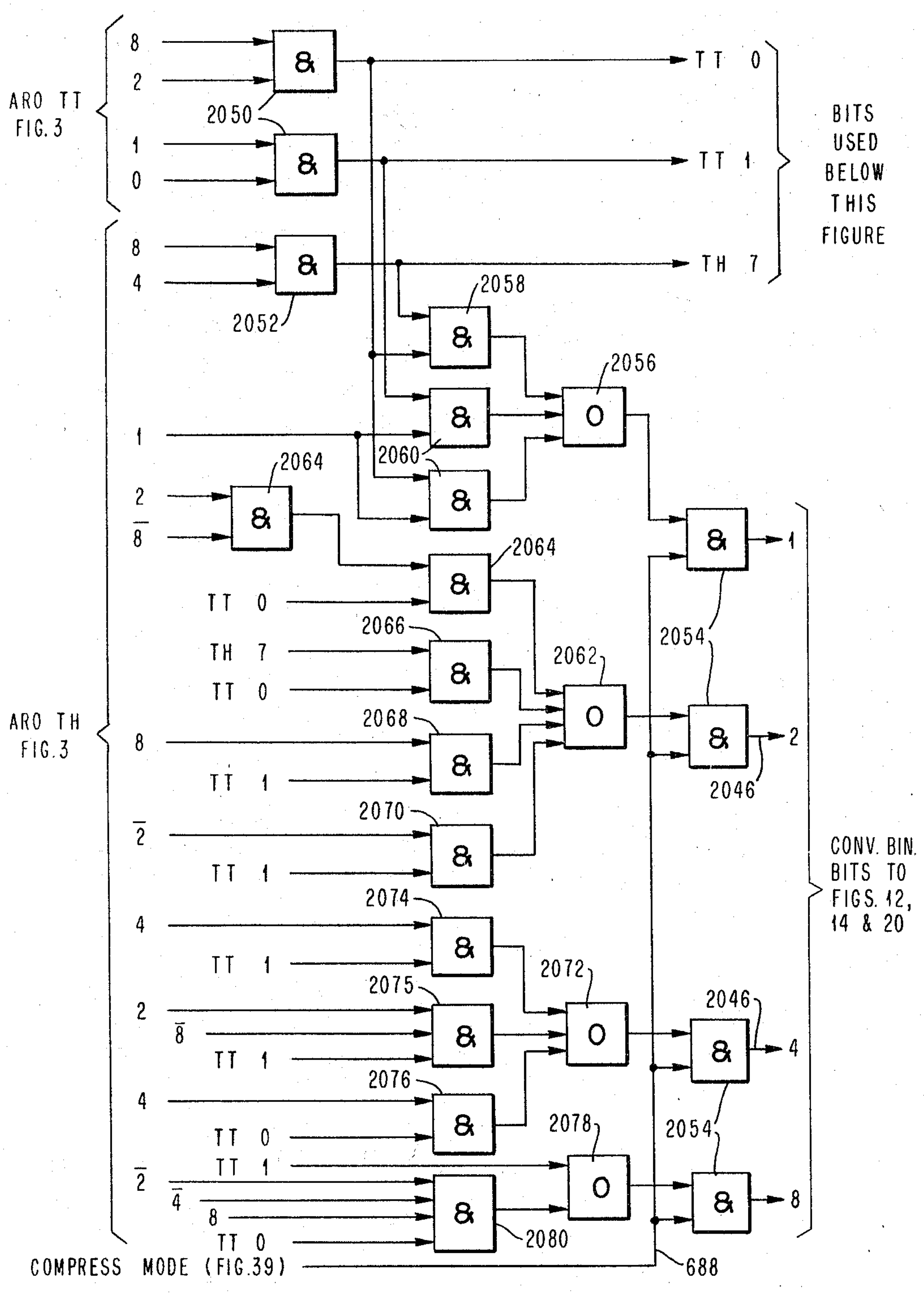

The 2/5 TO BINARY CONVERT circuit 2012 is shown in detail in FIG. 8 (sheet 7). At the top of FIG. 8, a pair of AND circuits 2050 decode ten thousands 0 and 1 bits from the ARO TT 8, 2 bits and 1, 0 bits, respectively. An AND circuit 2052 decodes a thousands 7 bit from the ARO thousands 8 and 4 bits (see FIG. 7). Each of the bits decoded by the AND circuit 2050, 2052 are utilized in remaining circuit of FIG. 8 to generate the CONVERT BINARY 1, 2, 4, and 8 bits whenever a plurality of AND circuits 2054 are gated by a COMPRESS MODE signal on line 688 (which is generated in FIG. 39 of said copending application, Ser. No. 332,648). In this description it should be borne in mind that all figures in parenthesis refer to figures of said copending application, and figures not in parenthesis refer to figures of this application.

In FIG. 8 and OR circuit 2056 responds to an AND circuit 2058, involved provided that the ten thousands bit is 0 (due to the fact that only values of 0 to 15 are to be converted). Additionally, the OR circuit 2056 may respond to a pair of AND circuits 2060 whenever a thousands 1 bit is present with either a ten thousands 0 or a ten thousands 1 bit. Thus, the OR circuit 2056 will generate 1 whenever an odd number is involved.

An OR circuit 2062 will generate a binary 2 for any of the values shown in FIG. 6 to require a binary 2 bit; these include decimal values of 0, 2, 3, 6, 7, 10, 11, 14 or 15. The manner in which this is done is not quite straightforward since a saving in hardware results by doing it as shown in FIG. 8. The AND circuit 2064 takes care of values 2, 3, and 6, since the 2/5 code for the value seven is an 8 bit and a 4 bit, rather than the 1, 2, and 4 bit used in the binary code. An AND circuit 2066 generates a binary 2 bit for the binary value of seven whenever a thousands 7 is indicated by the AND circuit 2052 (at the top of FIG. 8). An AND circuit 2068 generates a binary 2 bit in the case when the decimal value ten is indicated, and an AND circuit 2070 generates a binary 2 bit for decimal values of eleven, fourteen and fifteen, which values do not have a 2 bit in the 2/5 two character representation at the left-hand half of FIG. 7, but do include a 2 bit in the binary representation shown in the right-hand half of FIG. 7.

An OR circuit 2072 generates a binary 4 bit in response to any one of three AND circuits: an AND circuit 2074 creates a binary 4 bit for decimal values fourteen and fifteen; an AND circuit 2075 creates a binary 4 bit for decimal values twelve and thirteen; and an AND circuit 2076 creates a binary 4 bit for decimal values four through seven.

An OR circuit 2078 generates binary 8 in response to the ten thousands 1 line, which includes all the values ten through fifteen, and in response to an AND circuit 2080 which is operative in response to decimal values of eight and nine.

Thus, the circuit in FIG. 8 takes the thousands and ten thousands positions in 2/5 code from ARO, and converts them to a single hexidecimal representation in pure binary notation comprising four bits representing decimal values zero through fifteen.

(c) Zone register load controls

Figure 9:
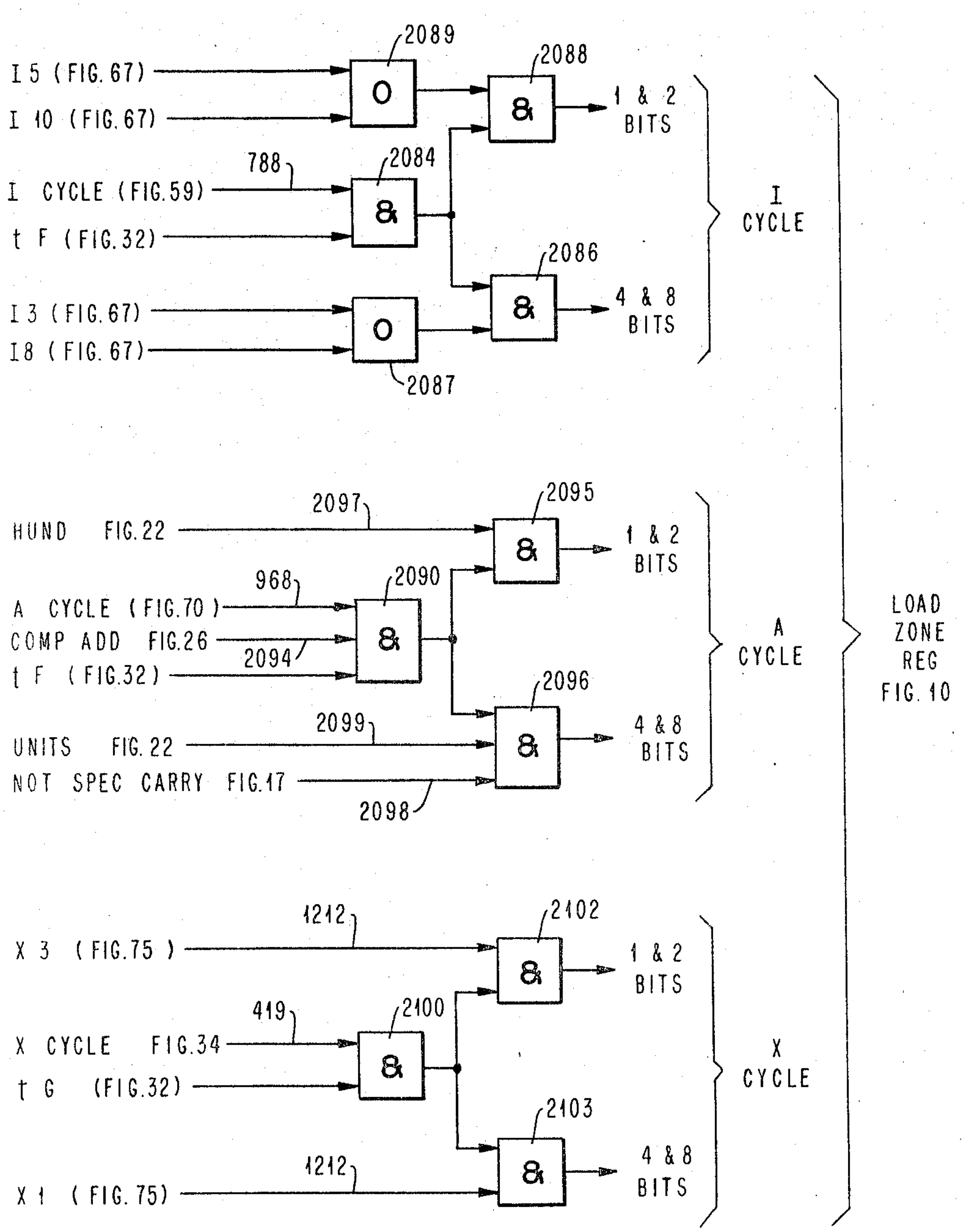

Referring to FIG. 9 (sheet 8), three separate circuits generate gating signals for the ZONE REGISTER 2006 (see FIG. 1) for I cycles, A cycles, and X cycles, respectively.

During I cycles, an AND circuit 2084 will be operative at every time *t*F in order to control two related AND circuits 2086, 2088, which respond at I3 and I8 time (2087), and at I5 and I10 time (2089) respectively. Thus, as described in Sections 3*b* and 3*c*, hereinbefore, the 4 and 8 bits (which accompany the units position of an address in the compressed format) will be gated into the zone register at I3 time (which is the time that the first character of the first address of an instruction is read out), and again will be gated into the zone register at I8 time (which is the time that the first character of the second address of an instruction in read out). The 1 and 2 bits are located in the hundreds order character (which is the third character of an address) so that the 1 and 2 bit gates are generated by the AND circuit 2088 at I5 time (for the first address read out) and at I10 time (for the second address read out).

During an A CYCLE (968) at time *t*F, an AND circuit 2090 (center of FIG. 9) will be operative, provided there is a COMPRESS ADD SIGNAL on line 2094. This controls two AND circuits 2095, 2096 for generating gating signals which gate bits of the HUNDS order (2097) and the 1 and 2 bit positions of the ZONE REGISTER, and for gating bits of the UNITS order (2099) into the 4 and 8 bit positions of the ZONE REGISTER, respectively. The AND circuit 2096 is not operative during the SPECIAL CARRY correction cycle mentioned in Sections 3*h* and 3*i*, hereinbefore, due to the NOT SPECIAL CARRY signal on line 2098.

During each time *t*G of an X CYCLE (419), an AND circuit 2100 (bottom of FIG. 9) enables a related pair of AND circuits 2102, 2103 which respectively gate the 1 and 2 bits during an X3 cycle and the 4 and 8 bits during an X1 cycle.

Thus, in each of the circuits shown in FIG. 9, the ZONE REGISTER is gated first to store the 4 and 8 bits, and then to store the 1 and 2 bits into the ZONE REGISTER, as called for in the corresponding operations described in Section 3, hereinbefore.

(d) Zone register

The ZONE REGISTER comprises four latches 2104–2107, each of which responds to corresponding signals of FIG. 9. Specifically the latch 2104 may be set by an OR circuit 2108 in response to any one of three AND circuits 2110–2112 which respond respectively during I, A and X cycles providing there is a corresponding A zone bit from the PRIMARY CHANNEL 216 or a ZONE ADD A SUM (2042) from the ZONE ADDER.

Similarly, the latch 2105 may be set by an OR circuit 2114 in response to any one of three AND circuits 2116–2118 in response, respectively, to I, A or X cycles (FIG. 9) in dependence upon a B bit from the PRIMARY CHANNEL 216 or a ZONE ADD B SUM (2270) from the B BIT ZONE ADDER.

The latches 2106, 2107 are set by corresponding signals from FIG. 9 and related A and B zone bits (216) and A and B SUMS (2242, 2270), in the same manner as latches 2104, 2105 described in the preceding two paragraphs.

The latches 2104–2107 are reset by an OR circuit 2120 in response to either one of two AND circuits 2122–2124 which are responsive at time *t*C. The AND circuit 2122 responds to an X2 signal on a line 1212 and an OR circuit 2126, and the AND circuit 2124 responds to an I CYCLE signal on a line 788 and an OR circuit 2028.

The OR circuit 2126 will generate a signal during an X cycle 419 or an A CYCLE 968, and the OR circuit 2128 generates a signal at I3, I8, and I11 cycles of an instruction read-out operation. The OR circuit 2128 thereby contributes to the re-setting of the latches 2104–2107 during time *t*C (of the first cycles during an instruction read-out wherein zone bits may be set into the latches) which is just prior to the time the bits would be set therein. This occurs in I3 and I8 cycles. Furthermore, the latches are reset when they are no longer used for instruction read-out, which occurs in the I11 cycle; I11 is the cycle following the last cycle in which the contents of the zone register are required for COMPRESS MODE instruction readout. The AND circuit 2122 causes the latches 2104–2107 to be reset during indexing by the X2 signal on line 1212 in order to clear the ZONE REGISTER prior to setting therein zone bits derived from a current indexing operation, as described in Section 3*d*, hereinbefore.

Thus, each of the latches 2104–2107 is set and reset at times in accordance with the description of the various operations given in Section 3, hereinbefore.

(*e*) *Compress add input to zone adder*

Figure 11:
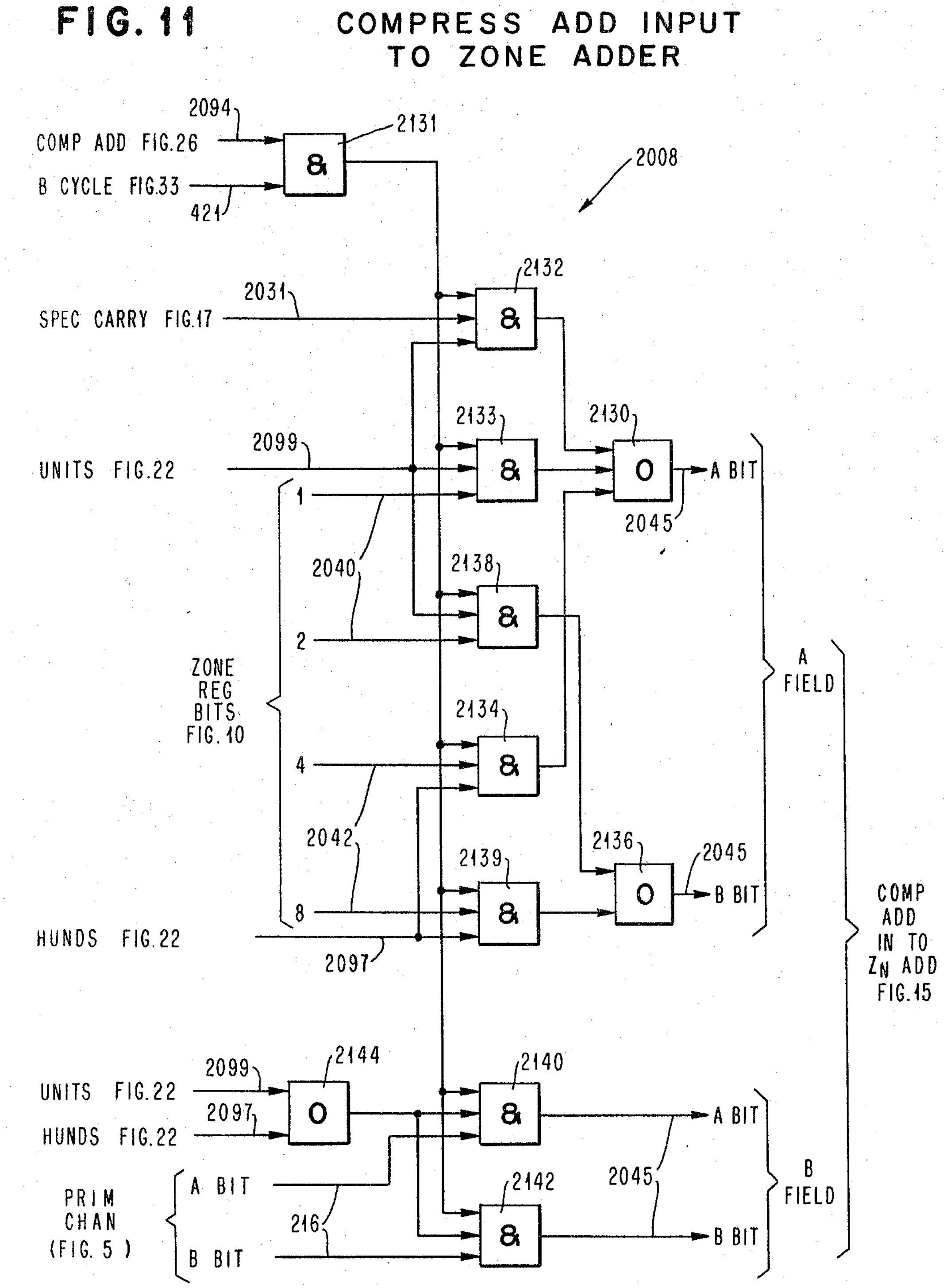

The COMPRESS ADD INPUT TO ZONE ADDER circuit 2014 is shown in FIG. 11 (sheet 10). This circuit is capable of supplying an A field pair of zone bits and a B field pair of zone bits, each field including an A zone bit and a B zone bit. Specifically, the OR circuit 2130 may respond to any one of three AND circuits 2132–2134.

During a B cycle of a COMPRESS ADD operation an AND circuit 2131 (top of FIG. 11) will enable the AND circuits 2132–2134 to respond to a SPECIAL CARRY input (2031, 2132) or a 1-bit input (2040, 2133) during a UNITS cycle (2099), or to a 4-bit (2042, 2134) during a HUNDREDS cycle (HUNDS, 2097).

Similarly, an OR circuit 2136 may respond to either one of two AND circuits 2138, 2139 in response to a 2-bit (2040, 2138) during a UNITS cycle (2099) or an 8-bit (2042, 2139) during a HUNDREDS cycle (HUNDS 2097). Thus the OR circuits 2130, 2136 comprise the A bit and B bit inputs, respectively, of the A field portion of the COMPRESS ADD INPUT TO ZONE ADDER circuits.

Also, a pair of AND circuits 2140, 2142 generate the A bit and B bit inputs, respectively, of the B field COMPRESS ADD INPUT TO ZONE ADDER bits in response to A and B bits of the PRIMARY CHANNEL 216 concurrently with either UNITS or HUNDS excitation of an OR circuit 2144 during B cycles of a COMPRESS ADD operation (2131).

As described in Section 3*h*, hereinbefore, during a COMPRESS ADD operation, an A field UNITS character is read out of memory, the numeric portion being placed in the SECONDARY REGISTER, and the zone portion being placed in the 4- and 8-bit positions of the ZONE REGISTER; then a B cycle is taken, and the numeric portion of the B field character is gated into the ARITHMETIC & LOGIC CIRCUITS with the numeric portion of the A field character which is stored in the SECONDARY REGISTER. At this same time, A and B bits are read from the PRIMARY CHANNEL to comprise a B field input to the zone adder (through ANDs 2140, 2142) simultaneously with the 4- and 8-bits being gated by the AND circuits 2134, 2139 into the A and B bit portions of the A field COMPRESS ADD INPUT TO ZONE ADDER, as shown in FIG. 11. This is repeated for the HUNDS position of the fields using ANDs 2133, 2138 and 2140, 2142.

(*f*) *Compress data input to zone adder*

Figure 12:
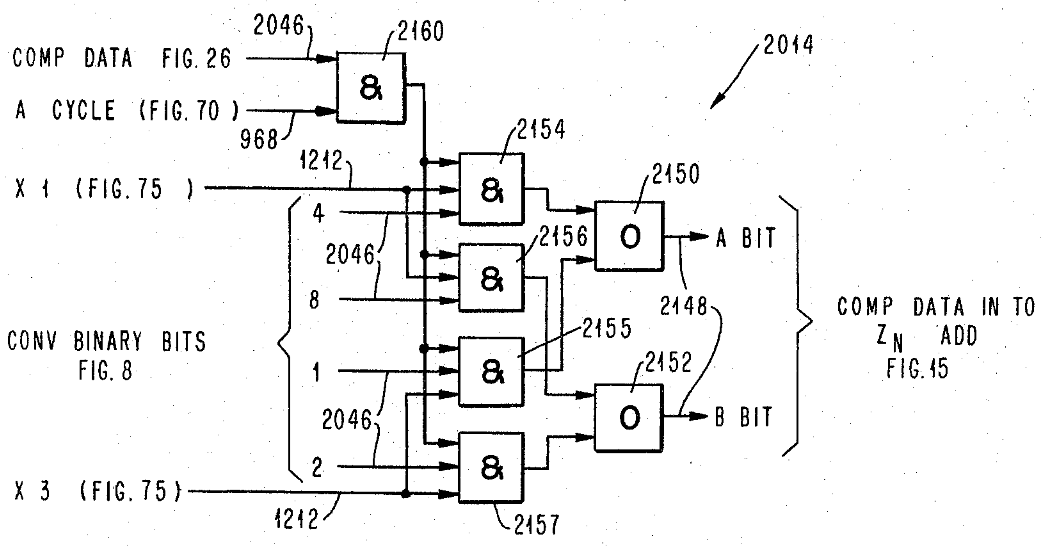

In FIG. 12 (sheet 11) the A and B bits of the COMPRESS DATA TO ZONE ADDER comprises A and B bits on a pair of lines 2148 which are respectively generated by a pair of OR circuits 2150, 2152, in response to AND circuits 2154, 2155, and 2156, 2157, respectively. In a COMPRESS DATA operation, three A cycles (2160) are used, and these are distinguished by X times X1, X2, X3. During X1 time, the UNITS order of the data is being utilized, so that the 4-bit and 8-bit are gated through the AND circuits 2154, 2156 by the X1 signal. During the X2, or second cycle, no COMPRESS MODE zones are utilized. During the X3, or third cycle, the HUNDS (hundreds) order is utilized, and the BINARY CONVERT 1-bit and 2-bit on lines 2046 are gated through the AND circuits 2155, 2157 by the X3 signal on line 1212. The operation of COMPRESS DATA is described more fully in Sections 3*f* and 3*g*, hereinbefore.

(*g*) *Expand data input to zone adder*

Figure 13:
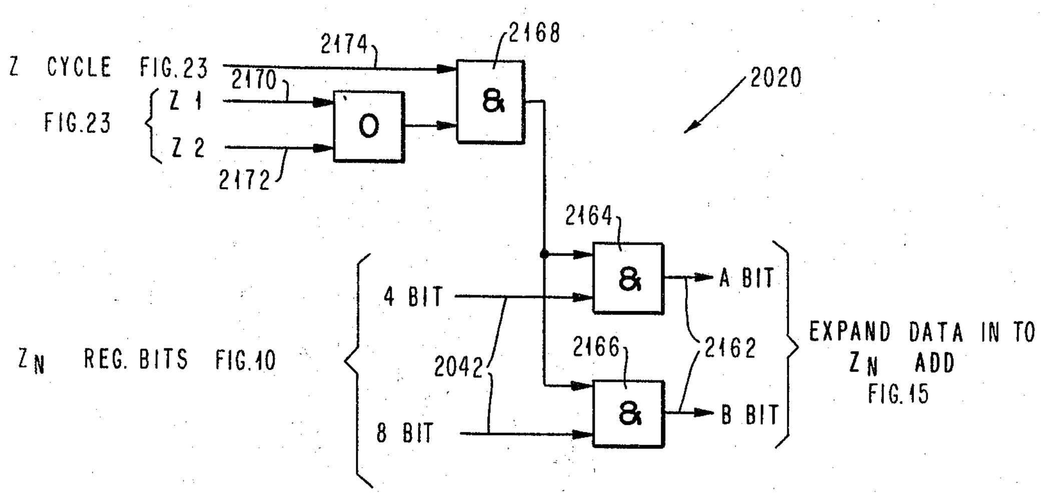
Figure 18:
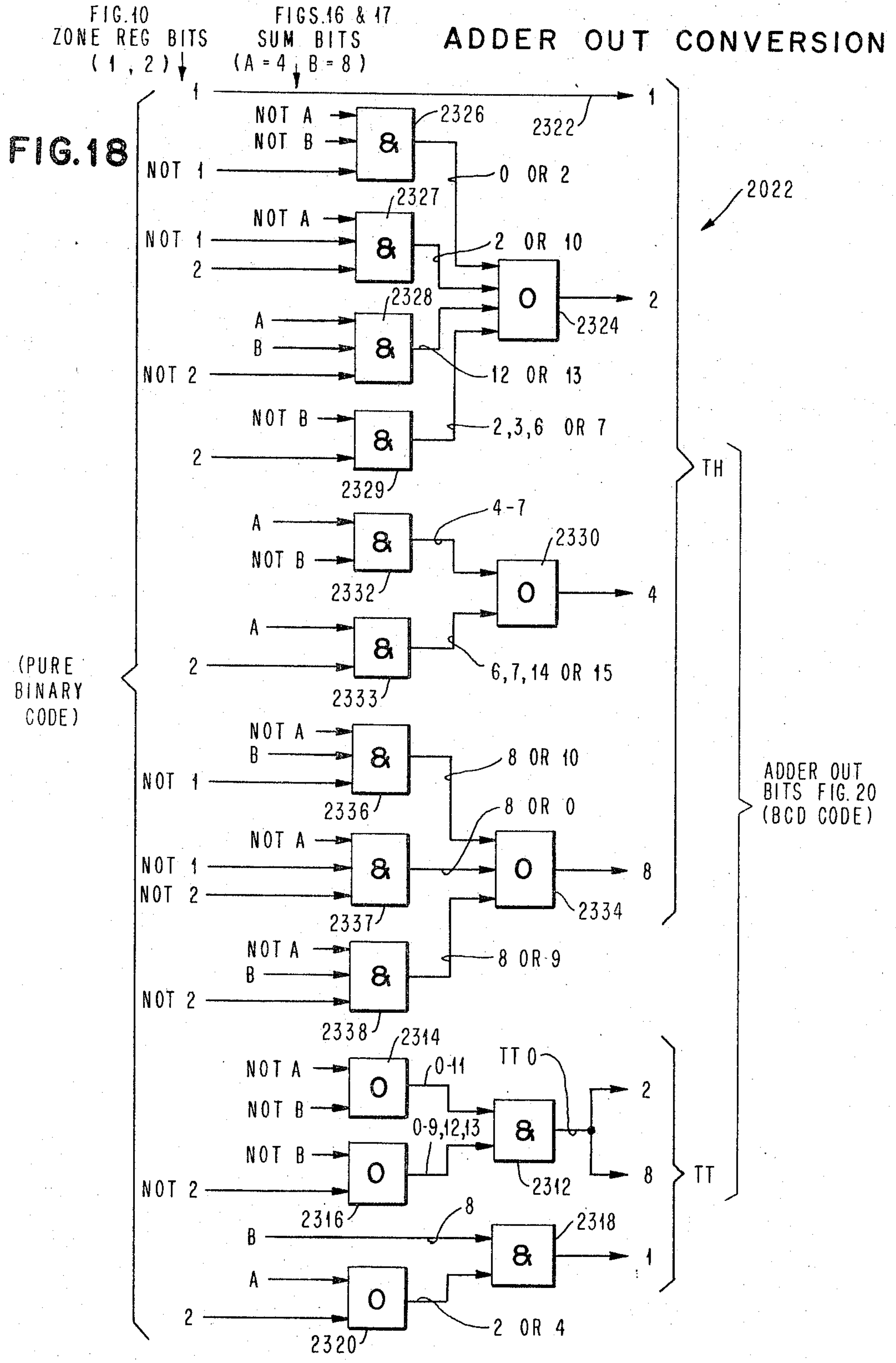

In FIG. 13 (sheet 11) A- and B-bit inputs to the ZONE ADDER are generated on a pair of lines 2162 by related AND circuits 2164, 2166 in response to respectively corresponding ZONE REGISTER 4- and 8-bits on lines 2042, in dependence upon an AND circuit 2168 recognizing Z1 (2170) and Z2 (2172) portions of a Z CYCLE (2174). Z cycles can occur only during an EXPAND DATA operation. During an EXPAND DATA operation, three characters are read from memory and the numeric portions are stored in units, tens, and hundreds position of either the AAR and CAR or the BAR and DAR, dependent on whether it is first or second address time. As the three characters are read out, any zone bits of the first and third characters are placed in the zone register. Following the three cycles required to read the characters out, two Z cycles are taken, and in both of these cycles all four zone bits are read from the ZONE REGISTER to the ADDER OUT CONVERSION CIRCUIT 2022 (FIG. 18). The 4- and 8-bits are passed through the ZONE ADDER (the adder being used merely as a data path), while the 1- and 2-bits being passed directly over the two bit bus 2040 to the adder out conversion circuit 2022 (see FIG. 1 and Section 3 hereinbefore).

(*h*) *Index input to zone adder*

Figure 14:
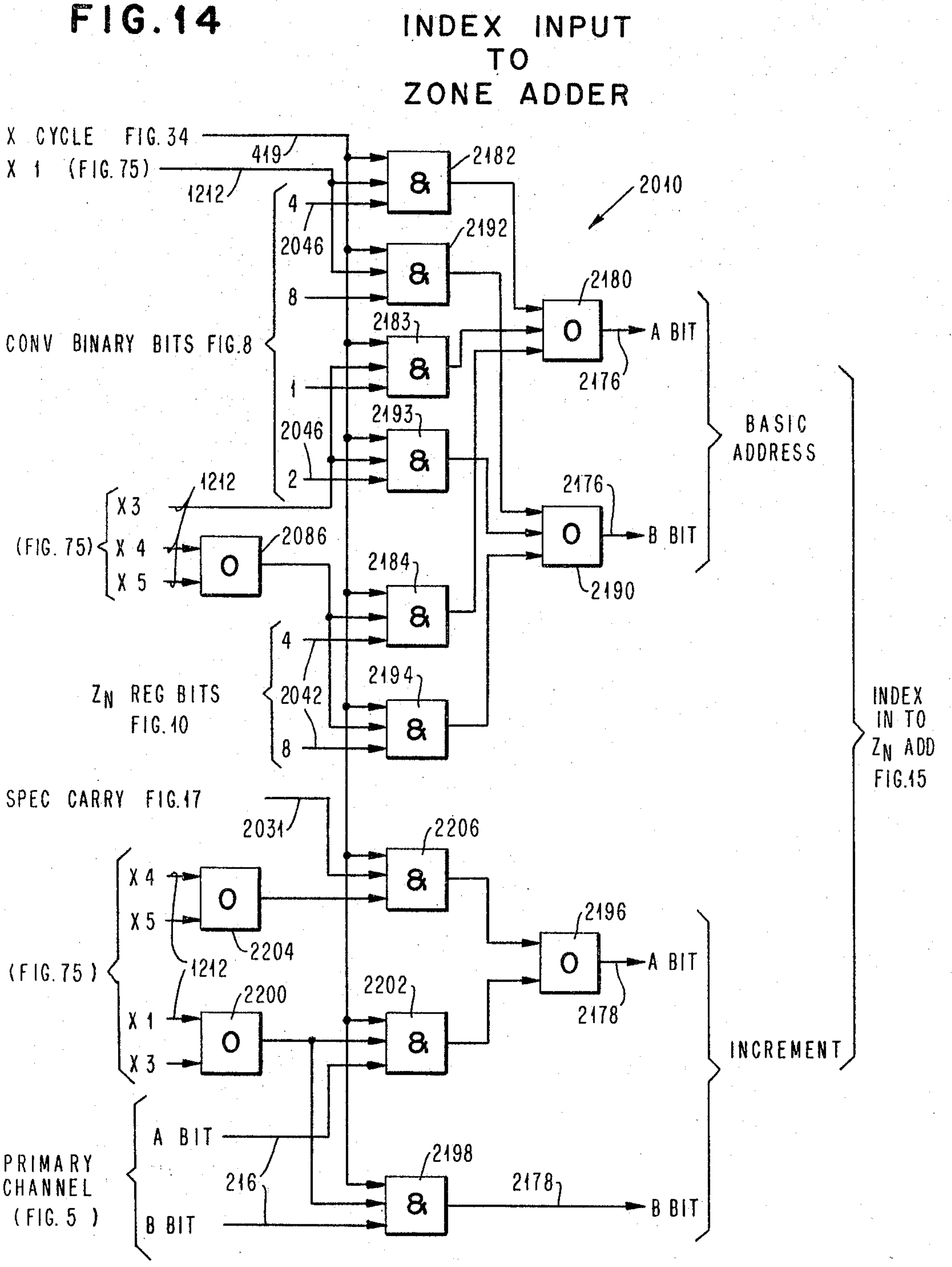

In FIG. 14 (sheet 12), two sets of inputs to the ZONE ADDER are developed for use during COMPRESS MODE INDEXING. Specifically, the INDEX INPUT TO ZONE ADDER circuit 2010 develops both an A bit and a B bit BASIC ADDRESS input on a pair of lines 2176 and both an A-bit and a B-bit INCREMENT input on a pair of lines 2178. The B-bit (weighted 8 or 2) input 2176 is generated by an OR circuit 2190 in response to a pair of AND circuits 2192, 2193 which are operative, respectively, at X1 and X3 time in dependence upon outputs from the 2/5 TO BINARY CONVERT representing, first, an 8-bit and then, a 2-bit, respectively; the OR circuit 2190 will also generate a B-bit during both X4 and X5 time, in response to the ZONE REGISTER 8-bit, due to the operation of an AND circuit 2194.

Also, an A-bit will begenerated by an OR circuit 2180 in response to either of two AND circuits 2182, 2183, which are operative, respectively, at X1 and X3 times (1212) in dependence upon CONV BINARY 4- and 1-bits, respectively; the OR circuit 2180 will also respond at X4 and X5 times to a ZONE REGISTER 4-bit due to the AND circuit 2194.

A and B bits for the increment to be used in the indexing operation are developed on a pair of lines 2178 by an OR circuit 2196 and an AND circuit 2198. During X1 and X3 cycles (OR circuit 2200), an AND circuit 2202 normally passes an A bit from the PRIMARY CHANNEL 216 to the OR circuit 2196. At the same time, an AND circuit 2198 will pass a B bit from the PRIMARY CHANNEL 216 onto the corresponding line 2178. If there is a SPECIAL CARRY (2031) an OR circuit 2204 will cause an AND circuit 2206 to pass the SPECIAL CARRY bit to the OR circuit 2196 so as to generate an A bit input on the increment line 2178.

In Sections 3*d* and 3*e*, hereinbefore, the indexing operation is described. Briefly, X cycles are used to control indexing, the units order being read out and indexed at X1 time, the tens order at X2 time, and the hundreds order at X3 time. The A and B bits, weighted 4 and 8, respectively, from the 2/5 TO BINARY CONVERT circuit (2012, FIG. 1) are added to A and B bits, weighted 4 and 8 respectively, of the primary channel 216 at X1 time, and the A & B bits, weighted 1 & 2, respectively, of the CONVERT circuit are added to the PRIMARY CHANNEL A and B bits, weighted 1 and 2, respectively, at X3 time. Additional X cycles (X4, X5) are used to read out the ZONE REGISTER to the ADDER OUT CONVERSION so as to decode the thousands (TH) and ten thousands orders of incremented (or indexed) address.

The thousands order is gated through the COMPRESS OUTPUT GATE in the X4 cycle, and the ten thousands order is similarly gated in the X5 cycle. If there is a SPECIAL CARRY, it is reflected in the 4 and 8 bits of the ZONE REGISTER as these pass through the adder, in both the X4 cycle and the X5 cycle. Thus the ADDER circuits serve only as a data path if there is no SPECIAL CARRY; and, by performing a true add if there is a SPECIAL CARRY, the ADDER circuits serve as a data path, and perform carry correction simultaneously. Note that the ADDER outputs, whether resulting from a carry correction function or not, are never stored. They are simply gated to the adder out conversion in both X4 and X5 cycles. Thus, a final result, including a carry from the 1 and 2 bits into the 4 and 8 bits is never manifested in a fixed manner; the final result only appears as a dynamic input to the ADDER OUT CONVERSION during both the X4 and X5 cycles.

(*i*) *Zone adder inputs*

Figure 15:
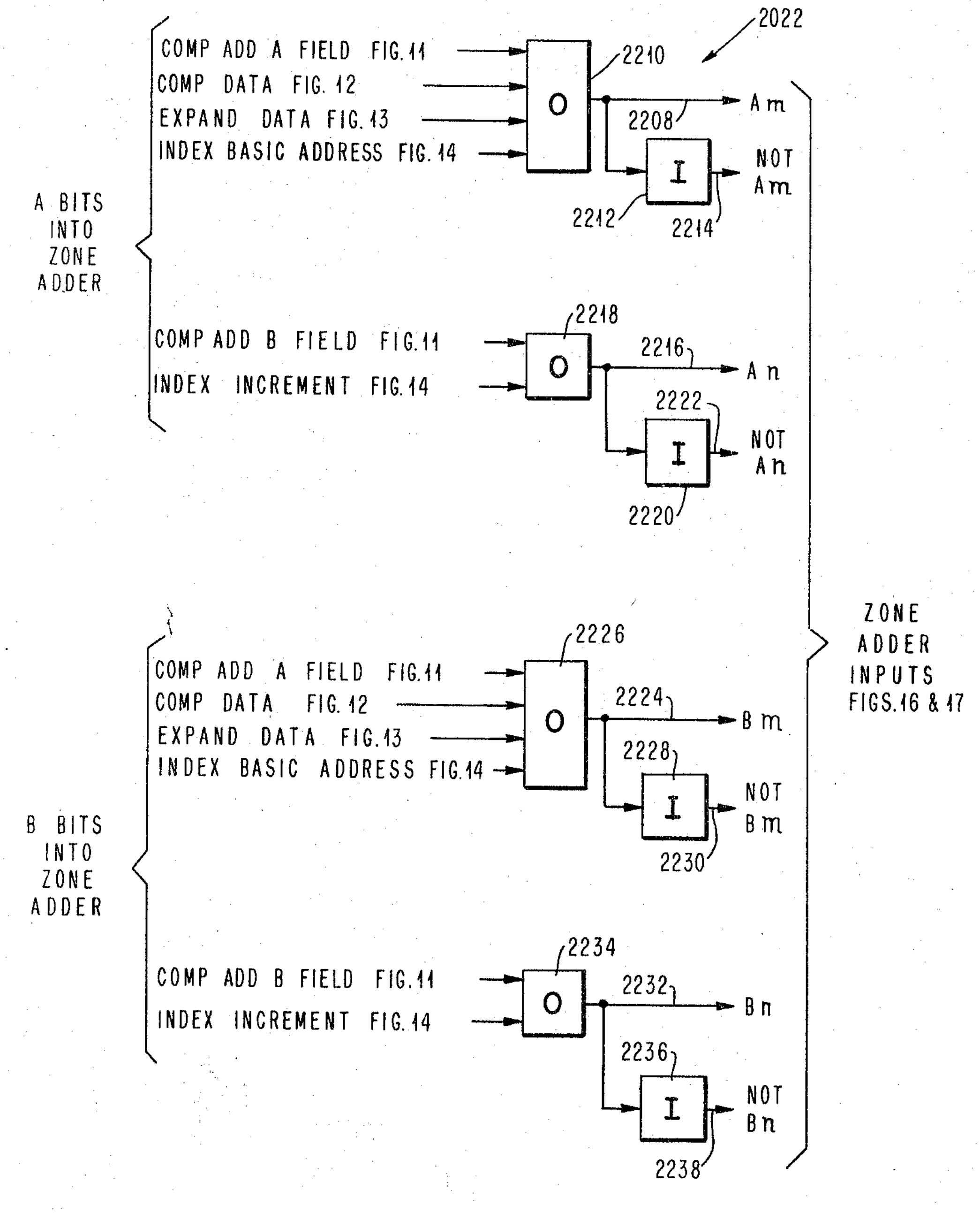

In FIG. 15 (sheet 13) the ZONE ADDER INPUTS circuit 2022 generates an A*m* input to the ZONE ADDER on line 2208 in response to an OR circuit 2210 which causes an inverter 2212 to generate a NOT A*m* signal on a line 2214. The OR circuit 2210 responds to any one of the four inputs from FIGS. 11–14.

An A*n* signal is generated on a line 2216 by an OR circuit 2218 which also causes an inverter 2220 to generate a NOT A*n* signal on a line 2222. The OR circuit 2218 responds to an A bit of the COMPRESS ADD B FIELD (from FIG. 11), or to the INDEX INCREMENT A bit (from FIG. 14).

A B*m* signal is generated on a line 2224 by an OR circuit 2226 which also causes an inverter 2228 to generate a NOT B*m* signal on a line 2230. The OR circuit 2226 is responsive to B bits from each of the four circuits of FIGS. 11–14 (corresponding to the A bit inputs to the OR circuit 2210, at the top of FIG. 15).

A B*n* signal is generated on a line 2232 by an OR circuit 2234 which causes an inverter 2236 to generate a NOT B*n* signal on a line 2238 whenever a B bit is present from the COMPRESS ADD B FIELD (FIG. 11) or the INDEX INCREMENT output of FIG. 14.

In other words, the ZONE ADDER INPUTS of FIG. 15 are merely collecting circuits that generate A and B bits for the M and N inputs to the A and B BIT ADDERS, each ADDER comprising a two bit parallel adder whereby both *m* inputs and *n* inputs are utilized in both the A BIT ADDER and in the B BIT ADDER, all to accommodate the circuitry described with respect to FIGS. 11–14 so that said circuits can gate the inputs to the ADDERS as described in Section 3, hereinbefore.

(*j*) *A bit zone adder*

Figure 16:
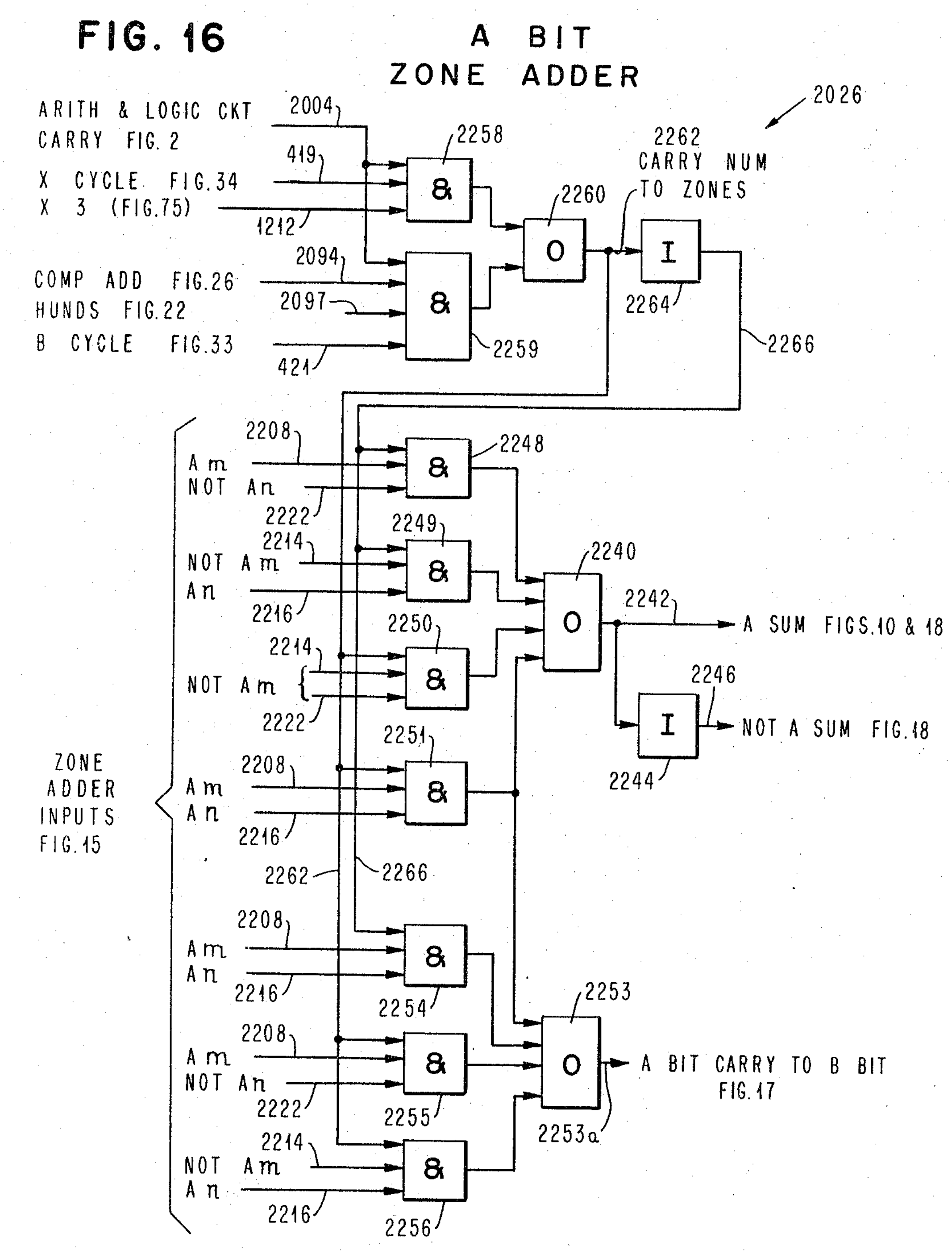

In FIG. 16 (sheet 14) the A BIT ZONE ADDER is shown to comprise essentially an OR circuit 2240 which generated an A SUM on a line 2242 and causes an inverter 2244 to generate A NOT A SUM on a line 2246. The OR circuit 2240 is responsive to any one of four AND circuits 2248–2251 which respond to one, one, one, or three inputs, respectively. Similarly, an OR circuit 2253 responds to any one of four AND circuits 2251 and 2254–2256 in response to three, two, two or two inputs, respectively. This is a straight-forward adder circuit, the operation of which is well known.

At the top of FIG. 16, a CARRY on a line 2004 from the ARITHMETIC & LOGIC CIRCUITS 226 (FIG. 2) is applied to a pair of AND circuits 2258, 2259 each of which feed an OR circuit 2260 to generate a CARRY NUMERIC TO ZONES signal on a line 2262, or, by means of an inverter 2264, to generate a not carry from numeric to zone signal on a line 2266. The AND circuit 2258 is operative during a third X cycle (419) due to the X3 signal on line 1212, which is the time during indexing when the HUNDS numeric portions are being added, and the carry from this addition is caused to reflect itself in the HUNDS order zones (which are also being added). The AND circuit 2259 is operative during the HUNDS portion of a COMPRESS ADD B cycle so as to permit the CARRY from the arithmetic portion into the 1 and 2 bits of the zone portion, immediately after adding the numeric portion. During the addition of the units numerics, the AND circuits 2258, 2259, are not operative, so that the OR circuit 2264 will generate a NOT CARRY signal on line 2266 thereby causing the AND circuits to reflect a lack of a carry at that time.

(*k*) *B bit zone adder*

Figure 17:
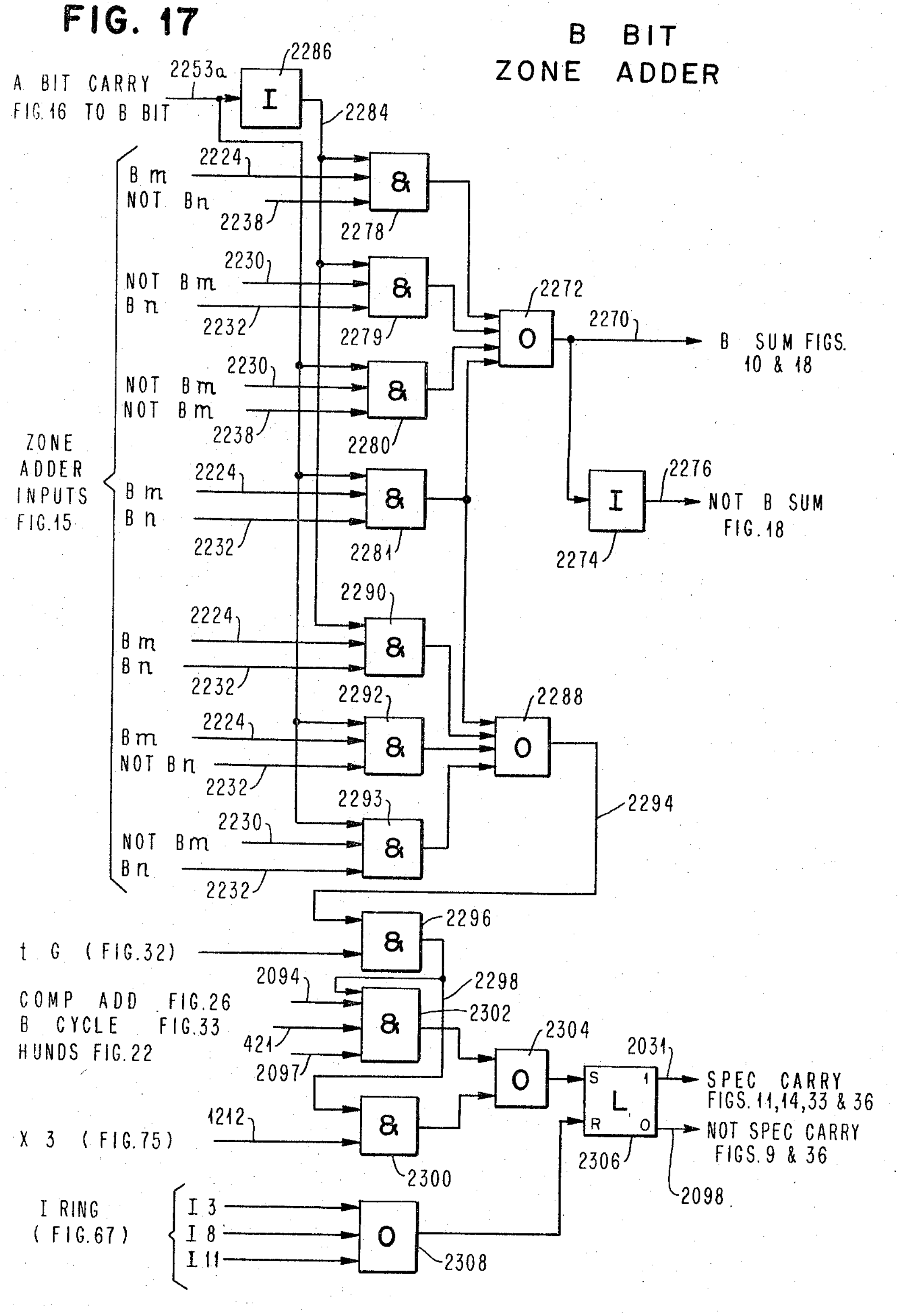

In FIG. 17 (sheet 15) a B SUM signal is generated on a line 2270 by an OR circuit 2272 which causes an inverter 2274 to generate a NOT B SUM SIGNAL on a line 2276, alternatively. The OR circuit 2272 responds to any one of four AND circuits 2278–2281 in dependence upon there being one, one, one, or three B bit inputs, respectively, including the A BIT CARRY 2253*a* from the A BIT ZONE ADDER, or a not A bit carry on a line 2284 which is generated by an inverter 2286. Similarly, an OR circuit 2288 responds to any one of four AND circuits (2281 and 2290–2292) in dependence upon there being three, two, two, or two inputs to said circuit, respectively, to generate a carry signal on a line 2294 which is operative at a time *t*G to cause an AND circuit 2296 to generate a signal on a line 2298. The signal on line 2298 is effective only at X3 time (due to an AND circuit 2300), or during the HUNDS order (2297) B CYCLE 421 of a COMPRESS ADD operation (2094) due to an AND circuit 2302. The AND circuits 2300, 2302 operate an OR circuit 2304 which will set a SPECIAL CARRY latch 2306. The SPECIAL CARRY latch 2306 is reset by an OR circuit 2308 during I3, I8, and I11 portions of instruction read out time. These resets assure that the SPEC CARRY is reset prior to index which takes place after I3 and after I8, and at I11 to be sure that it is reset before the start of a COMPRESS ADD operation.

(*m*) *Adder out conversion*

Figure 10:
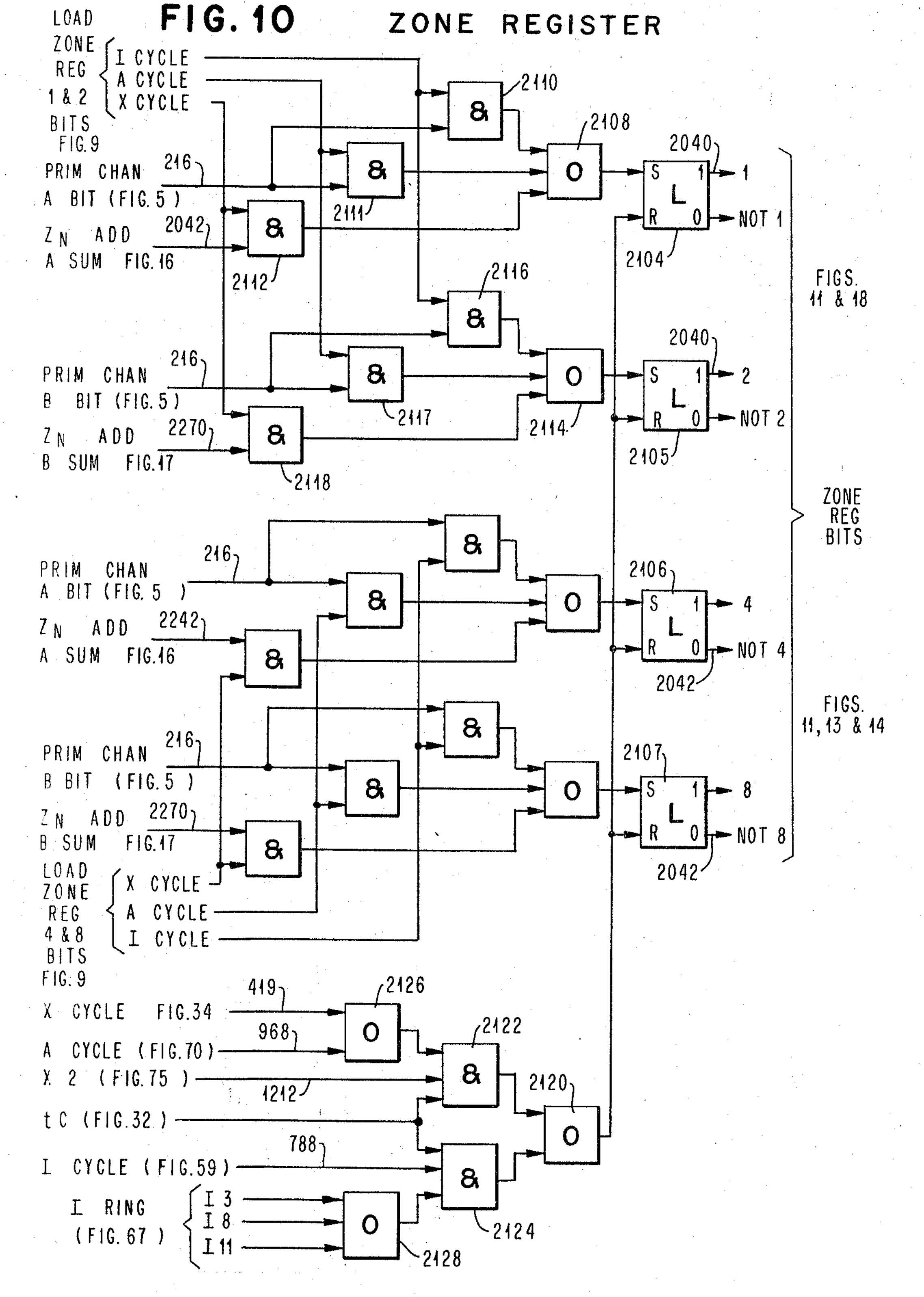

The ADDER OUT CONVERSION circuit 2022, shown in FIG. 18 (sheet 16), is best understood with reference to the binary code shown in FIG. 7 (sheet 6); the BCD code is the same as the binary code except that the BCD value of zero is an 8 and 2 bit combination, and there are no values greater than nine; values of ten through fifteen are represented by TH values of zero through five together with a TT value of one. Referring first to the top of FIG. 18, and to FIG. 1, notice that the inputs to the ADDER OUT CONVERSION circuit comprise an A BIT SUM from the A BIT ZONE ADDER 2026 (FIG. 16), a B BIT SUM from the B BIT ZONE ADDER 2028 (FIG. 17), and the 1 and 2 bits from the ZONE REGISTER 2006 (FIG. 10). In determining what the output from the ADDER OUT CONVERSION should be, the ZONE REGGISTER 1 and 2 bits have a binary value of ONE and TWO respectively; the sum bits have values such that the A bit equals FOUR and the B bit equals EIGHT. Thus, any combinations of 1, 2, 4, and 8 can be derived as a result of the A SUM and B SUM (ZONE ADDERs outputs) and the 1 and 2 bits (from the ZONE REGISTER).

Referring to the bottom of FIG. 18, the ten thousands order is represented by the ADDER OUT TT BITS which may comprise (in the BCD code) a 2 bit and an 8 bit to represent that the ten thousands order is a zero, or a 1 bit, to represent that the ten thousands order is a one. It should be recalled that the ten thousands and thousands together may represent values of from zero to fifteen only; therefore the ten thousands order can never be other than a one or a zero (zero being represented by the combination of a 2 bit and an 8 bit in the BCD code).

A ten thousands value of zero (2 and 8) is generated by an AND circuit 2312 if there is either a NOT A (not 4) or a NOT B (not 8) as determined by an OR circuit 2314 concurrently (AND circuit 2312) with a NOT B (not 8) or a NOT 2 as determined by an OR circuit 2316. The NOT A (not 4) and NOT B (not 8) applied to OR circuit 2314 recognize all the decimal values between zero and eleven; the NOT B (not 8) and NOT 2 applied to the OR circuit 2316 will recognize the decimal values zero through nine, twelve and thirteen. Therefore the AND circuit 2312 recognizes only values of zero through nine, which will thereby generate a TT zero combination (8 and 2 in BCD).

The OR circuit 2320 responds to the A bit (*a*4) or the 2 bit to recognize values of two through seven and ten through fifteen; with the 8 bit applied, the AND circuit 2318 recognizes only ten through 15, whereby the TT order is a one (a 1 bit in BCD).

At the top of FIG. 18, a line 2322 illustrates that a binary input of 1 causes a BCD output of 1, any odd number remains an odd number.

An OR circuit 2324 responds to any one of four AND circuits 2326–2329 to generate a BCD 2 bit. The AND circuit 2326 recognizes the condition when there is no 4 or 8 (represented by A and B) and no 1 bit in the binary code; referring to the binary portion of the chart of FIG. 7 it will be seen that the only values which have no 1, 4, or 8 are decimal zero and decimal two. The AND circuit 2327 recognizes the case where there is no 4 bit (represented by A) and no 1 bit, but there is a 2 bit; this AND circuit therefore recognizes binary inputs having a decimal value of two or ten. The AND circuit 2328 responds to a 4 and an 8 (represented by A and B) and the absence of a 2 bit; this occurs only for decimal values twelve or thirteen. The AND circuit 2329 recognizes a case where there is no 8 bit (represented by B) but there is a 2 bit; this occurs for binary inputs having a decimal equivalent of two, three, six or seven. Thus, the OR circuit 2324 recognizes decimal zero, two, three, six, seven, ten, twelve and thirteen, where ten, twelve and thirteen require TH values of zero, two and three, respectively, together with a TT value of one.

An OR circuit 2330 generates a BCD 4 bit in response to either of two AND circuits 2332, 2333. The AND circuit 2332 recognizes the case where there is a 4 (represented by A) but no 8 (represented by B); this occurs whenever binary inputs have a decimal equivalent of four through seven. The AND circuit 2333 recognizes the case where there is a 4 (represented by A) and a 2; this occurs whenever the inputs equal decimal six, seven, fourteen or fifteen. Thus, OR circuit 2330 generates a binary 4 bit for four through seven, fourteen and fifteen, where fourteen and fifteen require a TH value of four and five, respectively, together with a TT value of one.

An OR circuit 2334 responds to any one of three AND circuits 2336–2338 to generate a BCD 8 bit. The AND circuit 2336 responds to not 4 (NOT A) with an 8 (B) and not 1; this corresponds to decimal eight or ten. The AND circuit 2337 responds to not 4 (NOT A), not 1 and not 2 which represent decimal values of eight or zero. The AND circuit 2338 responds to not 4 (NOT A) and 8 (B) with not 2; this is equal to a decimal value of eight or nine. Thus, OR circuit 2334 recognizes zero, or eight through ten, to generate an 8 bit; higher values use a TH of zero–five with a TT value of one.

Thus each of the circuits shown in FIG. 18 recognizes certain conditions in a truth table (the binary code shown in FIG. 7) to generate an equivalent BCD code. The BCD code is equal to the 2/5 code with exception of the fact that use of a 0 bit is eliminated, and a seven is represented by 1, 2 and 4, rather than the 4 and 8 bits as shown for the 2/5 code.

(*n*) *Compress output gate controls*

Figure 19:
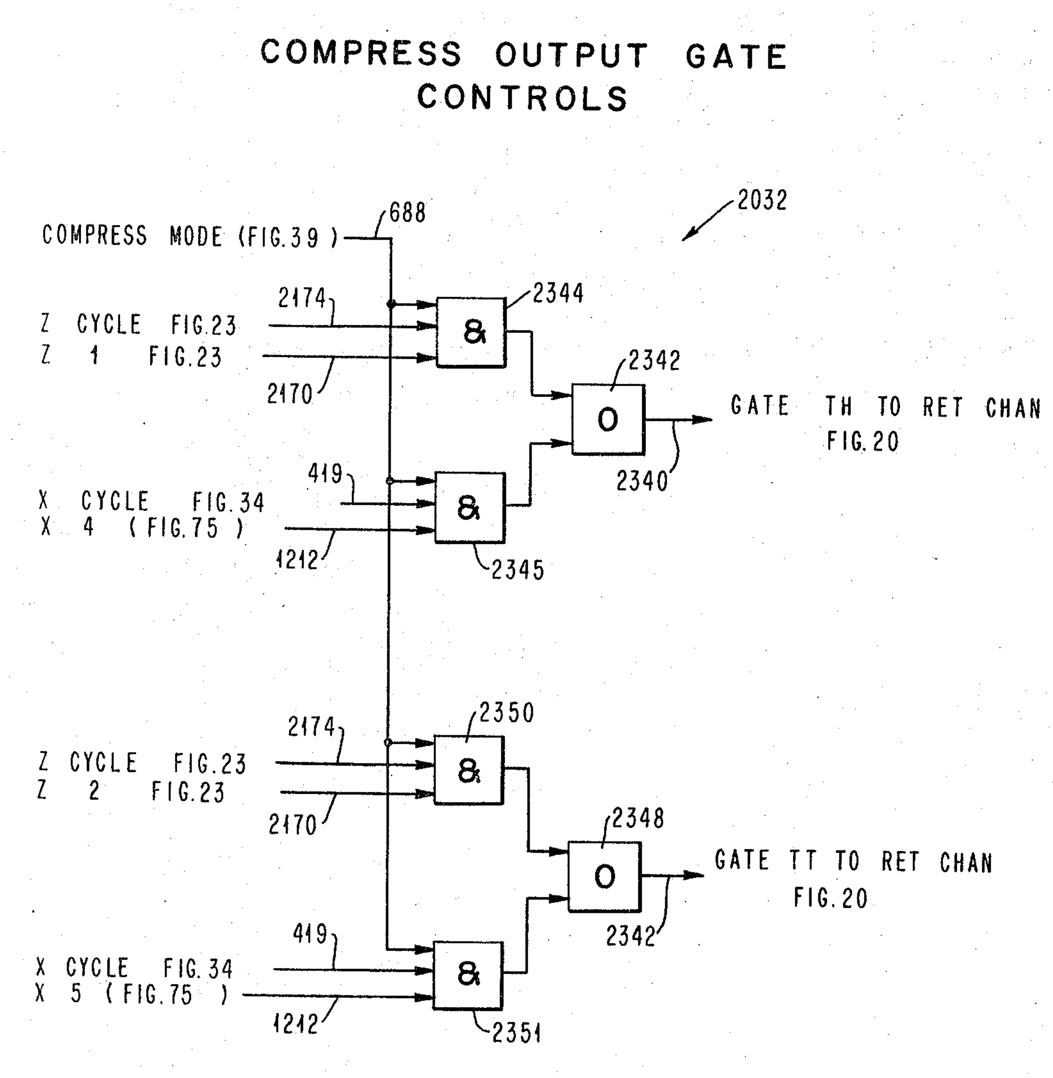

The COMPRESS OUTPUT GATE 2016 (FIG. 20, sheet 19) is controlled by the COMPRESS OUTPUT GATE CONTROL 2032 which is shown in FIG. 19 (sheet 17). The object of this circuit is to generate a signal on a line 2340 to GATE THOUSANDS TO RETURN CHANNEL, and then to generate a signal on a line 2342 to GATE TEN THOUSANDS TO RETURN CHANNEL. The line 2340 is energized by an OR circuit 2342 in response to either one of two AND circuits 2344, 2345 which are operative only during COMPRESS MODE (688). The AND circuit 2344 responds to Z1 (2170) in a Z cycle (2174). This AND circuit 2344 is therefore operative to gate the thousands order from the COMPRESS circuits during an EXPAND DATA operation, which is a COMPRESS MODE instruction read out. In this operation, a three character address has been read out, the numeric portions being stored in the units, tens and hundreds orders of the address registers, and the zone portions being stored in the zone register for conversion to the thousands and ten thousands order in two successive Z cycles, the first cycle being Z1 within which the thousands order is gated out by this circuit.

The AND circuit 2345 responds in a similar fashion during the fourth X CYCLE (419) in response to an X4 signal (1212). Thus, this AND circuit is operative during the fourth indexing cycle which is utilized to read the zone register 1, 2, 4, and 8 bits down to the adder out conversion circuit, combine them with a special carry (if any) which may have resulted, and decode the thousands position.

The GATE TT TO RETURN CHANNEL signal on line 2342 is generated by an OR circuit 2348 in response to either of two AND circuits 2350, 2351 which respond one cycle later (Z2, 2170 or X5, 1212) than do the corresponding AND circuits 2344, 2345 used to gate the thousands order.

It should be noted that the COMPRESS OUTPUT GATE is utilized only when information is being expanded from three characters to five characters (in this embodiment): when information is being compressed, from five characters to three characters, or during a compress data operation in which no expansion or compression takes place, there is no need to generate thousands and ten thousands BCD characters for the RETURN CHANNEL, so that the COMPRESS OUTPUT GATE is not utilized.

(*p*) *Compress output gate*

Figure 20:
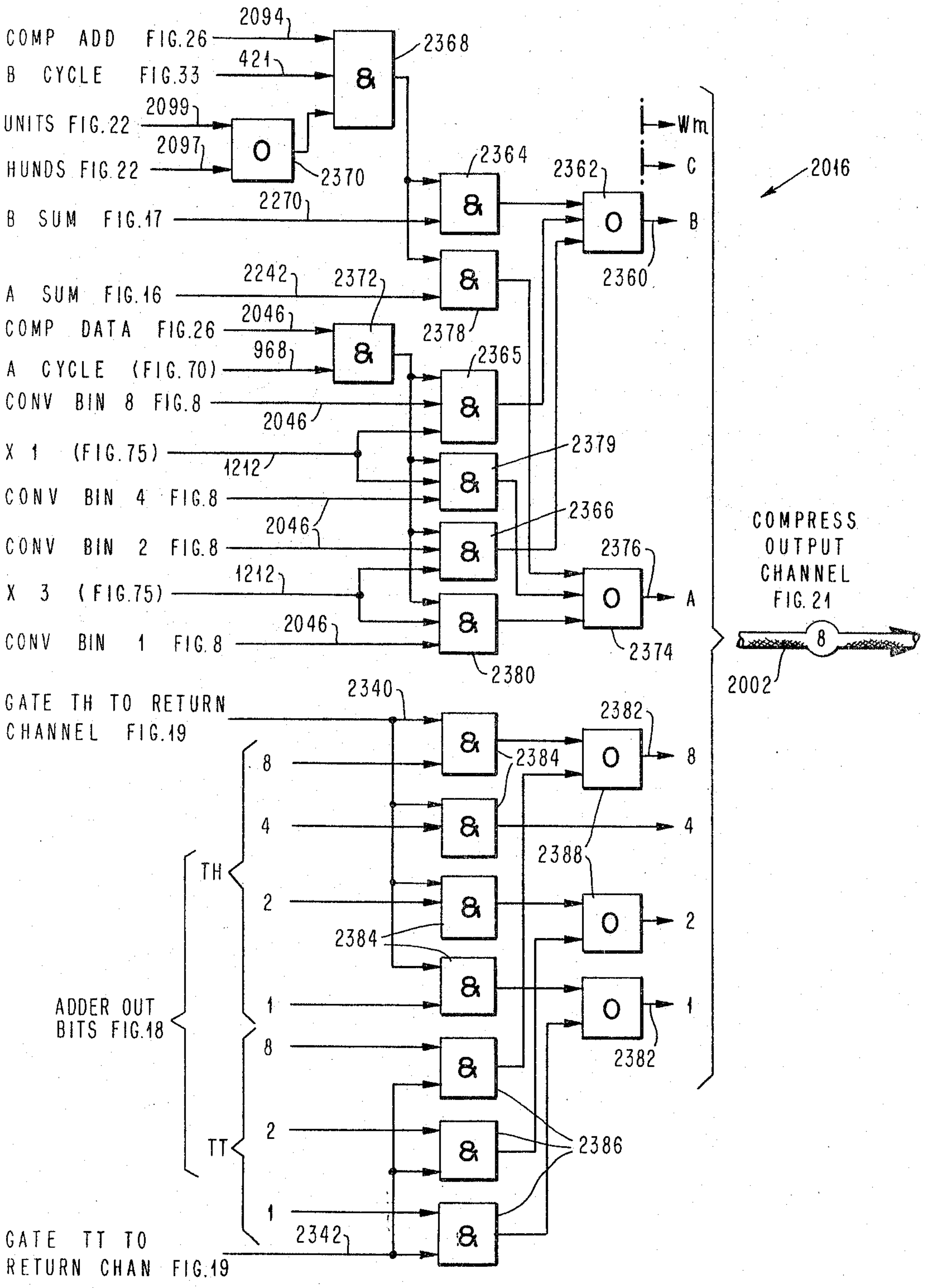

The COMPRESS OUTPUT GATE 2016 shown in FIG. 20 (sheet 18) comprises two sections, the upper portion as shown in FIG. 20 generating A and B zone bits for application to numeric portions (derived elsewhere) during a compress type operation (COMPRESS ADD or COMPRESS DATA), and the lower part showing the generation of BCD 1, 2, 4, and 8 bits for utilization as thousands and ten thousands position numeric portions during an expand type operation (EXPAND DATA, and COMPRESS MODE INDEX).

A B bit is generated on a line 2360 by an OR circuit 2362 in response to any one of three AND circuits 2364–2366. The AND circuit 2364 is operative in response to a further AND circuit 2368 during a COMPRESS ADD operation (2094) within the UNITS (2099) or HUNDS (2097) portion of a B CYCLE (421) due to the operation of an OR circuit 2370. Thus, if there is a B SUM (2270) during either the hundreds or units B cycles of a COMPRESS ADD operation, the AND circuit 2364 will cause the OR circuit 2362 to generate a B bit on the line 2360.

Similarly, the AND circuit 2365 is operative during X1 time (1212) of an A CYCLE (968) of a COMPRESS DATA operation (2046) due to the operation of an AND circuit 2372, provided there is a CONVERT BINARY 8 bit on line 2046. Similarly, the AND circuit 2366 is responsive to a convert binary 2 bit (2046) during a third A CYCLE (698) as determined by the X3 signal (1212). Thus, during a COMPRESS DATA operation, if there is an 8 bit during the first cycle of a 2 bit during the third cycle, one of the AND circuits 2365, 2366 will supply an output to the OR circuit 2362 so as to generate a B bit on the line 2360 of the compress output channel 2002.

In a similar fashion, an OR circuit 2374 will generate an A bit on a line 2376 in response to any one of three AND circuits 2378–2380 in dependence upon a CONVERT BINARY 4 bit at X1 time (2379) or a CONVERT BINARY 1 bit at X3 time (2380) in a COMPRESS DATA operation (2372) or an A SUM (2378) during a COMPRESS ADD operation (2368).

The BCD outputs 1, 2, 4, and 8 on a plurality of lines 2382 (bottom of FIG. 20) are generated by a plurality of AND circuits 2384 in response to the GATE TH to return channel signal on line 2340, or by the AND circuits 2386 in response to the GATE TT to return channel signal on line 2342. The outputs of the AND circuits 2384, 2386 are mixed in a plurality of OR circuits 2388 in an obvious fashion.

(*q*) *Summation*

The foregoing sections completely described the compress circuits of FIG. 1. The controls for the COMPRESS CIRCUITS include, primarily, controls which either are available in the exemplary environmental system (FIG. 2) as described in detail in said copending application 332,648, or are modifications of said controls. However, certain of the controls utilized do not appear in said copending application, and are introduced in this case especially for the COMPRESS CIRCUITS.

The remaining detailed description relates to the various controls necessary to infuse the COMPRESS CIRCUITS into the exemplary environmental system, as described in Section 2 and 3, hereinbefore.

(6) COMPRESS CYCLE-COUNTING CONTROL CIRCUITS (*a*) *Generally*

In the preceding sections, it was seen that the particular characters being operated upon must be monitored so that the zones over the units and hundreds can be specially recognized (the zones over the tens being used for indexing only), and that the thousands and ten thousands orders must be generated in cycles which follow the handling of the units, tens and hundreds numeric portions. This character counting is achieved by the circuits of FIGS. 22 and 23 which are described in Section 6*b* and 6*c*, immediately hereafter.

(*b*) *Units/Tens/Hundreds*

Figure 22:
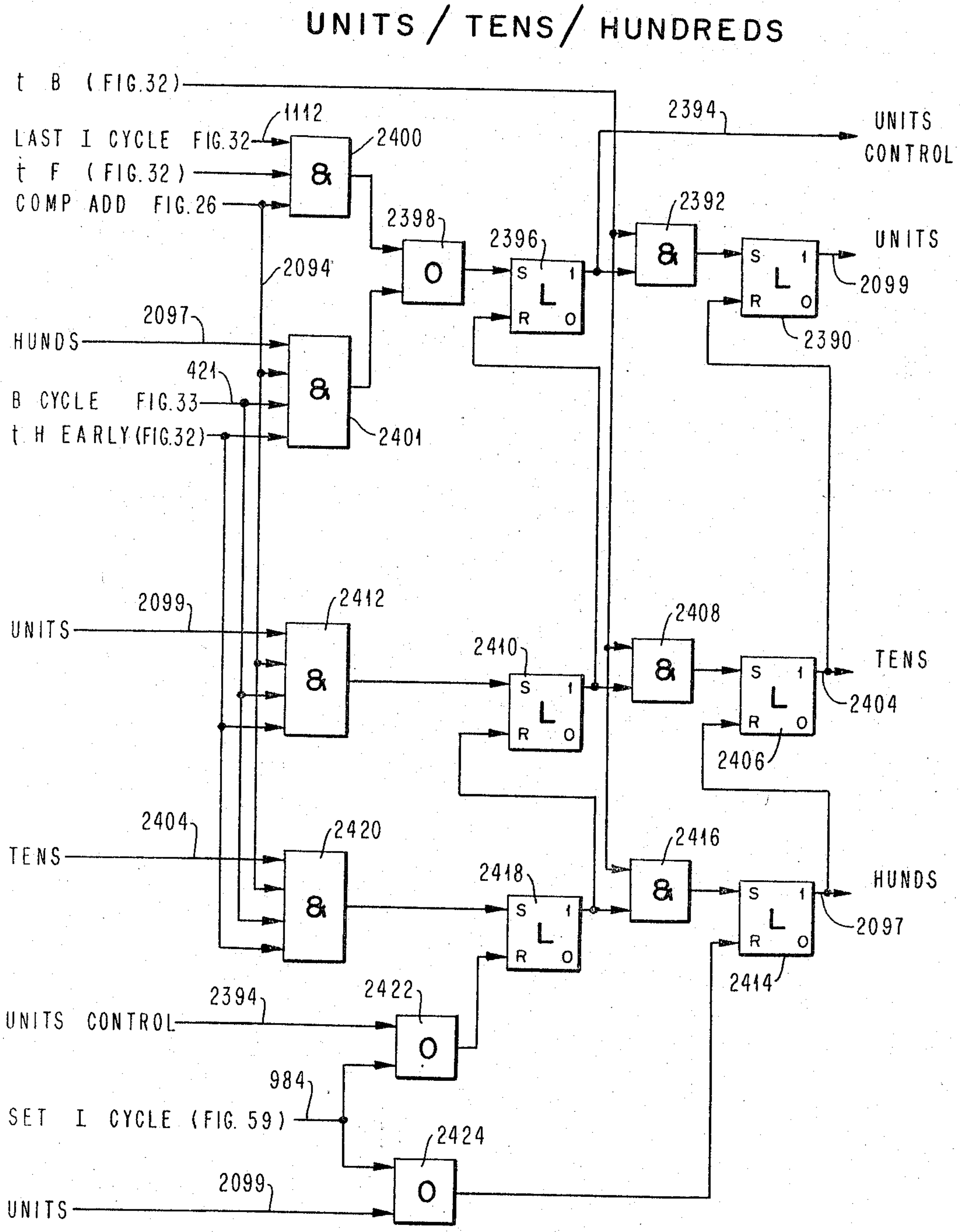

The UNITS/TENS/HUNDS control circuit are shown on FIG. 22 (sheet 20). The UNITS signal on line 2099 is generated by a latch 2390 which is set by an AND circuit 2392, which is operated at time *t*B by a UNITS CONTROL signal on a line 2394. The UNITS CONTROL signal is generated by a latch 2396 settable by an OR circuit 2398 in response to either of two AND circuits 2400, 2401. The AND circuit 2400 is operative at time *t*F of the last I CYCLE (1112) when the decoded operation specifies a COMPRESS ADD operation (2094). As illustrated in FIG. 4, time *t*F is actually the last logic time (other than time *t*A) of an I cycle, which means that the instruction is essentially all read out, and that an execution will follow; thus, the UNITS latch should be set to recognize the first character of the execution of the COMPRESSED ADD instruction which is to follow. The AND circuit 2401, however to again set the UNITS latch after the hundreds latch has been set in a B cycle, provided a special carry exists, this occurring at a time *t*H EARLY (FIG. 4, which includes times G2 and H3 as described in detail in Section 11 of said copending application, Ser. No. 332,648). This is the last part of a B CYCLE, and in fact will be the last part of the third B CYCLE in the COMPRESS ADD operation, since the HUNDS signal on line 2097 is present indicating the third, or hundreds order, of the character is being handled. A TENS signal is generated on a line 2404 by a latch 2406 which is set by an AND circuit 2408, at time *t*B, by a further latch 2410 which is settable by an AND circuit 2412 at time *t*H EARLY of a B CYCLE (421), whenever the UNITS signal is present on line 2099. When the latch 2410 is set, it resets the UNITS CONTROL latch 2396; when the latch 2406 is set, it resets the UNITS latch 2390.

The HUNDS signal on line 2097 is generated by a latch 2414 which is set by an AND circuit 2416 at time *t*B in response to a control latch 2418, which is, in turn, settable by an AND circuit 2420 at time *t*H EARLY of a B CYCLE (421) whenever the TENS signal is present on line 2404. Setting of the latch 2418 will reset the control latch 2410; setting of the hundreds latch 2414 will reset the tens latch 2406. Assuming that the HUNDS latch has been set, a further B CYCLE will cause the AND circuit 2401 to once again set the UNITS latch as described hereinbefore. When the UNITS CONTROL signal appears on line 2394, this causes an OR circuit 2422 to reset the latch 2418; thereafter, when the UNITS latch 2390 goes on, the UNITS signal on line 2399 will cause an OR circuit 2424 to reset the hundreds latch 2414. The OR circuits 2422, 2424 also respond to a SET I CYCLE signal on a line 984 to reset the latch 2414, 2418 in the event there is no SPECIAL CARRY (as a result of adding the 1 and 2 zone bits, which appears in the hundreds order characters). Thus, the circuit would be left with the HUNDREDS latches 2414, 2418 set whenever there is no SPECIAL CARRY, except for the OR circuits 2422, 2424. In order to accommodate this condition, whenever the COMPRESS ADD operation is complete, the SET I CYCLE signal will appear on line 984 so as to begin enabling circuitry to cause the reading out of a following instruction (as described in detail in said copending application Ser. No. 332,648), and when the SET I CYCLE signal appears, the OR circuit 2422, 2424 will reset the latches 2414, 2418. Thus the entire circuit is maintained in a reset condition following its use during a COMPRESS ADD operation.

(*c*) *Z cycle controls*

Figure 23:
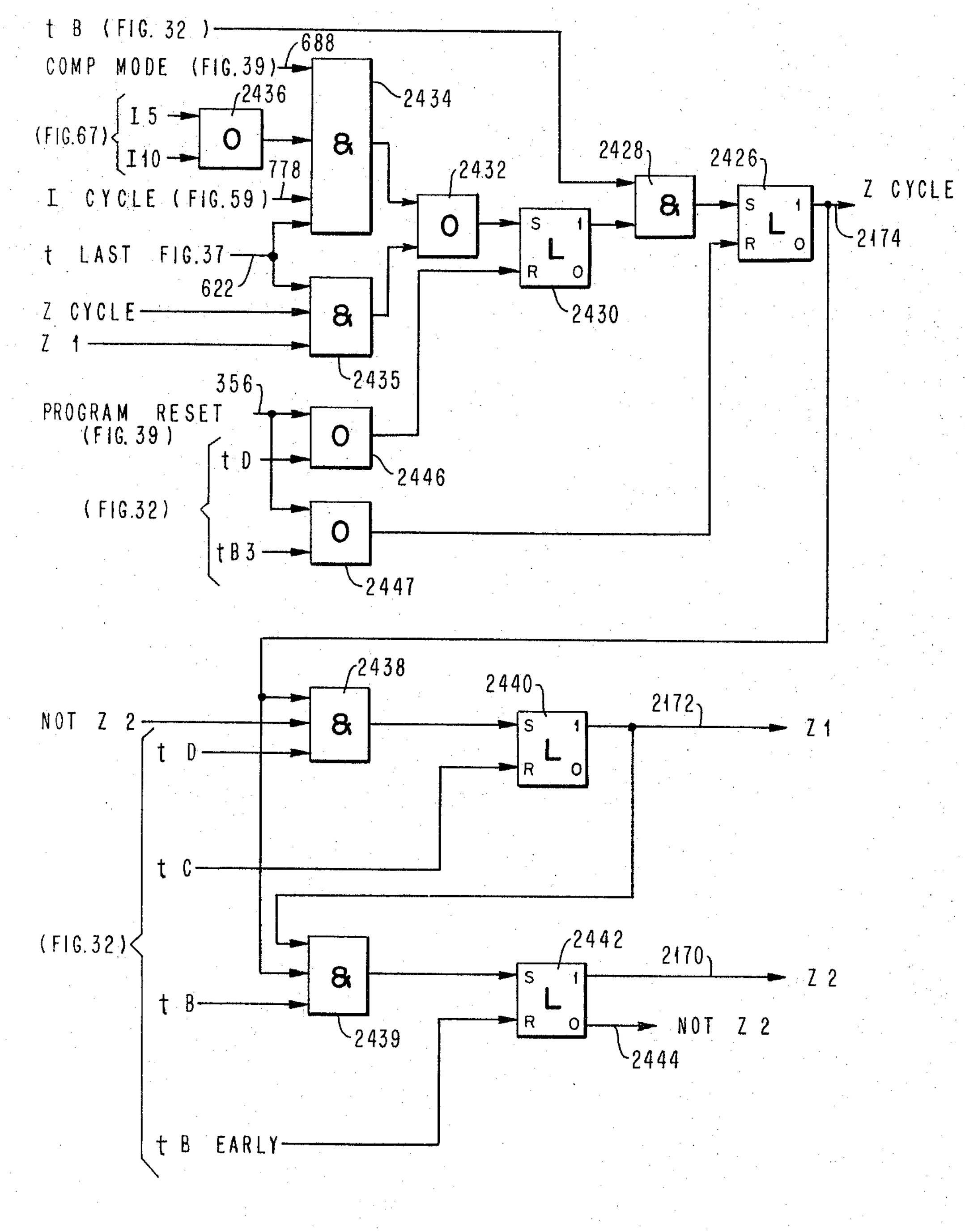

The Z CYCLE signal is developed on line 2174 in FIG. 23 (Sheet 21), by a latch 2426 which is set by an AND circuit 2428 at time *t*B provided an additional latch 2430 has been set by an OR circuit 2432; the OR circuit 2432 in turn responds to either of two AND circuits 2434, 2435. During COMPRESS MODE (688) when I cycles are being taken (778), an OR circuit 2436 will enable the AND circuit 2434 to respond to time *t* LAST (622) during the I5 cycle and the I10 cycle, which are the cycles within which the third or hundreds order character of an A address or B address (respectively) is read out as part of an instruction. Referring briefly to FIG. 24, the illustration for the NORMAL COMPRESS MODE operation shows that after three characters are read out in I3, I4 and I5 time, two Z cycles must be taken in order to perform the address expansion by means of the zones which appear in the units (I3) and hundreds (I5) orders of the address being read out. Thus, the latch 2430 is set during the last part of the I5 cycle, and the latch 2426 is set in the very first part of the next cycle, at time *t*B, indicating that Z CYCLE operation is involved. The Z CYCLE signal on line 2174 enables each of two AND circuits 2438, 2439 to set a Z1 latch 2440 and a Z2 latch 2442, respectively. The Z1 latch 2440 will be set if the Z2 latch is off (due to a NOT Z2 signal on a line 2444), at time *t*D of the first cycle wherein the Z CYCLE latch 2426 is set.

A pair of OR circuits 2446, 2447 reset the latches 2430, 2436 at times *t*D and *t*B3, respectively, or in response to a PROGRAM RESET signal on line 356; the PROGRAM RESET and timing signals are all described fully in said copending application, Ser. No. 332,648.

(7) MODIFICATIONS TO DATA FLOW OF ENVIRONMENTAL SYSTEM (*a*) *Generally*

The environmental system within which this invention may be embodied has been describtd briefly with respect to FIG. 2. In FIG. 2, modifications include the addition of the COMPRESS CIRCUITS 2000 together with an input thereto from the PRIMARY CHANNEL 216, and the connection from the ADDRESS CIRCUITS 214 over the ten bit bus 1328 so as to apply two characters (TH, TT) in the 2/5 code from the ADDRESS CIRCUITS to the COMPRESS CIRCUITS 2000; also, an 8-bit bus 2002, which comprises the COMPRESS OUTPUT CHANNEL, is applied from the COMPRESS CIRCUITS 2000 to the RETURN CHANNEL 2ND CHARACTER GATE 230; further, the CARRY from numerics to zones is applied by the ARITHMETIC & LOGIC circuits 226 over the CARRY line 2004 to the COMPRESS CIRCUITS 2000.

Additionally, the SECONDARY CHANNEL GATE 222 (FIG. 2) and the RETURN CHANNEL 2ND CHARACTER GATE 230 are modified so as to permit the mixing of zone and numerics in the proper fashion as described in preceding sections with respect to COMPRESS MODE operations. These circuits are described in detail with respect to FIGS. 25 and 21, respectively, in the next two Sections 7*b* and 7*c*.

(*b*) *Return channel 2nd character gate*

Figure 21:
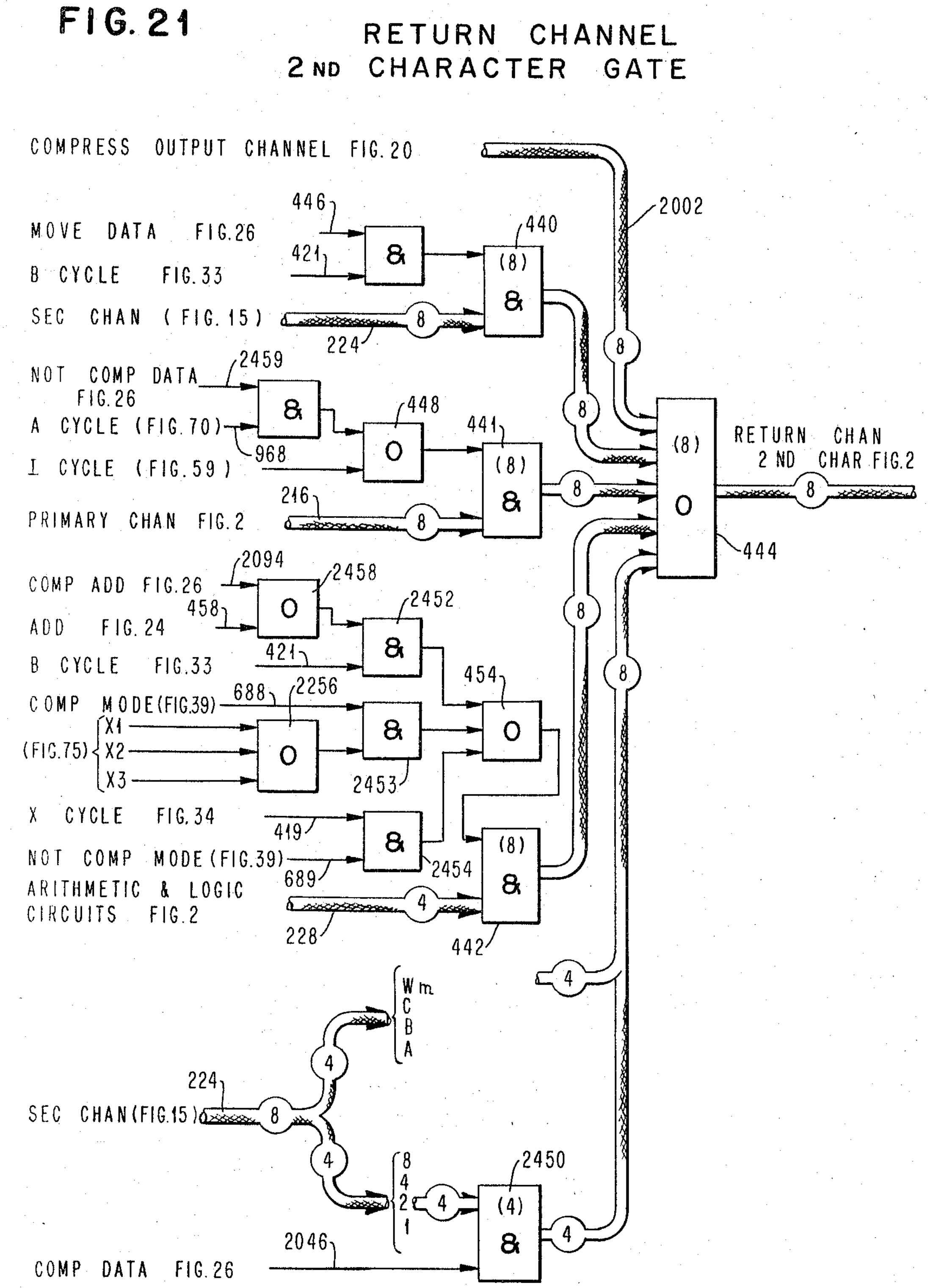

The RETURN CHANNEL 2ND CHARACTER GATE, as modified for use with the COMPRESS MODE circuitry in accordance with the present invention is shown in FIG. 21 (Sheet 19). The RETURN CHANNEL 2ND CHARACTER GATE in the exemplary environmental system as unmodified is shown in FIG. 17 of said copending application, Ser. No. 332,648.

The modifications required include the ability to apply the COMPRESS OUTPUT CHANNEL 2002 from the COMPRESS CIRCUITS to the eight way OR circuit 444; and, the ability to pass only the numeric portions of the secondary channel 224 through a four way gate 2450 to the eight way OR circuit 444, and not utilize the zone bits of the SECONDARY CHANNEL 224 whenever a COMPRESS DATA operation is performed as indicated by a signal on line 2046. Further, the inputs to the OR circuit 454 (for controlling the application of the ARITHMETIC & LOGIC circuits outputs on line 228 through the 8 way gate 442 to the 8 way OR circuit 444) have received extensive modification. Specifically, the OR circuit 454 may now respond to any one of three AND circuits 2452–2454. The AND circuit 2454 is operative during an X CYCLE (419) which is not performed in COMPRESS MODE (689); the AND circuit 2453 is operative in COMPRESS MODE (688) during either the X1, X2, or X3 cycles (OR circuit 2456); and the AND circuit 2452 is operating during a B CYCLE (421) of either an ADD (458) or a COMPRESS ADD (2094), due to the OR circuit 2458.

Thus, whenever the COMPRESS OUTPUT GATE 216 (FIG. 20) supplies zone bits B and A to the COMPRESS OUTPUT CHANNEL 2002, which occurs during a COMPRESS ADD or COMPRESS DATA operation, only numeric portions should be received from other circuits of the system by the RETURN CHANNEL 2ND CHARACTER GATE. The AND circuit 2450 (bottom of FIG. 21) ensures that no zones on the SECONDARY CHANNEL 224 will be received during a COMPRESS DATA operation; since the COMPRESS ADD operation involves the output of the ARITHMETIC & LOGIC circuits (which cannot generate zone bits) through the eight way gate 442, it is assured (without a special gate) that no zones will be applied at that time.

Numerics, decoded from zones, are gated onto the COMPRESS OUTPUT CHANNEL 2002 by the COMPRESS OUTPUT GATE (FIG. 20) whenever said numerics are gated therethrough by the GATE TH TO RETURN CHANNEL and GATE TT TO RETURN CHANNEL signals generated in the COMPRESS OUTPUT GATE CONTROLS circuits of FIG. 19. This occurs during COMPRESS MODE instruction readout time wherein the two extra Z cycles are taken to expand the address information contained within the instruction, and during indexing which occurs in COMPRESS MODE. During Z cycles, no other parts of the system are gated through to the eight-way OR circuit 444 (FIG. 21) so there is no danger of an improper meshing of signals on the RETURN CHANNEL. During COMPRESS MODE instruction readout, there is therefore no danger of erroneously applying unwanted zone or numeric signals to the RETURN CHANNEL 2ND CHARACTER GATE. During indexing in COMPRESS MODE, the AND circuit 2453 will be operative only at X1, X2 and X3 time and the AND circuit 2454 is blocked by the NOT COMPRESS MODE SIGNAL on line 689; thus the three numeric orders of the indexing operation are gated from the ARITHMETIC & LOGIC CIRCUITS via the AND circuit 2453, the OR circuit 454, and the eight way gate 442; however, during the two extra X cycles (X4, X5) required to expand the indexing increment to five characters, both the AND circuit 2453 and the AND circuit 2454 are blocked, so that no information will pass from the ARITHMETIC & LOGIC CIRCUITS. It is at this time that the X4 and X5 signals (FIG. 19) will supply the GATE TH TO RETURN CHANNEL signal on line 2340 and the GATE TT TO RETURN CHANNEL signal on a line 2342, respectively.

(*c*) *Secondary channel gate*

Figure 25:
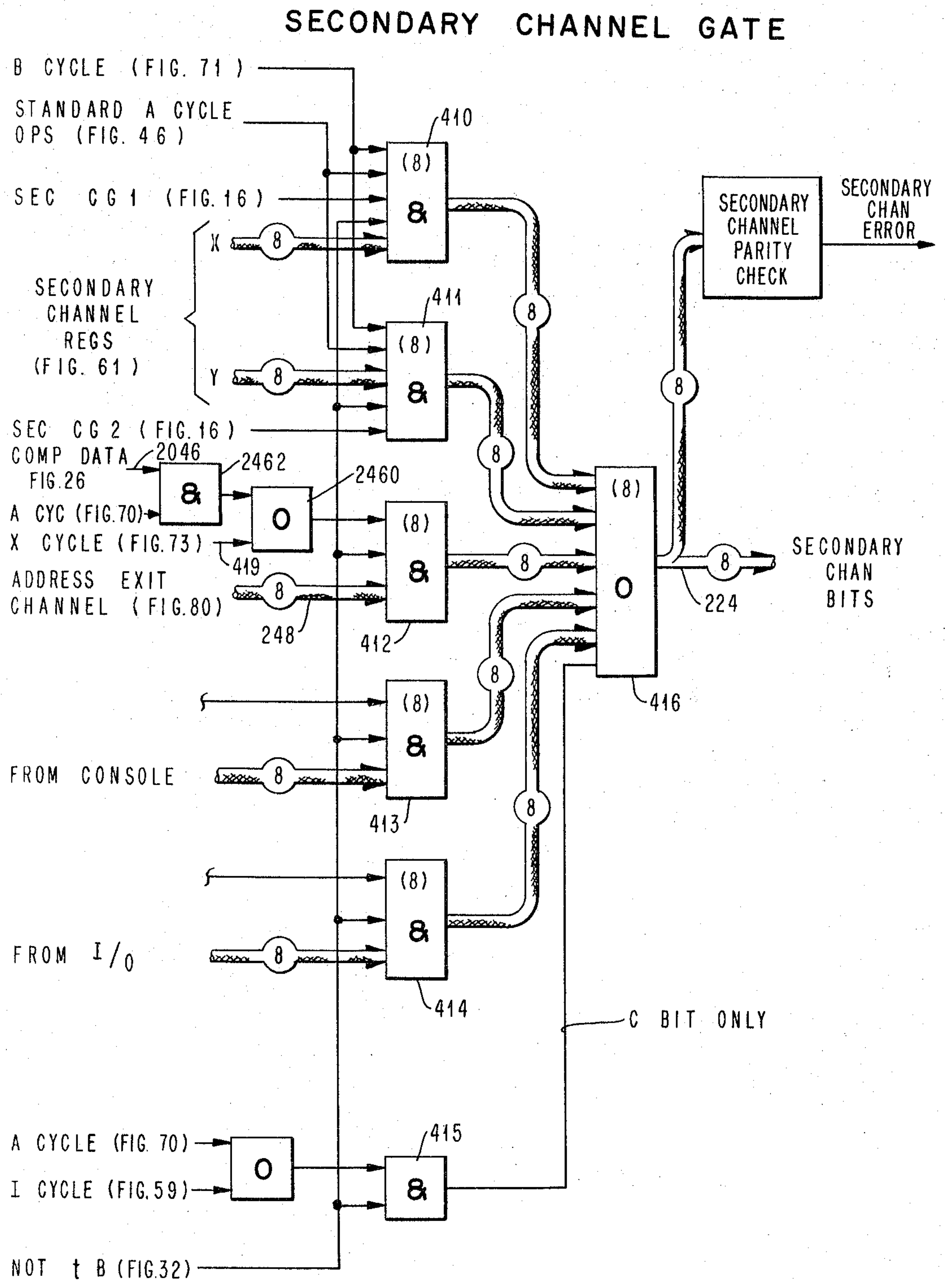

The SECONDARY CHANNEL GATE as modified for use with a compress mode circuit in accordance with the present invention is shown in FIG. 25 (sheet 23) herein. The unmodified version, useful in the exemplary environmental system, is shown in FIG. 15 of said copending application, Serial No. 332,648.

The only modification to this circuit is in changes of the conditions which allow the ADDRESS EXIT CHANNEL 1332 to be passed through the eight way gate 412 to the eight way OR circuit 416 for application to the SECONDARY CHANNEL 224. Specifically, in said prior system, only during an X cycle would said eight way gate 412 be operative. As modified, an OR circuit 2460 allows the gate 412 to be energized during an A cycle of a COMPRESS DATA OPERATION (2046), due to an AND circuit 2462. In a COMPRESS DATA operation, the units portion of the BAR is read out over the ADDRESS EXIT CHANNEL 1332, and the COMPRESS CIRCUITS 2000 apply A and B zone bits to the RETURN CHANNEL 2ND CHARACTER GATE so as to provide the UNITS order character with zone portions representing some part of the thousands and ten thousands hexidecimal value as described hereinbefore. Then the tens portion of the BAR is read out over the ADDRESS EXIT CHANNEL 1332. Then the hundreds portion is read out over the ADDRESS EXIT CHANNEL 1332, A and B zones being applied to the hundreds portion by the COMPRESS CIRCUITS as said hundreds portion passes through the RETURN CHANNEL 2ND CHARACTER GATE 230.

(8) MODIFICATIONS TO MAIN CONTROLS OF ENVIRONMENTAL SYSTEM

(a) *Instruction decoder*

Figure 26:
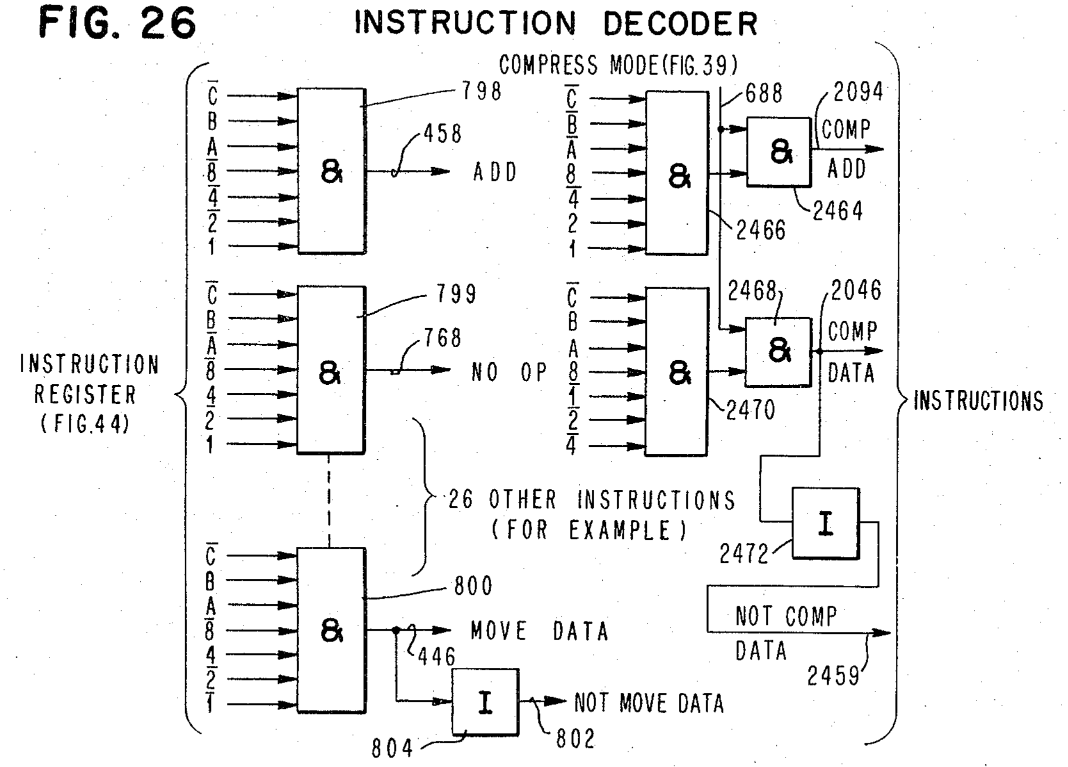

The INSTRUCTION DECODER shown in FIG. 26 (sheet 24) is modified for use with the COMPRESS CIRCUITS in accordance with the present invention only insofar as decoding the additional instructions COMPRESS ADD (2094) and COMPRESS DATA (2046). The COMPRESS ADD signal on line 2094 is generated by an AND circuit 2464 in response to another AND circuit 2466 during a COMPRESS MODE operation (688). The AND circuit 2466 responds to the presence of the 8, 2 and 1 bits, and the absence of all other bits, to recognize the code configuration for a "#," which symbol in the instruction set of the environmental system is utilized to indicate a COMPRESS ADD operation. Similarly, the COMPRESS DATA signal on line 2046 is generated by an AND circuit 2468 in response to another AND circuit 2470 during a COMPRESS MODE operation (688). The AND circuit 2470 responds to the presence of a B bit, an A bit, and an 8-bit, and to the absence of all other bits, which is indicative of the coding for the letter "H" taken in the instruction set of the environmental system to indicate the COMPRESS DATA operaion. The COMPRESS DATA signal on line 2046 is applied to an inverter 2472 to generate the NOT COMPRESS DATA signal on line 2459.

(b) *Instruction grouping encoder*

Figure 27:
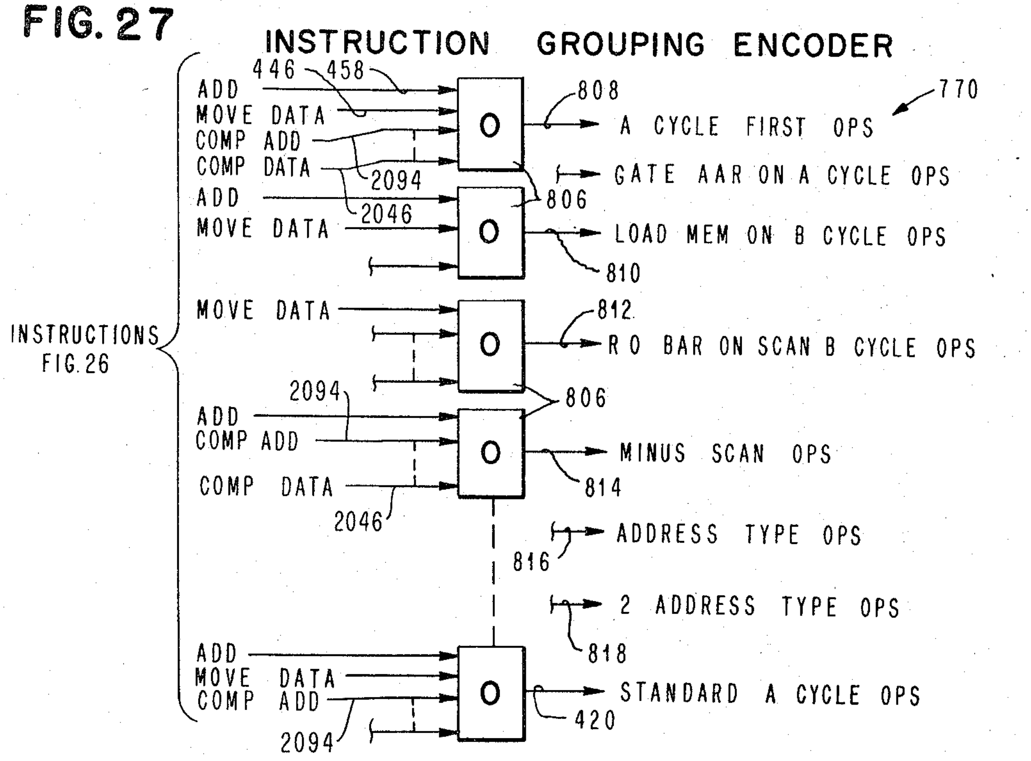

The INSTRUCTION GROUPING ENCODER modified for use with COMPRESS circuits in accordance with the present invention is shown in FIG. 27 (sheet 24). The only changes herein are to provide the OR circuits 806 with inputs indicating COMPRESS ADD and COMPRESS DATA so as to generate A CYCLE FIRST OPS, MINUS SCAN OPS, and STANDARD A CYCLE OPS signals on lines 808, 810 and 420 respectively.

(c) *Serial scan*

Figure 29:
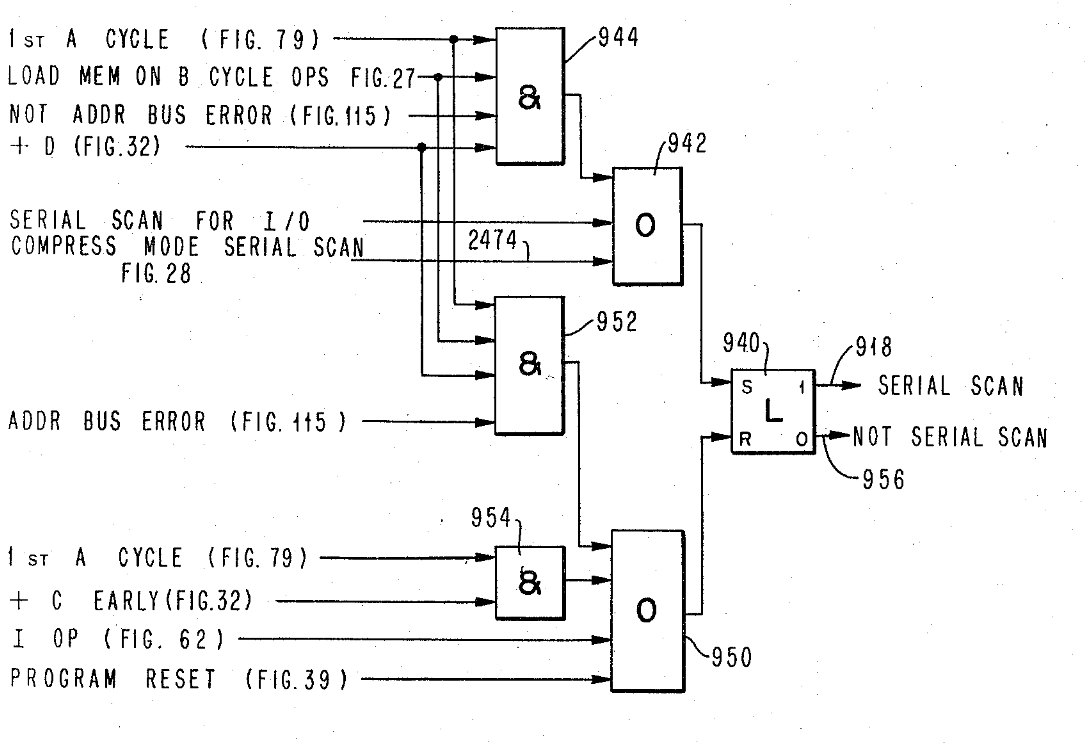

The SERIAL SCAN circuit is shown in FIG. 29 (sheet 25). This circuit is unmodified from that as shown in FIG. 56, Section 14*f* of the exemplary environmental system of said copending application, Ser. No. 332,648. As shown in said copending application, the COMPRESS MODE SERIAL SCAN signal on a line 2474 is shown by way of example as being applied to the OR circuit 942. Thus, the modification required to said system for the use of the compress circuits in accordance with the present invention is the generation of said COMPRESS MODE SERIAL SCAN signal on line 2474. It is to be noted, that this signal may set the SERIAL SCAN LATCH 940 whenever the signal is present. The remainder of the SERIAL SCAN CIRCUIT shown on FIG. 29 is described adequately in said copending application; it suffices here to understand that this circuit causes the exemplary environmental system to handle only one character at a time, rather than handling two characters at a time (as may be done in most cases in the system described in said copending application). This conforms with the description which has been given in this application, all characters being handled singly (or a single pair of related characters of two different operands being handled) in each cycle, as described herein.

Figure 28:
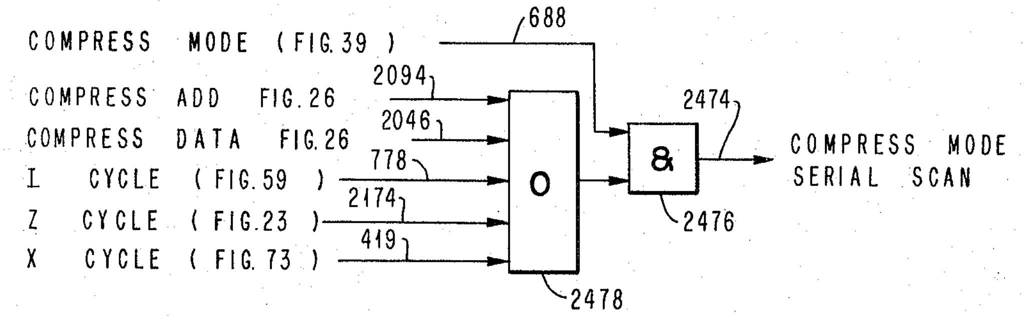

The COMPRESSOR MODE SERIAL SCAN signal on line 2474 is generated in FIG. 28 (sheet 25) by an AND circuit 2476 during COMPRESS MODE operation (688) in response to an OR circuit 2478 which is operative during any of the following: COMPRESS ADD (2094), COMPRESS DATA (2046), an I CYCLE (778), a Z CYCLE (2174), or an X CYCLE (419). Thus, during COMPRESS MODE which encompasses all of the operations described herein, one of the inputs to the OR circuit 2478 will be present, and the AND circuit 2476 will therefore generate a COMPRESS MODE SERIAL SCAN signal on a line 2474 which will cause the OR circuit 942 (FIG. 29) to set the SERIAL SCAN LATCH 940, thus insuring single character operation for all COMPRESS MODE functions which require it. It should be noted, however, that a normal ADD or MOVE DATA operation may be performed in COMPRESS MODE, the instruction read out handling three character addresses, one character at a time, but the ADD or MOVE DATA operation being executed two characters at a time as disclosed in said copending application.

(d) *Basic write timing*

Figure 30:
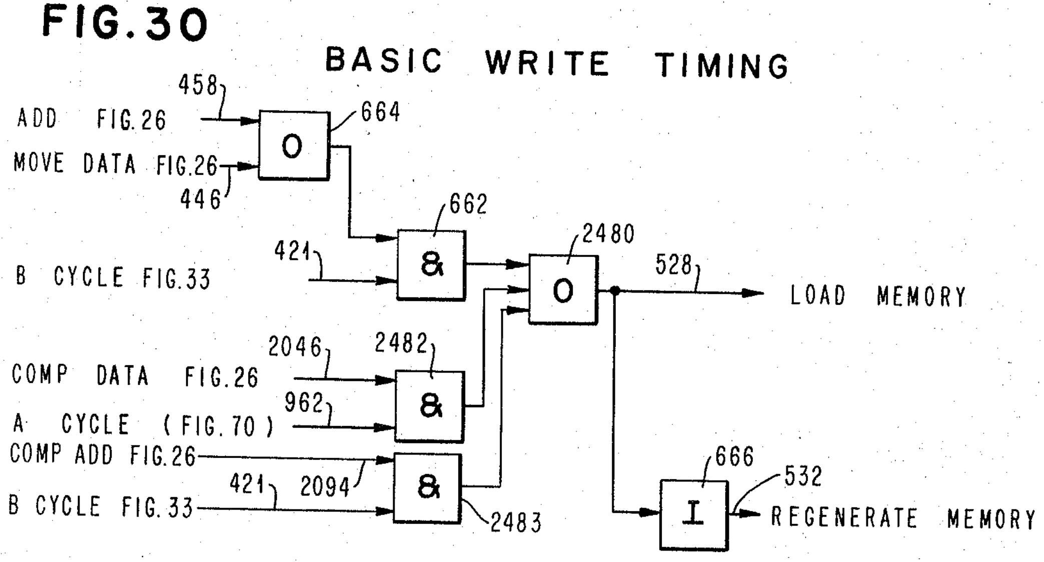
Figure 38:
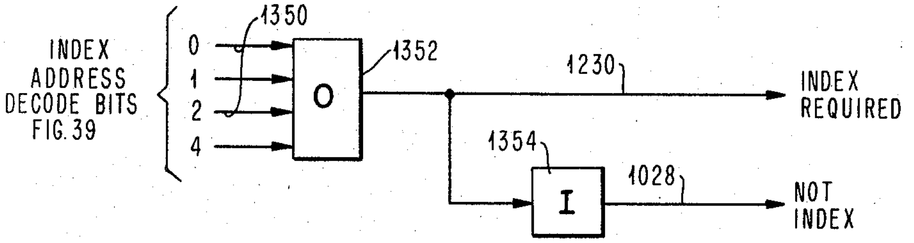

The BASIC WRITE TIMING circuit as modified for use with the COMPRESS CIRCUITS in accordance with the present invention is illustrated in FIG. 30 (sheet 26). The difference in this circuit from that shown in FIG. 38, Section 11*d* of said copending application, Ser. No. 332,648, is the inclusion of an OR circuit 2480 which permits three AND circuits 2482, 2483 to cause the generation of the LOAD MEMORY signal on line 528. The AND circuit 2482 is operative during an A CYCLE (962) of a COMPRESS DATA OPERATION (2046). The AND circuit 2483 is operative during a B CYCLE of a COMPRESS ADD operation 2094. As described in said copending application, the AND circuit 662 responds during a B CYCLE (421) of either an ADD (458) or a MOVE DATA (446) operation, due to an OR circuit 664. The purposes of this signal, and its relationship to the operation of the overall system are adequately described in said copending application.

(e) *Next cycle is I cycle*

Figure 31:
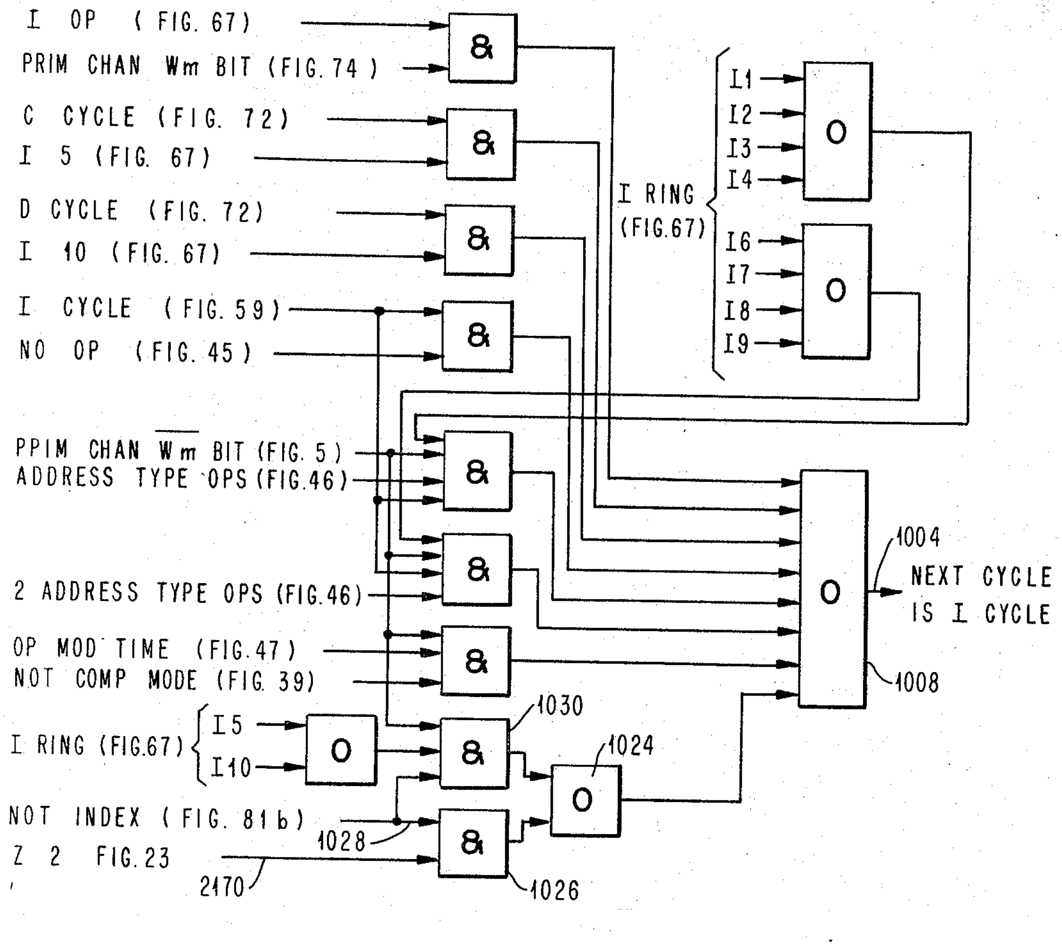

The circuit for recognizing when the next cycle to be performed should be an I CYCLE is illustrated in FIG. 31 (sheet 26). This circuit is not modified compared with that shown in FIG. 60, Section 16*b* of said copending application, it being significant only to recognize the fact that during instruction readout time, two Z cycles must be taken to expand a three character address with zones into a five character purely numeric address. Following the second of these cycles (Z2) the reading out of the instruction may resume. This is illustrated in the chart of I RING OPERATION, shown in FIG. 24 (sheet 22). Specifically at the bottom of FIG. 31, an OR circuit 1008 may generate the NEXT CYCLE IS I CYCLE signal on a line 1004 in response to an OR circuit 1024 which is operative by either of two AND circuits 1026, 1030. The AND circuit 1026 will be operative during the second Z cycle, Z2 (2170) provided no indexing is required as indicated by a NOT INDEX SIGNAL on a line 1028. Thus the AND circuit 1026 recognizes the case where the second Z cycle used for address expansion is being taken, and that instruction readout of the second or B field address may continue in a following cycle.

(f) *Last I cycle*

Figure 32:
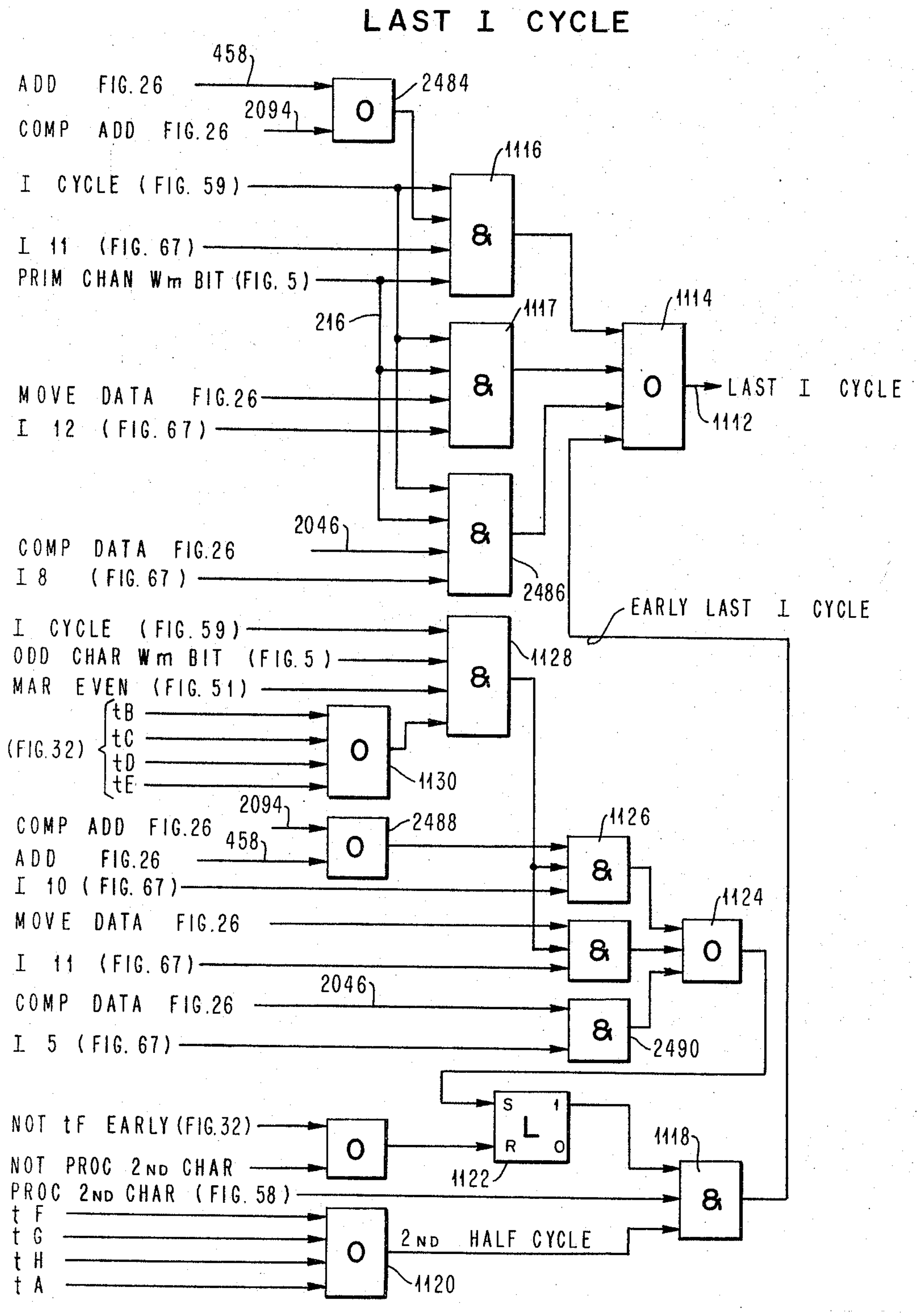

The LAST I CYCLE circuit (FIG. 39, Section 16*e* of said copending application), as modified for use with the COMPRESS CIRCUITS in accordance with the present invention, is illustrated in FIG. 32 (Sheet 27) herein. Modifications include the addition of an OR circuit 2484 (top of FIG. 32), an AND circuit 2486 (center of FIG. 32), an OR circuit 2488 (low-center of FIG. 32), and an AND circuit 2490 (bottom of FIG. 32). The OR circuit 2484 makes it possible for a COMPRESS ADD operation (2094) as well as an ADD operation (458) to energize the AND circuit 1116 thereby causing the OR circuit 1114 to generate a LAST I CYCLE signal on line 1112. Referring again briefly to FIG. 24 in conjunction with the following discussion, the instruction for a COMPRESS ADD operation is a NORMAL COMPRESS MODE instruction (center of FIG. 24) which utilizes I OP (to read out the operational portion defining the COMPRESS ADD), skips I1 and I2 cycles, utilizes I3, I4 and I5 to read out a first three character address (for the A field) utilizes Z1 and Z2 to expand the three character address to a five character address, skips I6 and I7, utilizes I8, I9 and I10 to read out a second three character address (for the B field), takes two Z cycles to expand the three character B field address into a five character address, and finally utilizes I11 to check for a WORD MARK bit on the PRIMARY CHANNEL 216. Thus, the last I CYCLE is defined by I11, and is recognized by the AND circuit 1116 during a COMPRESS ADD operation or an ADD operation by the OR circuit 2484.

The AND circuit 2486 is used in a similar fashion to define the end of the instruction time when a COMPRESS DATA operation instruction is being read out. In the case of COMPRESS DATA instruction, only a single address is utilized, so that the time I8 will be the time when a word mark bit will be sensed in the PRIMARY CHANNEL 216 as indicative of the starting of the following instruction; therefore I8 defines (by means of the AND circuit 2486) the last cycle necessary to read out the instruction and to determine that the end of the instruction has been taken.

The OR circuit 2488 performs the same function with respect to the AND circuit 1126 as does the OR circuit 2484 with respect to the AND cricuit 1116. In other words, during the read out of a COMPRESS ADD instruction (2094), which has no modifiers at I10 time (which is one cycle before I11 time), the OR circuit 2488 will cause the AND circuit 1126 to pass a signal to the OR circuit 1124 thereby setting the EARLY LAST I CYCLE LATCH 1122, all as described in detail in Section 16*e*, with respect to FIG. 69, of said copending application, Ser. No. 332,648. The AND circuit 2490 performs the same function with respect to the OR circuit 1124 as does the AND circuit 2486 with respect to the OR circuit 114; in other words, the AND circuit 2490 recognizes one I time before I8 time (this time is I5 due to the fact that I6 and I7 are skipped as shown in FIG. 24), during COMPRESS MODE instruction readout.

In summation, the modifications to the LAST I CYCLE circuit shown in FIG. 32 (sheet 27) merely account for the case when a COMPRESS ADD instruction is being read out to define the LAST I CYCLE as being I11, and setting EARLY LAST I CYCLE as result of I10, as well as accounting for the case when a COMPRESS ADD operation is being read out where the LAST I CYCLE will be I8, and EARLY LAST I CYCLE will be set at I5.

(*g*) *B cycle latch*

Figure 33:
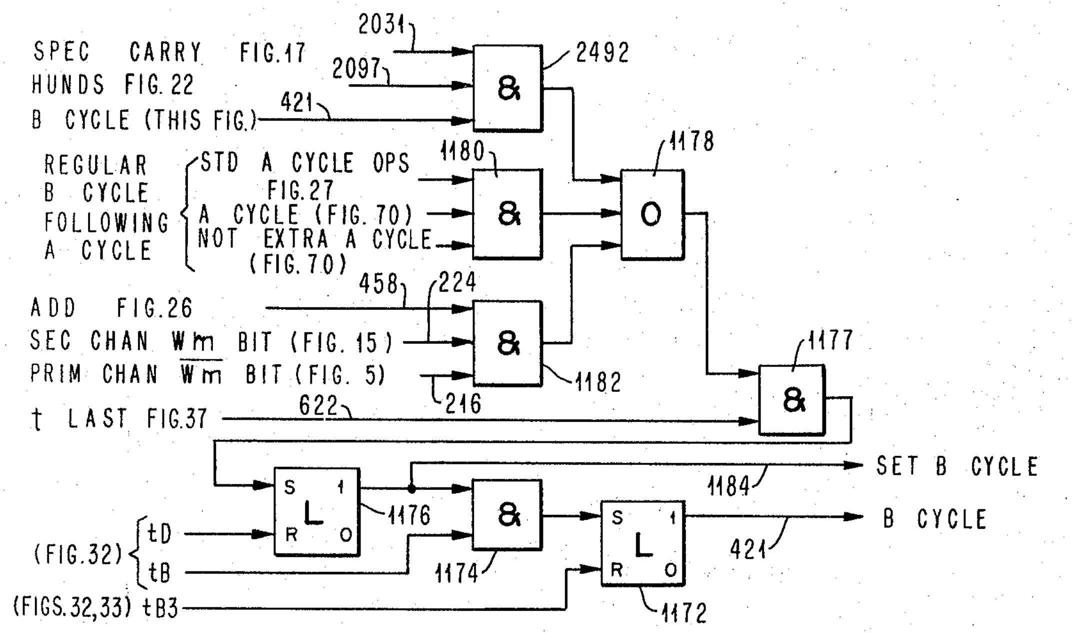

The modification to the circuit which generates the B CYCLE signal on line 421 for use with the COMPRESS CIRCUITS in accordance with the present invention is illustrated in FIG. 33 (sheet 28). The only difference between this circuit and the like circuit of FIG. 71, Section 17*c* of said copending application is the addition of an AND circuit 2492 which is operative to cause a further B cycle to take place whenever a SPECIAL CARRY (2031) occurs during a B CYCLE (421) while the HUNDS latch (2097) is set. The AND circuit 2492 is actually operative, therefore, only in the case where a COMPRESS ADD operation is being performed (the zone bits of an A field character being added to the zone bits of a B field character and converted into a set of zone bits for storage in the three character sum) and the SPECIAL CARRY is set whenever a carry occurs out of the A and B bits, weighted 1 and 2 (which are in the HUNDS character) and the carry must be reflected in the A and B bits, weighted 4 and 8 (which have already been stored in memory as part of the UNITS character). Thus, an additional B CYCLE is required to read out the units character of the result field, so that the SPECIAL CARRY may be reflected in the 4 and 8 zone bits contained within the units character of said result field.

(*h*) *X cycle latch*

Figure 34:
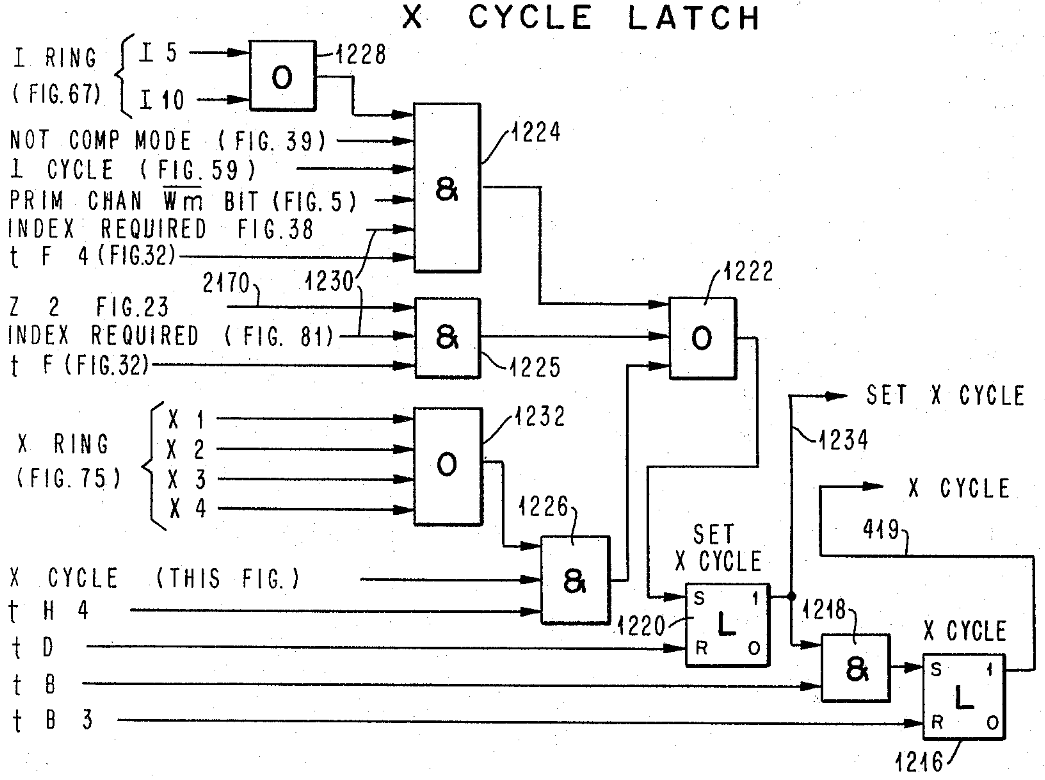

The X CYCLE LATCH shown in FIG. 34 (sheet 28) needs no modification from the way in which it is shown in FIG. 73, Section 17*e* of said copending application, Ser. No. 332,648. The circuit illustrates the fact that an AND circuit 1225 will cause an OR circuit 1222 to energize a SET X CYCLE LATCH 1220 at time *t*F of the second Z CYCLE, Z2 (2170), whenever indexing is required as indicated by the INDEX REQUIRED signal on line 1230. The operation of this circuit is fully described in Section 17*e* of said copending application, Ser. No. 332,648; it suffices here that indexing can be achieved (as shown in the "COMPRESS MODE WITH INDEXING" section of the I RING OPERATION CHART of FIG. 24) following the two Z cycles used to expand the three character address to a five character address, as necessary.

(*i*) *X RING CONTROL*

Figure 35:
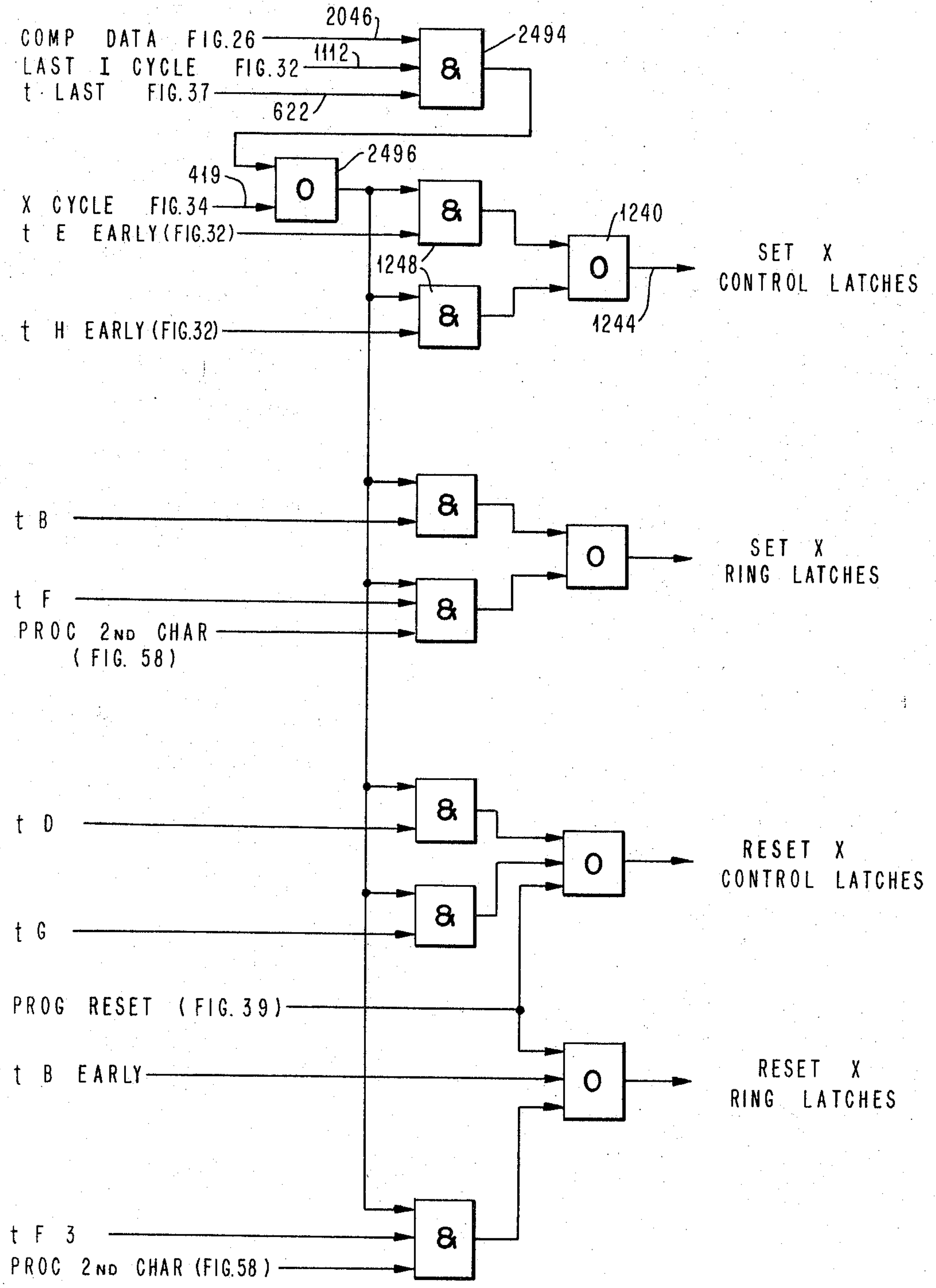

The modifications required to utilize the X RING CONTROL circuit of FIG. 74 Section 17*f* of said copending application with the COMPRESS CIRCUITS in accordance with the present invention are shown in FIG. 35 (sheet 29) herein. These inclunde the provisions of an AND circuit 2494 and an OR circuit 2496 the operation of which is to set the X RING into operation during the execution of a COMPRESS DATA instruction (2046). As described in Sections 3*f* and 3*g*, hereinbefore, the execution of a COMPRESS DATA operation as embodied herein comprises storing a five character address found in the BAR, at a location in memory specified by the AAR; the thousands and ten thousands orders of the five character address are converted into zones to be placed within the units and hundreds characters of a three character address to be stored. In order to achieve this, the units, tens and hundreds positions of the address in the BAR are distinguished by utizing the X RING control signals, X1, X2, and X3. With or without the modifications, an X CYCLE signal on a line 419 causes an AND circuit 1248 to be energized at time *t*E EARLY, thereby causing an OR circuit 1240 to generate a SET X CONTROL LATCHES SIGNAL on a line 1244, which signal starts the X RING into operation.

As modified in FIG. 35 herein, the AND circuit 1248 responds to the OR circuit 2496 which OR circuit not only responds to the X CYCLE signal on line 519, but also responds to the AND circuit 2494 so as to start the X RING at time *t* LAST (622) of the LAST I CYCLE (1112) when a COMPRESS DATA instruction (2046) is being read out during an instruction read out operation. Otherwise, the circuit shown in FIG. 35 operates in a manner and for the purposes described in detail in Section 17*f*, with respect to FIG. 74, of said copending application, Ser. No. 332,648.

(*j*) *Last execute cycle*

Figure 36:
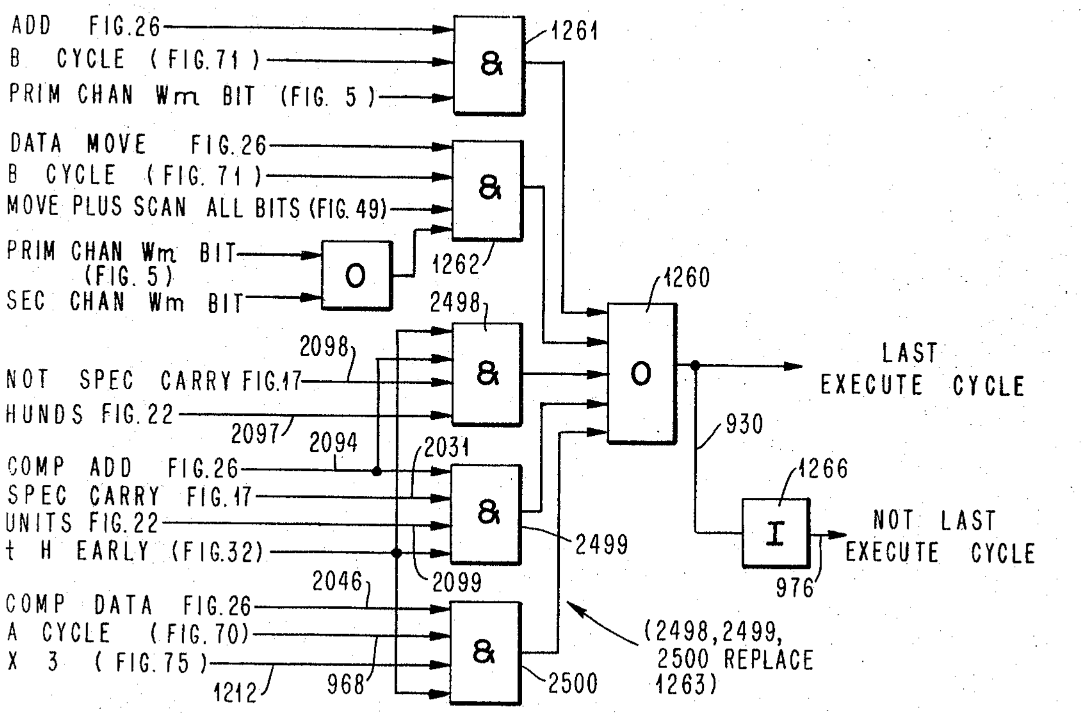

In the LAST EXECUTE CYCLE circuit, as modified for use in conjunction with the present invention, as shown in FIG. 36 (sheet 30) herein, an AND circuit 1263 (shown in FIG. 76 and described in Section 18*a* of said copending application 332,648) is replaced by three AND circuits 2498–2500 which are in fact illustrative of "OTHER OPS AND OTHER CONDITIONS" with which said replaced AND circuit 1263 was concerned. Specifically, the AND circuits 2498, 2499 cause the OR circuit 1260 to recognize the LAST EXECUTE CYCLE at time *t*H EARLY of a COMPRESS ADD operation (2094), the AND circuit 2498 recognizing the HUNDS cycle (2097) as the LAST EXECUTE CYCLE whenever there is no SPECIAL CARRY as indicated by the NOT SPECIAL CARRY SIGNAL on line 2098, and the AND circuit 2499 recognizing the second UNITS cycle (2099) as the last cycle whenever there is a SPECIAL CARRY (2931). The purpose for these AND circuits is described in Sections 3*h* and 3*i*, hereinbefore, wherein a COMPRESS ADD operation is described as including adding the UNITS, TENS and HUNDS, the carry from the numerics into the zones of the HUNDS positions occurring, and the carry from the 1 and 2 zone bits contained within the HUNDS order of the character having to be reflected in an additional carry correction cycle wherein the UNITS order of the result is again brought out so that the SPECIAL CARRY from the 1 and 2 bits may be added to the 4 and 8 bits represented by the A and B bit zones of the units order. If there is a SPECIAL CARRY, then an additional UNITS cycle must be taken in order to accomplish this carry correction; this situation is handled by the AND circuit 2499. If there is no SPECIAL CARRY, then the HUNDS cycle (wherein the 1 and 2 zone bits are added) is the last cycle. This situation is taken care of by the AND circuit 2498.

The AND circuit 2500 is operative during the execution of a COMPRESS DATA instruction (2046) to recognize the third A CYCLE 968 by means of the X3 signal on line 1212 to be the LAST EXECUTE CYCLE. In the execution of a COMPRESS DATA instruction, only three cycles are required since the operation merely reads out the units, tens and hundreds orders of the BAR, and zone bits are placed over the units and hundreds orders in order to reflect the data content of the thousands and ten thousands orders of the same address register (the BAR). In all other respects, the operation and purposes of the LAST EXECUTE CYCLE circuit of FIG. 36 are the same as described with respect to FIG. 76, Section 18*a* of said copending application, Ser. No. 332,648.

(*k*) t *Last*

Figure 37:
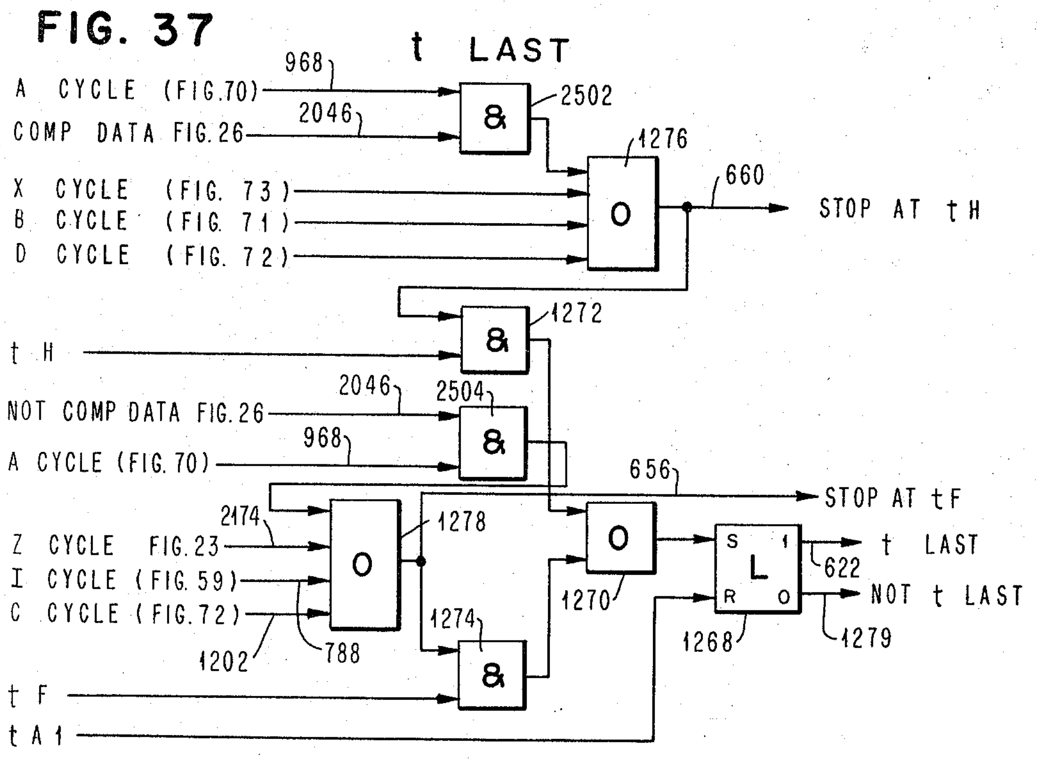

The circuit which generates the signal indicative of the last timing period of a given cycle, time *t* LAST, is shown in FIG. 37 (sheet 30) as modified for an application wherein the COMPRESS CIRCUITS in accordance with the present invention are utilized. The modifications to this circuit include only the provision of an AND circuit 2502 to cause a long cycle (one which goes as far as time *t*H) whenever a COMPRESS DATA (2046) operation is being performed, said operation utilizing an A CYCLE (968) to move data from an address register into storage; this is a departure from the operation of the environmental system described in said copending application, 332,648, wherein all memory storage cycles are handled by B CYCLE control.

Since the A CYCLE (968) associated with a COMPRESS DATA operation (2046) is a memory loading operation requiring a cycle which includes time *t*H, it follows that any A cycle associated with a COMPRESS DATA operation cannot stop at time *t*F. Therefore, the AND circuit 2504 gates the A CYCLE signal on line 968 with a NOT COMPRESS DATA SIGNAL on a line 2046. In other words, the operation of the AND circuit 2502 and the AND circuit 2504 is purely complimentary, one permitting the longer cycle (*t*H), and the other preventing the shorter cycle (*t*F) whenever a COMPRESS DATA OPERATION (2046) is involved. In all other respects, the circuit of FIG. 37 is as described with respect to FIG. 77, Section 18*b*, of said copending application.

(9) INDEX REGISTERS AND ADDRESS GENERATOR (*a*) *Register identification*

Fifteen index registers are available in the environment of said copending application, Ser. No. 332,648. These registers are number 0 through 14. The memory address is found by decoding a 4-bit binary number (with a range of 0 to 14). The four bits required for said binary number are an integral part of a five character address of an operand, and are stored in the zone positions of the hundreds and tens orders of said address. Since, in MEMORY, this address consists of five discreet characters, and requires five positions of storage, five pairs of zones (one pair in each character) are available for various uses, such as storing index register identification tags.

A major difference in this embodiment is as follows: due to the compressed characteristics, whereby a five character address is compressed into three characters, and the two high orders of the five character address are stored in the hundreds and units orders zones of the field as shown in FIG. 6 (sheet 5). This leaves only the zones in the tens order character available for other purposes, such as index register identification. To accommodate this factor, the zone bits in the tens character will control indexing, and the latches 1342, 1343 will be set by corresponding OR circuits 2506, 2508, in response to an AND circuit 2510 which operates during a COMPRESS MODE OPERATION (688) in response to an OR circuit 2512. The OR circuit 2512 recognizes that either the AND circuit 1344 or the AND circuit 1345 has been operated so as to set a corresponding latch 1340, 1341. In other words, the zone bits over the tens order of the address being read out are monitored for indexing, and if either one of these bits is present, it will not only set the corresponding latch 1340, 1341, but will also force both of the latches 1342, 1343 to be set so as to give the same INDEX ADDRESS DECODE bits output of FIG. 39 as would occur in said copending application had both A and B zone bits been present in the hundreds order of the five character address being read out therein.

This limits the COMPRESS MODE indexing to use of index registers which have relatively high addresses due to the fact that any index register to be specified is identified by bits including the 2 bit and 4 bit of the INDEX ADDRESS DECODE BITS, whereas in the five character indexing described hereinabove with respect to said copending application, or in the present embodiment when the system is operating in other than COMPRESS MODE, the 2 and 4 bits might be totally absent, or any combination of them present.

(*b*) *Generator—tens*

Figure 39:
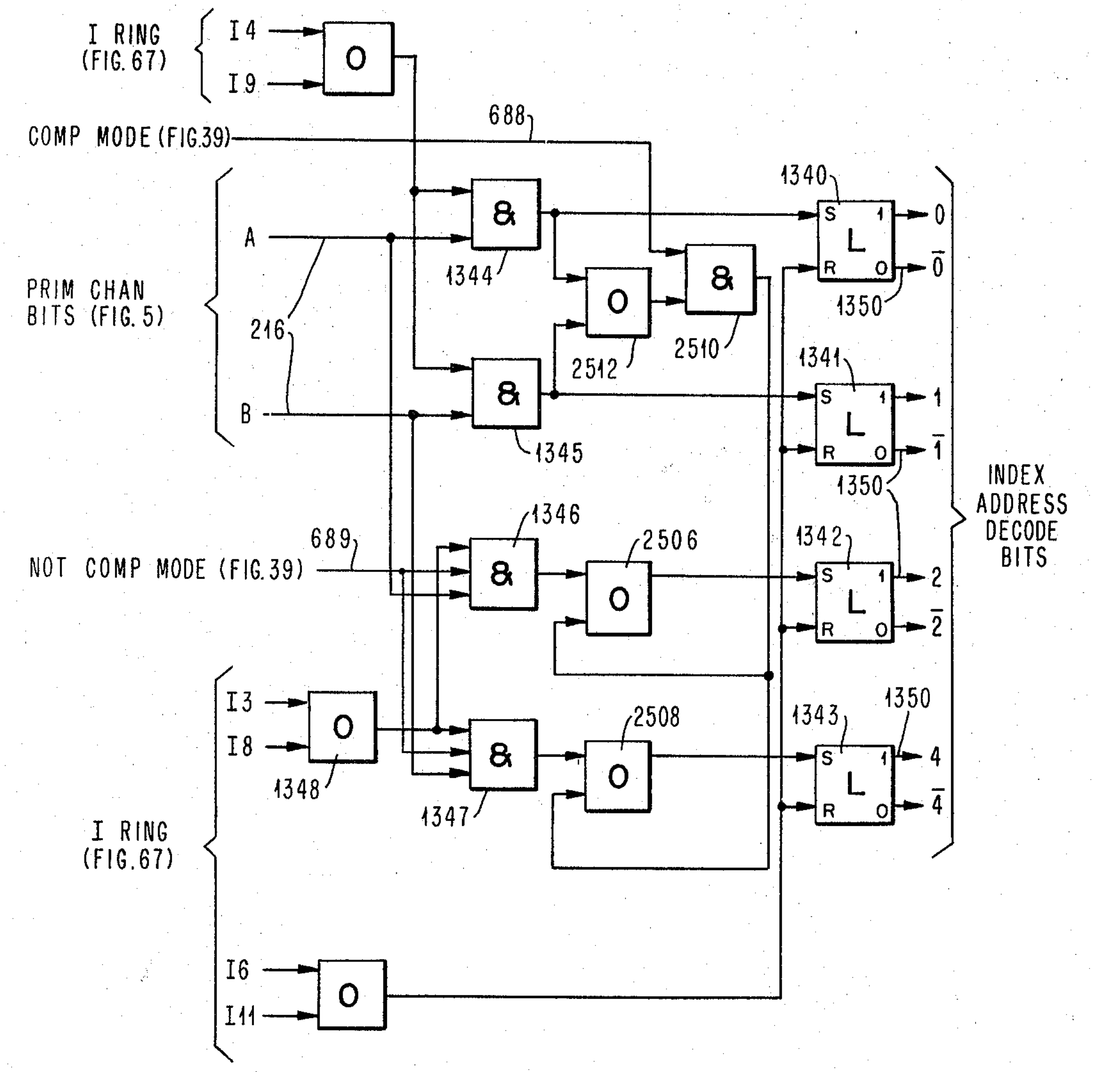
Figure 40:
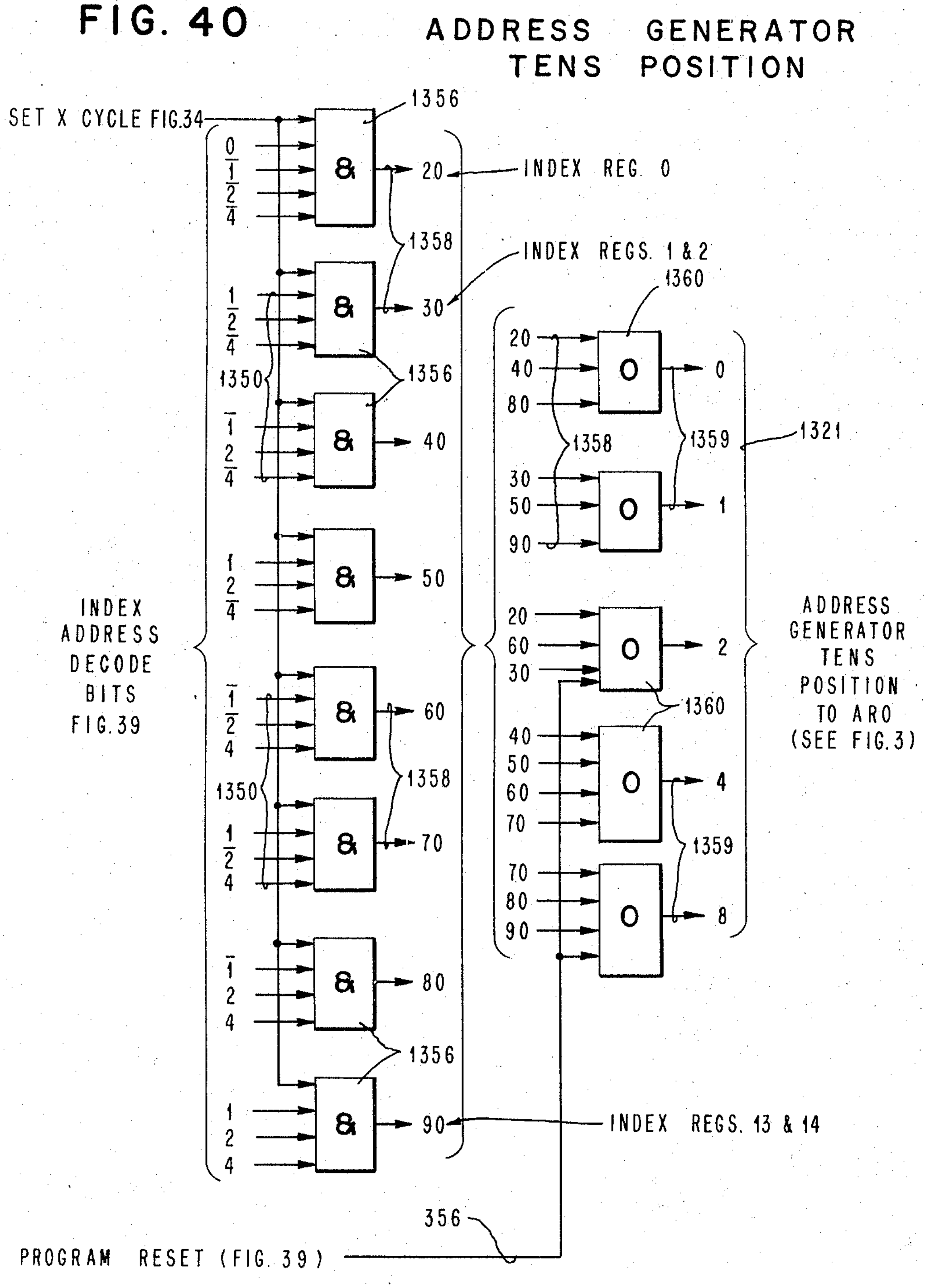
Figure 41:
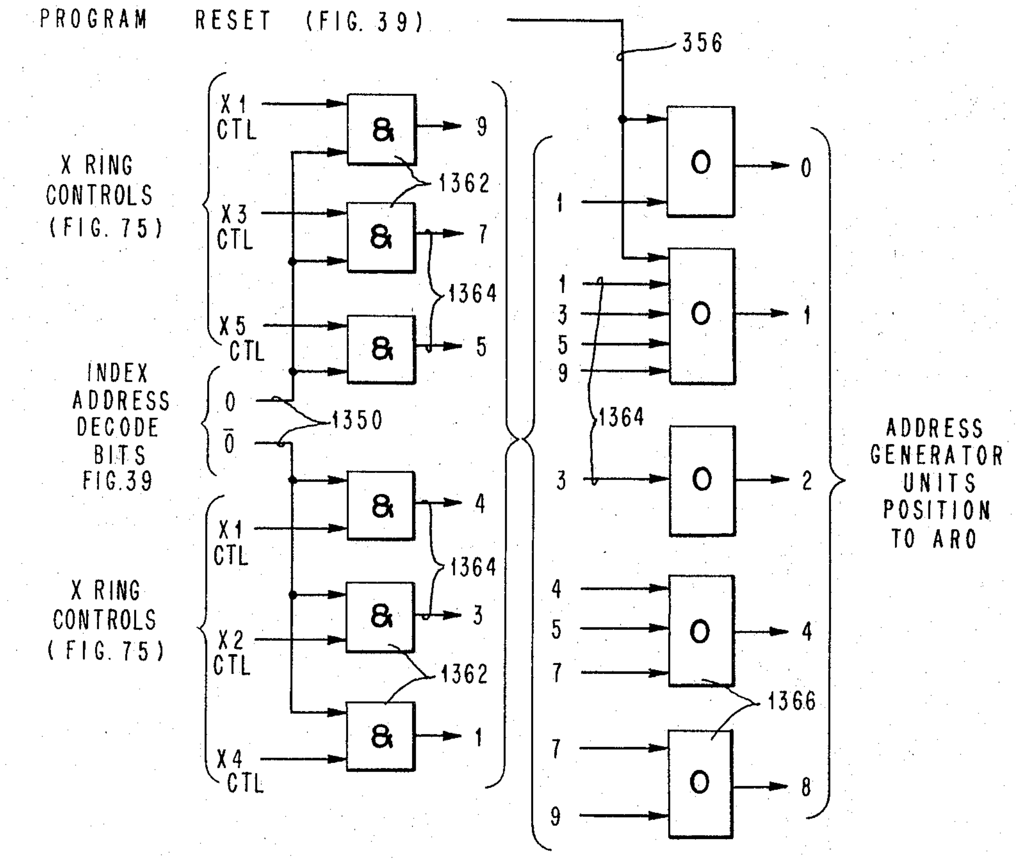
Figure 42:
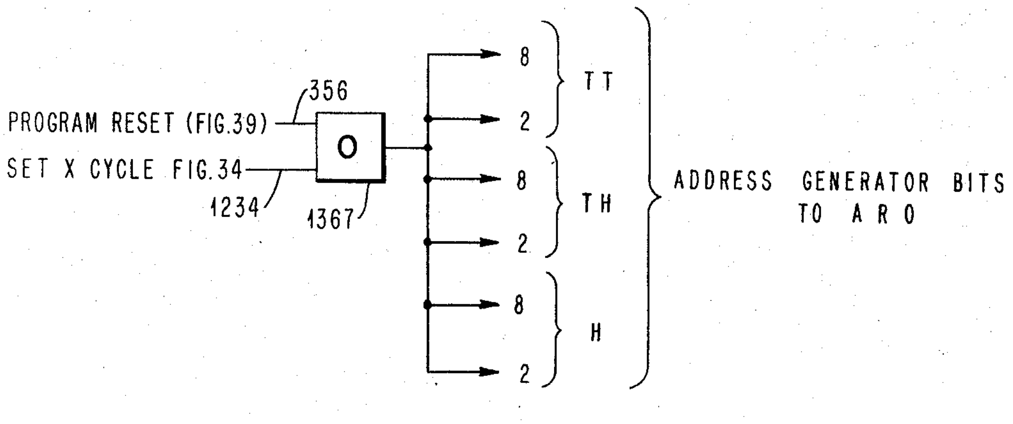

The ADDRESS GENERATOR is shown in FIGS. 40–42. In FIG. 40, the INDEX ADDRESS DECODE BITS from FIG. 39 are applied on lines 1359 to a plurality of decoding AND circuits 1356 which generate decimal values 20 through 90 on lines 1358. The reason for this is that fifteen registers, comprising storage for five characters each, are located in MEMORY, at addresses chosen to be 00025 through 00099 (hereinafter referred to as '25 through '99). Thus, the decimal values of the outputs of AND circuits 1356 equal the TENS position of the addresses of the registers; the first index register is at addresses '25–'29; the second index register is at addresses '30–'34; the third index register is at addresses '35–'39; and the last index register is at addresses '95–'99. The INDEX ADDRESS DECODE BITS are therefore weighted to represent the successive index registers, and are decoded to equal the respective addresses.

The decimal values 20–90 on lines 1358 are applied to a plurality of OR circuits 1360 to generate two-out-of-five code equivalents to the decimal values, on lines 1359. The two-out-of-five code combinations on lines 1359 comprise the address generator TENS position bits which are applied to the ARO 1302.

The PROGRAM RESET signal on line 356 forces an address of '00 by generating the 2-bit and 8-bit of the two-out-of-five code on lines 1359. This permits generating an instruction address of 00$\underline{0}$01 (the TENS position only being generated here), so as to permit starting a program after reset. This use of the ADDRESS GENERATOR has nothing to do with indexing, but only with PROGRAM RESET.

(*c*) *Generator—units*

The 0 and $\overline{0}$ representation of the index ADDRESS DECODE BITS are applied to a plurality of AND circuits 1362 and 1364 in FIG. 41 (sheet 33). When there is a $\bar{0}$ on one of the lines 1350, then the address is between 30 and 35, 40 and 45, . . . 50 and 55. On the other hand, when the 0 bit is present on a line 1350, then the address is between 25 and 30, 35 and 40, . . . 85 and 90. The output of the AND circuits 1362 (FIG. 41) on lines 1364 indicate the relationship just described. These outputs are applied to a plurality of OR circuits for encoding into the two-out-of-five code in the usual fashion; for instance, the output of the top AND circuit 1362 equals a decimal value of 9, which comprises an 8 bit and a 1 bit; therefore, the 9 is applied to the OR circuit 1366 which generates the 1 bit and to the OR circuit 1366 which generates the 8 bit.

(*d*) *Generator—H, TH, TT*

In FIG. 42 (sheet 33), the ADDRESS GENERATOR H, TH, TT circuit will generate only 8 bits and 2 bits, which equal ZERO in the 2/5 code used in the ADDRESS CIRCUITS. During indexing, this is achieved by an OR circuit 1367 in response to the SET X CYCLE signal on line 1234. Additionally the PROGRAM RESET signal on line 356 forces the UNITS 0 and 1 bits and the H, TH, and TT 2 and 8 bits, of the two-out-of-five code (FIGS. 41, 42) so as to generate the INSTRUCTION ADDRESS 0000$\underline{1}$, as mentioned above.

(*e*) *Summation*

In summation, each address being read out with an instruction may or may not have zone bits in the tens (T) and hundreds (H) positions of the address, or in the tens position only when in COMPRESS MODE. If there are zone bits, these indicate that an index operation is required, and the indexing increment is determined by a value stored in a particular index register at a particular address in memory. The particular address in memory is determined by the zone bits actually found over the H and T positions in regular operation, or just the T position in a COMPRESS MODE operation, as decoded, the 1, 2, and 4 bits specify the decimal values, a zero bit specifying it as the high half of that decimal value, and the lack of a zero bit specifying it as in the low half of the decimal value. For instance, if INDEX ADDRESS DECODE BITS of 0, 1, and 4 are present, and 1 and 4 will cause a decimal 70 and the zero will indicate that it is between 75 and 79. The zero indication is converted into an ADDRESS GENERATOR UNITS POSITION values, whereas the decimal portion is converted to ADDRESS GENERATOR TENS POSITION values, both in the two-out-of-five code. The address generator hundred, thousands and ten thousands positions are normally set to zero, which equals an 8 and 2 combination in the two-out-of-five code.

From the foregoing description of the INDEX REGISTER & ADDRESS GENERATOR as modified for use in either the COMPRESS MODE or in the regular mode described in the copending application, it can be seen that the compress mode index registers are limited to those utilizing both the two and the four bit, which includes index registers in the 80's and 90's due to two AND circuits 1356 nearest to the bottom of FIG. 40. However, instead of forcing the 2 bit and 4 bit, the not 2 and not 4 could be used, thereby accessing index registers 1–3, if desired. It should be recalled that the index registers are five characters wide; that is, given the address of one of the registers, the indexing operation will cause this address to be incremented a number of times so as to read out five characters in the index register (when not in compress mode); when in compress mode, two of the characters will not be utilized, but this does not hamper the operation of the system at all and permits simpler control between the selective use of the compress circuits and the non-use thereof.

(10) CHANGES IN ADDRESS MODIFICATION CIRCUITS (*a*) *Generally*

Address modification is the same in this embodiment as in Section 21 of said copending application, due to the fact that the SERIAL SCAN circuit (FIGS. 28, 29, Section 8*c* herein) cause single character operation by inhibiting PROCESS 2ND CHARACTER (Section 14*e* of said copending application). PROCESS 2ND CHARACTER, in turn, controls MOD BY 0, 1, and 2 as described in Section 21*a–c* of said copending application.

(*b*) *Plus/Minus/Scan*

Figure 43:
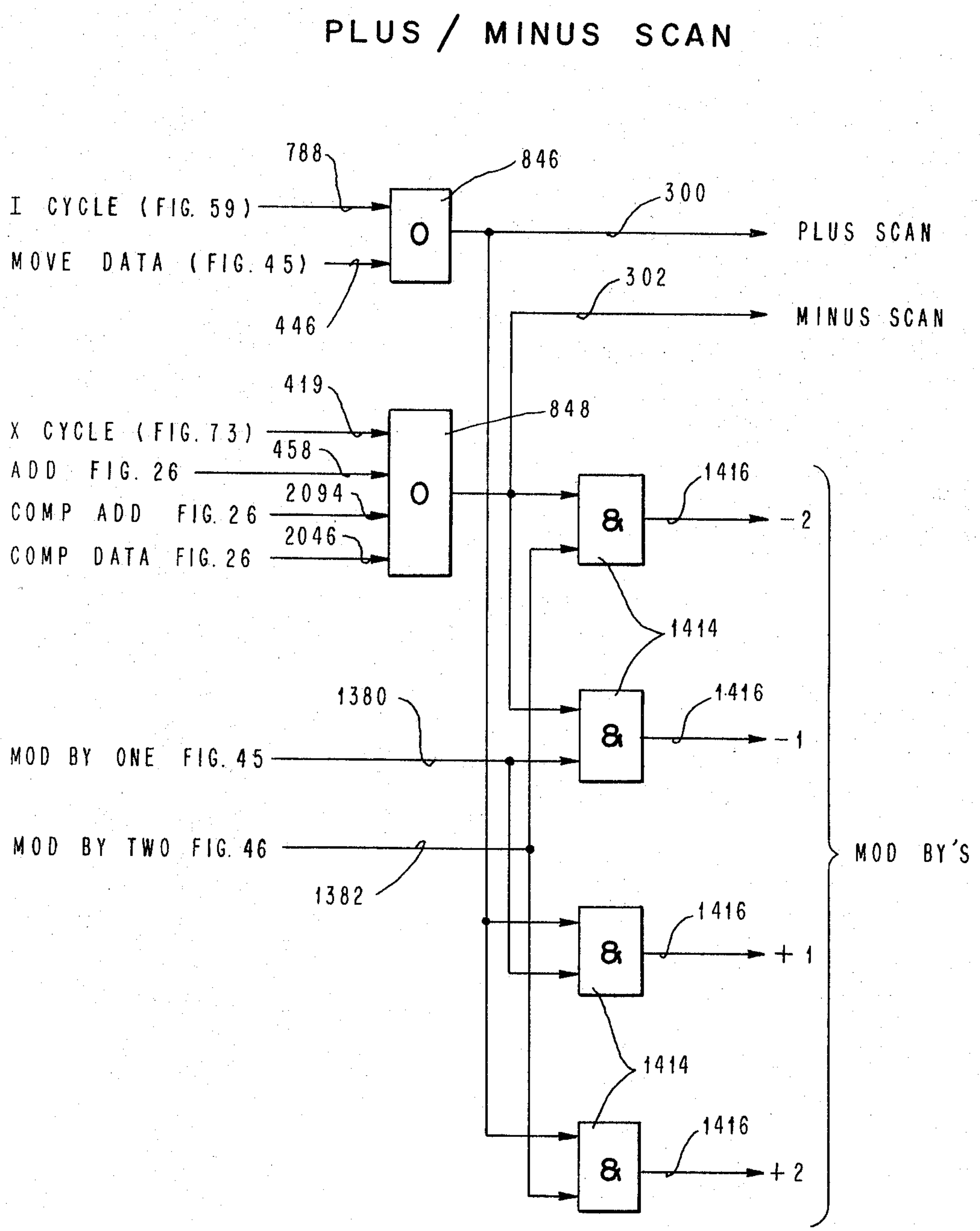

The PLUS/MINUS/SCAN circuit is modified as shown in FIG. 43 (sheet 34) by expanding the number of inputs to the OR circuit 848 to include COMPRESS ADD (2094) and COMPRESS DATA (2046). Thus, the OR circuit 848 calls for MINUS SCAN (from high address to low address, which is equivalent to scanning from low order to high order of the various operand values stored in memory). The reason for this with respect to COMPRESS ADD is obvious in view of the fact that a normal (expanded) ADD operation is performed with minus scan. When a COMPRESS DATA operation is involved, the units are stored first, then the tens and then the hundreds; thus, scanning memory from low order to high order (or from high address to low address) is required, and this is defined as a MINUS SCAN herein.

(11) ADDRESS REGISTER CONTROL CIRCUITS (*a*) *Serial set*

The SERIAL SET signal on line 1500 is utilized in this system to cause the address registers to receive a single character of information, when information is being received thereby one character per cycle over the five bit bus 1325 from the ADDRESS ENTRY CHANNEL DECODE & GATE 1324 (FIG. 3), as described in detail with respect to FIG. 96, Section 23*b* in said copending application, Ser. No. 332,648. As shown in FIG. 44 (sheet 35) herein, the circuit has been modified by providing an additional AND circuit 2516 to permit setting of the address registers during Z cycles, at time *t*H, by passing a signal through the OR circuit 1502 to generate the SERIAL SET signal on line 1500.

(*b*) *Gate BAR and ARO*

Figure 45:
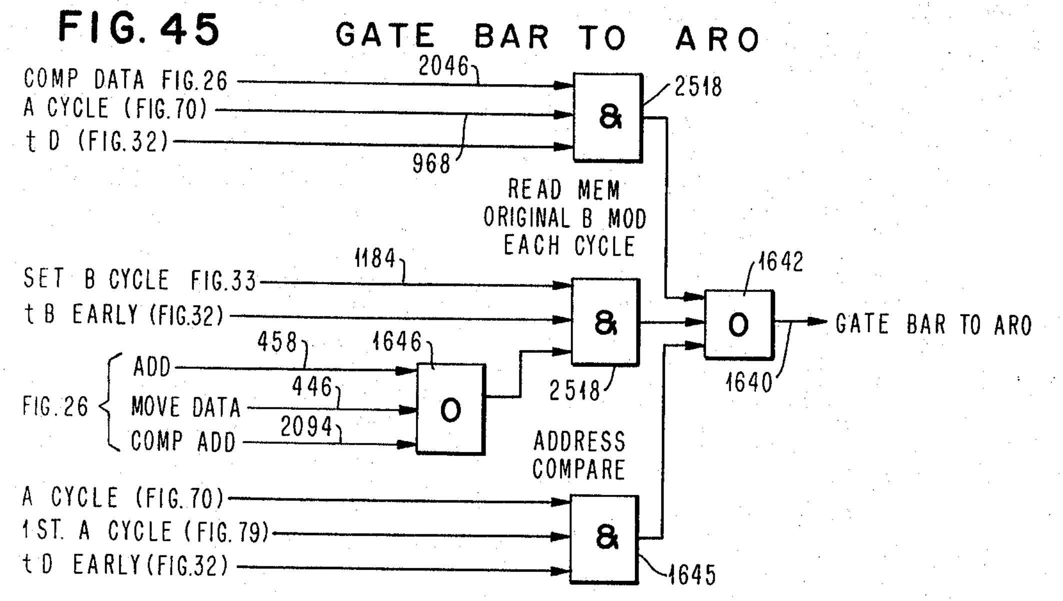

The GATE BAR to ARO circuit shown in FIG. 45 (sheet 35) is modified by adding an input to the OR circuit 1642 from an AND circuit 2518 which is utilized to gate the contents of the BAR through ARO, to the ADDRESS EXIT CHANNEL 248 (FIG. 3) in COMPRESS DATA operations (2046) wherein A cycles are taken to compress and store the contents of the DAR at an address identified by the AAR as described in Section 3*f* and 3*g* hereinbefore. Also, the OR circuit 1646 is supplied with an additional input to permit normal use of the BAR during a COMPRESS ADD (2094) which of course is identical to the use thereof as is effected during an ADD operation 458. In all other respects, the circuit is explained, with reference to FIG. 105 of said copending application in Section 24*a* thereof.

(*c*) *Gate CAR, Gate DAR*

Figure 46:
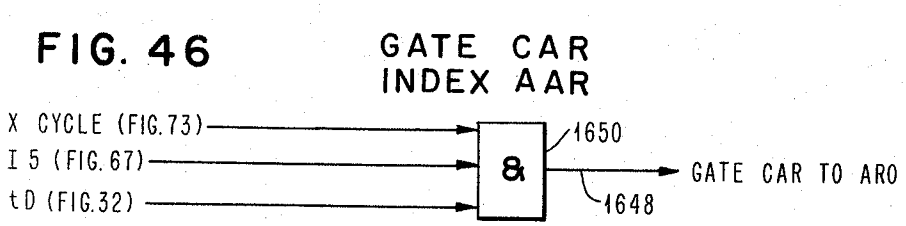
Figure 47:
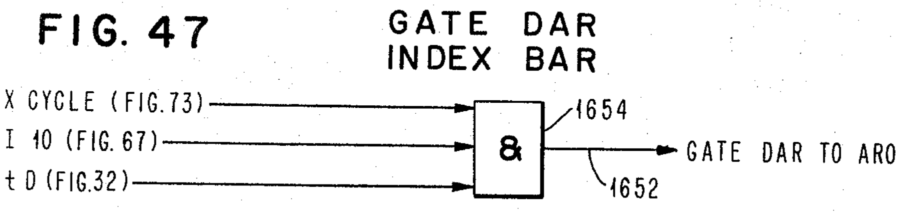

The circuits for gating CAR and DAR shown in FIGS. 46 and 47 (sheet 35) are identical to the circuit of FIGS. 106 and 107 described in Section 24*a* of said copending application, Ser. No. 332,648; the circuits are included herein for completeness only.

(*d*) *Serial select*

Figure 48:
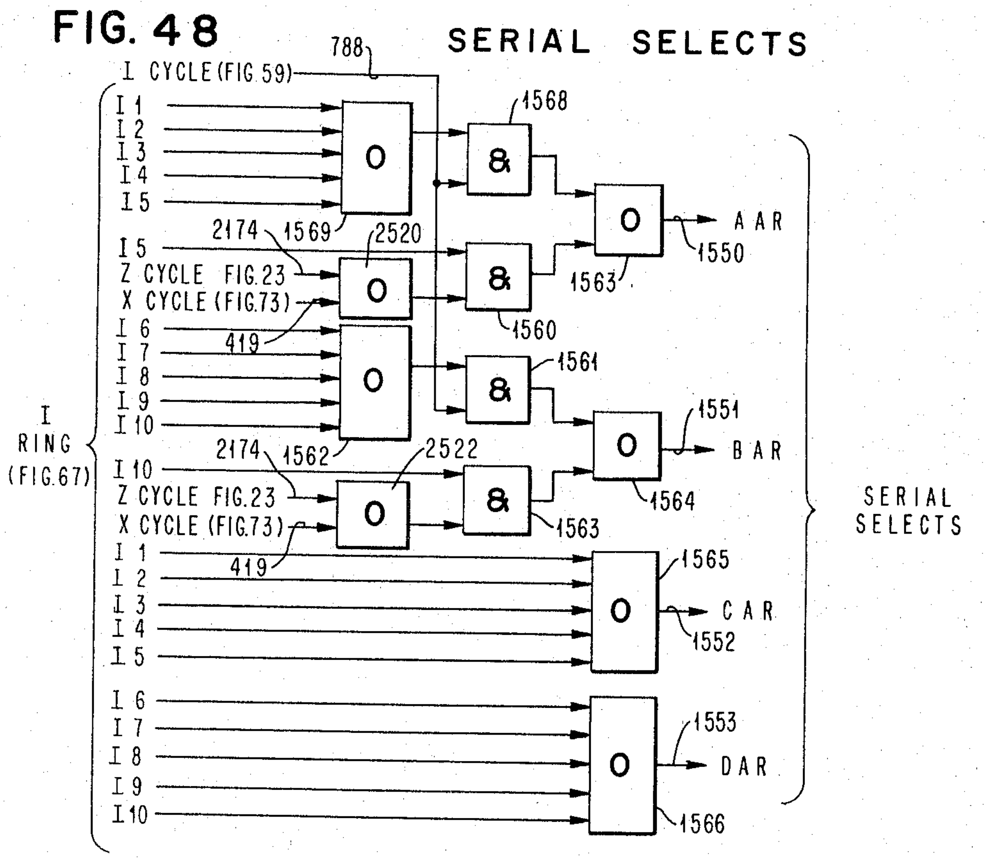

The SERIAL SELECT circuit shown in FIG. 48 (sheet 36) has been modified by the addition of two OR circuits 2520, 2522. These OR circuits permit gating the AAR and DAR, respectively, during Z cycles (2174) in the same fashion as is provided for X CYCLES (419) in FIG. 98, Section 23*b* of said copending application, Ser. No. 332,648. The reason for this is that the AAR must be able to receive the thousands and ten thousands orders which are generated in the Z1 and Z2 cycles, respectively, following I5 time (see FIG. 24) and the BAR must be receptive to the thousands and ten thousands position thereof which are generated by the COMPRESS CIRCUIT during the Z1 and Z2 cycles, respectively following I10 time (see FIG. 24). In all other respects, the operation and purposes of the SERIAL SELECT circuit shown in FIG. 48 is identical to that shown in FIG. 98 described in Section 23*b* of said copending application.

(*e*) *Serial address position selection*

Figure 49:
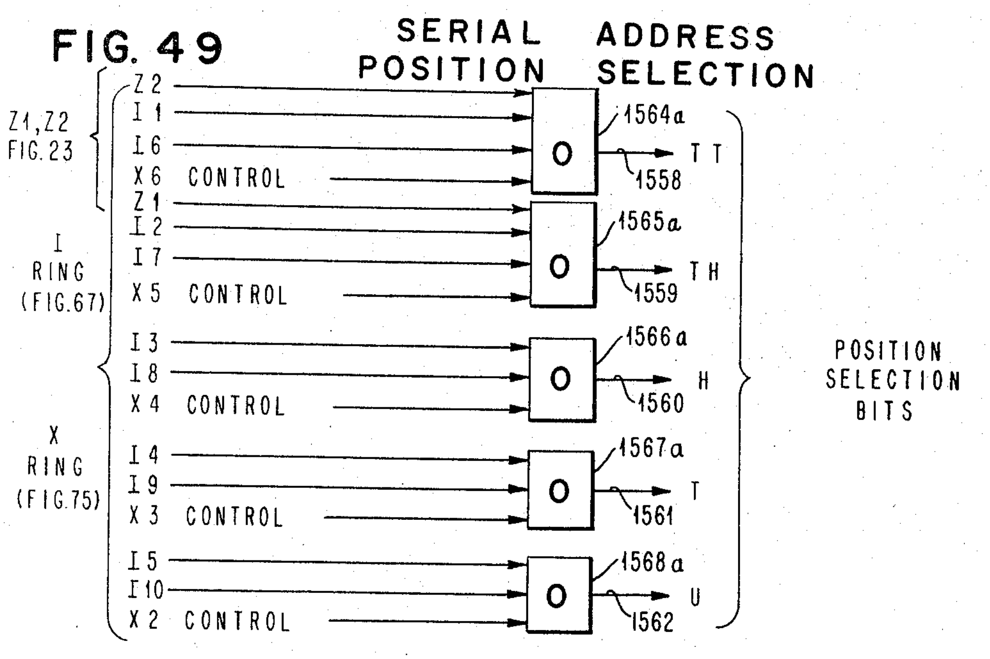

In FIG. 49 (sheet 36) the SERIAL ADDRESS POSITION SELECTION circuit is modified to the extent that the OR circuits 1564*a*, 1565*a* include Z2 and Z1 inputs, respectively, so as to select the ten thousands and thousands, respectively, orders of appropriate address registers during the Z cycles wherein the zone portions of a three character address are utilized to create the thousands or ten thousands orders of a five character address. In all other respects, the circuit of FIG. 49 operates in a manner and for the purpose that is described with respect to FIG. 99 in Section 23*b* of said copending application, Ser. No. 332,648.

(12) SUMMARY AND EXAMPLES OF EQUIVALENT FORMATS

The gist of the format used herein is that the total data representing content of a character may be utilized to represent pure numeric (unpacked or expanded), alphabetic, or packed numeric wherein zone bits of a pair of characters are used to represent one order of a value, two other orders of which are represented by the numeric portions of the same pair of characters. Another characteristic is that low-ordered characters contain high-ordered zone bits, and high-ordered characters contain low-order zone bits. This permits carries from numeric portions to zone portions in the same cycle that the high-ordered numerics and low-ordered zones are added.

The format could vary from the explicit example herein, however. For instance, if four zone bits were utilized in each character, the ZONE REGISTER could be expanded to four bits, and carries could propagate directly to the zones of each character as corresponding numerics are added. The conversion circuit and two bit ZONE ADDER would still be appropriate with certain obvious changes. Also the ZONE ADDER and CONVERSION could be expanded to four bits and the operation remain the same as described herein. Similarly, one zone bit in each of four characters could be utilized, if necessary. Although the carry which results from adding the units order zone bits is ignored herein, this could be applied, in an obvious manner, to the low-order numerics of another pair of characters so as to chain successive pairs of characters which represent these values (2 numeric, 1 zone) into large data words of a single value having many more orders.

Another variation possible with this invention is having three characters related such that the three numeric portions represent the three lowest orders of a value, and additional orders are represented by: 1, 2; 4, 8; and 16, 32 bits; respectively in the hundreds, tens and units orders of the three-character set. This would permit three characters to represent up to 63,999 in value, in accordance with the present invention.

The foregoing and other changes in the format, hardware details, and operation of the present invention may be made without departing from the spirit and scope thereof, which is limited only as set forth in the following claims.

What is claimed is:

1. In a data processing system wherein data comprises character manifestations, each character having adjacent zone and numeric portions, and wherein said data is processed in accordance with instructions, each instruction comprising a plurality of character manifestations representing an operations part, and at least one instruction also comprising a first address portion and a second address portion; a compressed data arithmetic apparatus, comprising:

a storage means having a plurality of addressable locations for holding groups of character manifestations expressing the orders of values, some of said orders being represented by the numeric portions of characters in said groups and the rest of said orders being represented by the zone portions of a number of said characters in said groups;

first address means connected to said storage means, operable in accordance with said instruction first address portion, for gaining access to a first group of character manifestations;

second address means, connected to said storage means, operable in accordance with said instruction second address portion, for gaining access to a second group of character manifestations;

a numeric adder having two inputs, for receiving portions of two characters, and an output for emitting a numeric portion which is a function of the inputs;

a zone adder having two inputs, for receiving portions of two characters, and an output for emitting a zone portion which is a function of the inputs;

first numeric transfer means connected to said numeric adder inputs and to said storage means, under the control of said instruction operation portion, for directing from said storage means to said numeric adder inputs the orders of said first value represented by the numeric portions of said characters in said first group and the corresponding orders of said second value, as accessed by said first and second address means;

first zone transfer means connected to said zone adder inputs and to said storage means, under the control of said instruction operation portion, for directing from said storage means to said zone adder inputs the orders of said first value represented by the zone portions of said number of characters in said first group and the corresponding orders of said second value represented by the zone portions of said number of characters in said second group, as accessed by said first and second address means;

and second numeric and zone transfer means connected respectively to said numeric and zone adder outputs and to said storage means, under the control of said instruction operation portion, for returning to the addressable storage locations accessed by said second address means, in which said second group of character manifestations were located, the corresponding numeric portions and zone portions emitted from said numeric adder and zone adder outputs.

2. In a data processing system of the type having storage means containing a plurality of addressable storage locations for storing data manifestations and manifestations of system-controlling instructions, said manifestations including zone bit-combinations and numeric bit-combinations, compress add apparatus, comprising:

a zone adder and a numeric adder;

instruction-responsive means for accessing zone and numeric bit-combinations of two operands in two locations, respectively, of said storage means, and for delivering zone bit-combinations; from each of said locations to said zone adder and for delivering numeric bit-combinations from each of said locations to said numeric adder;

and return channel means responsive to said zone adder and to said numeric adder for combining the outputs therefrom as zone and numeric bit-combinations, respectively, of a result character, and for transmitting said result character to said storage means for storage therein.

3. In a data processing system of the type having a storage means containing a plurality of addressable storage locations for storing data manifestations, said manifestations including numeric bit-combinations and zone-bit combinations, an apparatus for expanding data, comprising:

zone register means for storing a plurality of zone bits, said zone register means being divided into a high-order half and low-order half;

a conversion circuit for converting a value represented by a plurality of zone bits to a single binary number;

data registering means for storing a plural-ordered value indicative of an item of data, each of said orders manifesting a single digit value in the same numeric code combinations as the others of said orders, said data registering means including a low-ordered portion and a high-ordered portion, each of said portions including at least one order;

data read out control means for reading out, in successive cycles, successive characters of one of said data manifestations, said read out control means causing numeric portions of each character read out to be stored in successive corresponding orders of the low-order portion of said data registering means, and to store the zone portions of certain successive characters in said zone registering means;

and zone cycle control means operative in response to the completion of the reading out of successive numeric and zone portions of the characters of a first data manifestation by said read out means to pass the contents of said zone registering means to said conversion means a plurality of times, as necessary, to convert the contents thereof to successive orders expressed in the numeric code combinations relating to said data registering means, and for causing each order of output from said conversion means to be stored in a corresponding order of the high-ordered portion of said data registering means in respective successive cycles.

4. The device described in claim 3 including means connecting the low-ordered half of said zone register with orders of said address which include the numeric values corresponding to the highest order of the low-order portion of said address registering means, and means connecting the high-order half of said zone register with a character of said address corresponding to the lowest-order of said address registering means.

5. In a data processing system of the type having a storage means containing a plurality of addressable storage locations for storing data manifestations and manifestations of system-controlling instructions, said manifestations inlcuding numeric bit-combinations and zone bit-combinations, a compress data apparatus, comprising:

registering means for storing a plural-ordered value indicative of an item of data, each of said orders manifesting a single digit value in the same code combination as the others of said orders, said registering means including a low ordered portion and a high ordered portion, each of said portions including at least one order;

input conversion means responsive to said high order portion to generate a single binary number indicative of the value stored in said high ordered portion;

instruction-responsive means including means for accessing one of said storage locations so as to store a data manifestation therein, said location capable of storing a plurality of orders of characters, each of said orders including numeric and zone portions, said instruction responsive means defining a sequence of operating cycles, each character being accessed in a respectively corresponding one of said cycles, the lowest-ordered character being accessed first, said instruction responsive means, in successive cycles, also accessing respective successive orders the low-order portion of said registering means;

and means operative in conjunction with said instruction-responsive means for combining bits of said single binary number as zone bit-combinations with numeric bit-combinations of said low-order portion and for storing the resulting character in said location.

6. In a data processing system of the type having a storage means containing a plurality of addressable storage locations for storing data manifestations and manifestations of system-controlling instructions, said manifestations including numeric bit-combinations and zone bit-combinations, a compressed data incrementing apparatus, comprising:

data registering means for storing a plural-ordered value, each of said orders manifesting a single digit value in the same code combination as the others of said orders, said data registering means including a low-ordered portion and a high-ordered portion, each of said portions including at least one order;

input conversion means responsive to said high-order portion to generate a single binary number indicative of the value stored in said high-ordered portion;

multi-function incrementing control means including means for accessing one of said storage locations to derive an increment therefrom, said increment being represented by a plurality of orders of characters, each of said orders including numeric values, some of said orders including, in zone portions thereof, bits which correspond respectively to different bits of said single binary number, said incrementing control means defining a sequence of incrementing cycles, each character being accessed in a respectively corresponding one of said cycles, the lowest-ordered character being accessed first, said incrementing control means, in successive cycles, also accessing respective successive orders the low-order portion of said data registering means;

numeric adder means responsive to said low order portion of said data registering means and to numeric portions of corresponding orders of said increment to provide a numeric sum indication corresponding to each of said orders;

zone adder means responsive to zone bits of successive orders of said increment and corresponding bits of said single binary number to generate zone sum manifestations indicative of the sum of the values of the combination of said zone bits with corresponding bits of said single binary number;

and means operative in conjunction with said incrementing control means for storing said numeric sum manifestations in corresponding orders of said low order portion of said data registering means and for storing said zone sum manifestations in corresponding orders of said high order portion of said data registering means.

7. The invention described in claim 6 wherein:

said zone adder means additionally comprises output conversion means for converting a zone sum manifestation from a format consistent with said single binary number and zone portions of said increment to a format consistent with the format of said data registering means;

and additionally comprising means to reflect a carry resulting from the addition of a lower ordered zone portion of said increment into the sum resulting from adding a higher ordered zone portion of said increment including gating means for passing said zone sum manifestations through said zone adder means to said output conversion means, and wherein the addition of said higher ordered zone sum and said carry occurs as said sum is transmitted to said conversion means for conversion to the format of said data registering means.

8. A data processing system of the type having storage means containing a plurality of addressable storage locations for storing data manifestations and manifestations of system-controlling instructions, said manifestations including numeric portions and zone portions, said system-controlling instructions including at least an operations part, some of said system-controlling instructions also comprising at least one address part, said address parts being representable by numeric portions and zone portions, comprising:

a mode control means settable into either of two conditions, said means when in a first one of said conditions indicating that addresses contained within instructions comprise numeric portions only, said means when in the other of said states indicating that addresses contained within instructions comprise combinations of numeric and zone bit-combinations;

instruction read out control means operative in conjunction with said mode control means to read out instructions comprising numeric portions only when said mode control means is in said first state, and for reading out instructions including addresses having both zone and numeric portions therein when said mode control means is in said second state, said instruction read out control means converting said zone and numeric address combinations to pure numeric addresses;

execution control means for executing said instructions without regard to the setting of said control means;

and means responsive to particular operation portions of said system-controlling instructions whenever said mode control means is in said second state for performing compress data handling operations in said system.

References Cited by the Examiner

UNITED STATES PATENTS

| | | | |
|---|---|---|---|
| 2,872,666 | 2/1959 | Greenhalgh | 340—174 |
| 2,898,042 | 8/1959 | Womersley et al. | 235—170 |
| 2,914,248 | 11/1959 | Ross et al. | 235—157 |
| 3,027,081 | 3/1962 | Evans et al. | 235—157 |
| 3,046,539 | 7/1962 | Saxenmeyer | 340—347 |
| 3,058,659 | 10/1962 | Demmer et al. | 235—176 |
| 3,059,222 | 10/1962 | Demmer | 340—172.5 |
| 3,168,723 | 2/1965 | Foin et al. | 340—172.5 |

MALCOLM A. MORRISON, *Primary Examiner.*

K. MILDE, *Assistant Examiner.*